(12) United States Patent
Ballaro et al.

(10) Patent No.: US 8,930,244 B2
(45) Date of Patent: Jan. 6, 2015

(54) METHOD, MEDIUM, AND SYSTEM FOR PROCESSING REQUISITIONS

(75) Inventors: Charles A. Ballaro, Apex, NC (US); Alexey Lef, New York, NY (US); Ronald W. Angerer, Durham, NC (US); Philip J. Sabino, Raleigh, NC (US); David W. Frink, Raleigh, NC (US); Lisa Fleck, Calgary (CA)

(73) Assignee: SciQuest, Inc., Cary, NC (US)

( * ) Notice: Subject to any disclaimer, the term of this patent is extended or adjusted under 35 U.S.C. 154(b) by 1125 days.

(21) Appl. No.: 12/007,815

(22) Filed: Jan. 15, 2008

(65) Prior Publication Data

US 2009/0182592 A1     Jul. 16, 2009

(51) Int. Cl.
*G06Q 30/00* (2012.01)
(52) U.S. Cl.
USPC ..................................... 705/26.81
(58) Field of Classification Search
CPC .......... G06Q 30/0635; G06Q 30/0637; G06Q 30/0633
USPC .......................... 705/26.1, 26.81, 26.82, 26.8
See application file for complete search history.

(56) References Cited

U.S. PATENT DOCUMENTS

| | | | | |
|---|---|---|---|---|
| 5,319,542 | A | * | 6/1994 | King et al. .................. 705/26.81 |
| 5,710,889 | A | | 1/1998 | Clark et al. |
| 5,861,906 | A | | 1/1999 | Dunn et al. |
| 5,895,454 | A | * | 4/1999 | Harrington ................... 705/26.8 |
| 5,970,475 | A | * | 10/1999 | Barnes et al. ............... 705/26.35 |
| 6,003,006 | A | | 12/1999 | Colella et al. ..................... 705/2 |
| 6,016,499 | A | | 1/2000 | Ferguson |
| 6,095,410 | A | | 8/2000 | Andersen et al. |
| 6,134,549 | A | | 10/2000 | Regnier et al. |
| 6,144,726 | A | | 11/2000 | Cross ........................... 379/112 |
| 6,175,836 | B1 | | 1/2001 | Aldred |
| 6,249,773 | B1 | | 6/2001 | Allard et al. |
| 6,493,742 | B1 | | 12/2002 | Holland et al. |
| 6,505,172 | B1 | | 1/2003 | Johnson et al. |
| 6,513,038 | B1 | | 1/2003 | Hasegawa et al. |
| 6,564,213 | B1 | | 5/2003 | Ortega et al. |
| 6,622,127 | B1 | | 9/2003 | Klots et al. |

(Continued)

FOREIGN PATENT DOCUMENTS

| | | | | |
|---|---|---|---|---|
| JP | 2002-175217 | | 6/2002 | .............. G06F 12/14 |
| WO | WO 01/42882 A2 | | 6/2001 | |

OTHER PUBLICATIONS

Kim, Joong-In, and Dan L. Shunk. "Matching indirect procurement process with different B2B e-procurement systems." Computers in Industry 53.2 (2004): 153-164.*

(Continued)

*Primary Examiner* — Matthew Zimmerman
(74) *Attorney, Agent, or Firm* — Morgan, Lewis & Bockius LLP

(57) ABSTRACT

A single instance, multi-tenant procurement system, includes an access module to provide access to a plurality of end users associated with an organization to their respective accounts, each account being customized by a super user of the organization, a search engine to execute searches for products offered by one or more suppliers, a transaction module to process and track one or more requisitions generated by the plurality of end users, a business rules module to apply business rules established between the organization and the one or more suppliers to process the requisitions, and a data repository to store data generated on the system.

33 Claims, 79 Drawing Sheets

(56) References Cited

U.S. PATENT DOCUMENTS

| | | | |
|---|---|---|---|
| 6,629,079 B1 | 9/2003 | Spiegel et al. | |
| 6,687,693 B2 | 2/2004 | Cereghini et al. | |
| 6,728,758 B2 | 4/2004 | Sato | |
| 6,775,658 B1 | 8/2004 | Zothner | |
| 6,795,707 B2 | 9/2004 | Martin et al. | |
| 6,850,900 B1* | 2/2005 | Hare et al. | 705/80 |
| 6,876,977 B1* | 4/2005 | Marks | 705/26.62 |
| 6,892,185 B1 | 5/2005 | Van Etten et al. | 705/27 |
| 6,920,430 B1 | 7/2005 | Berton et al. | 705/26 |
| 6,928,411 B1 | 8/2005 | Fox et al. | |
| 6,961,734 B2 | 11/2005 | Kauffman | 707/103 Z |
| 7,082,408 B1* | 7/2006 | Baumann et al. | 705/26.8 |
| 7,117,165 B1* | 10/2006 | Adams et al. | 705/26.4 |
| 7,124,107 B1 | 10/2006 | Pishevar et al. | 705/37 |
| 7,146,002 B1 | 12/2006 | Smith et al. | |
| 7,308,416 B2 | 12/2007 | Peachey-Kountz et al. | |
| 7,328,176 B2* | 2/2008 | Tarvydas et al. | 705/26.62 |
| 7,350,698 B2 | 4/2008 | Viswanath et al. | |
| 7,359,871 B1 | 4/2008 | Paasche et al. | 705/26 |
| 7,366,684 B1 | 4/2008 | Douglas | 705/26 |
| 7,379,781 B2 | 5/2008 | Treichler et al. | |
| 7,379,903 B2* | 5/2008 | Caballero et al. | 705/26.4 |
| 7,478,058 B2 | 1/2009 | Byrne | |
| 7,613,638 B2* | 11/2009 | Chakraborty et al. | 705/26.61 |
| 7,640,193 B2 | 12/2009 | Crespo et al. | 705/26 |
| 7,644,197 B1 | 1/2010 | Waldorf et al. | |
| 7,647,247 B2 | 1/2010 | Abraham et al. | 705/26 |
| 7,676,407 B2 | 3/2010 | Van De Van et al. | |
| 7,698,167 B2 | 4/2010 | Batham et al. | |
| 7,715,548 B2 | 5/2010 | Croak et al. | |
| 7,752,146 B2 | 7/2010 | Lert, Jr. | |
| 7,788,294 B2 | 8/2010 | Van Wart et al. | |
| 7,848,953 B2 | 12/2010 | Kahlon et al. | |
| 7,970,671 B2 | 6/2011 | Hahn-Carlson et al. | |
| 8,024,236 B2 | 9/2011 | Vitulli et al. | |
| 8,046,275 B2 | 10/2011 | Simon et al. | |
| 8,170,998 B2 | 5/2012 | Churi et al. | |
| 2001/0034733 A1 | 10/2001 | Prompt et al. | |
| 2001/0042023 A1 | 11/2001 | Anderson et al. | 705/26 |
| 2001/0051917 A1 | 12/2001 | Bissonette et al. | |
| 2002/0007287 A1 | 1/2002 | Straube et al. | |
| 2002/0052801 A1* | 5/2002 | Norton et al. | 705/26 |
| 2002/0055888 A1 | 5/2002 | Beran et al. | 705/26 |
| 2002/0065736 A1 | 5/2002 | Willner et al. | |
| 2002/0077939 A1 | 6/2002 | Nicastro et al. | 705/29 |
| 2002/0078039 A1 | 6/2002 | Cereghini et al. | |
| 2002/0111879 A1 | 8/2002 | Melero et al. | 705/26 |
| 2002/0120714 A1 | 8/2002 | Agapiev | |
| 2002/0133466 A1 | 9/2002 | Pugh | |
| 2002/0143726 A1 | 10/2002 | Planalp et al. | |
| 2002/0161861 A1 | 10/2002 | Greuel | |
| 2002/0174089 A1 | 11/2002 | Tenorio | 707/1 |
| 2002/0178120 A1 | 11/2002 | Reid et al. | 705/59 |
| 2003/0028507 A1 | 2/2003 | Pauliks et al. | |
| 2003/0040935 A1 | 2/2003 | Magee | 705/1 |
| 2003/0074302 A1 | 4/2003 | Cope | |
| 2003/0105684 A1 | 6/2003 | Dunn et al. | |
| 2003/0120641 A1 | 6/2003 | Pelletier | 707/3 |
| 2003/0126024 A1 | 7/2003 | Crampton et al. | |
| 2003/0130910 A1 | 7/2003 | Pickover et al. | 705/27 |
| 2003/0135582 A1 | 7/2003 | Allen et al. | |
| 2003/0144924 A1 | 7/2003 | McGee | |
| 2003/0149631 A1 | 8/2003 | Crampton et al. | |
| 2003/0212617 A1 | 11/2003 | Stone et al. | |
| 2003/0220843 A1 | 11/2003 | Lam et al. | 705/26 |
| 2003/0220855 A1 | 11/2003 | Lam et al. | |
| 2003/0220875 A1 | 11/2003 | Lam et al. | |
| 2003/0225650 A1 | 12/2003 | Wilson et al. | |
| 2004/0034595 A1 | 2/2004 | Kugeman et al. | 705/40 |
| 2004/0059645 A1 | 3/2004 | Wirth, Jr. | 705/27 |
| 2004/0103042 A1 | 5/2004 | Ryu et al. | 705/26 |
| 2004/0117290 A1 | 6/2004 | Shacham | 705/37 |
| 2004/0117355 A1 | 6/2004 | Lef et al. | 707/3 |
| 2004/0148232 A1 | 7/2004 | Fushimi et al. | |
| 2004/0172344 A1 | 9/2004 | Stockwell et al. | |
| 2004/0177114 A1 | 9/2004 | Friedman et al. | |
| 2004/0210489 A1 | 10/2004 | Jackson et al. | |
| 2004/0210526 A1 | 10/2004 | Brown | 705/40 |
| 2004/0267629 A1 | 12/2004 | Herrmann et al. | 705/26 |
| 2004/0267630 A1 | 12/2004 | Au et al. | 705/26 |
| 2004/0267676 A1 | 12/2004 | Feng et al. | 705/400 |
| 2005/0027611 A1* | 2/2005 | Wharton | 705/26 |
| 2005/0060245 A1 | 3/2005 | Hoffman et al. | 705/28 |
| 2005/0075979 A1 | 4/2005 | Leavitt et al. | 705/40 |
| 2005/0086122 A1 | 4/2005 | Cirulli et al. | 705/26 |
| 2005/0149415 A1 | 7/2005 | Furphy et al. | |
| 2005/0165659 A1 | 7/2005 | Gruber | 705/26 |
| 2005/0177507 A1 | 8/2005 | Bandych et al. | 705/40 |
| 2005/0187825 A1 | 8/2005 | Kirkley | |
| 2005/0240493 A1 | 10/2005 | Johnson et al. | 705/27 |
| 2005/0240524 A1 | 10/2005 | Van De Van et al. | |
| 2005/0246216 A1 | 11/2005 | Rosen, III et al. | 705/8 |
| 2005/0262088 A1 | 11/2005 | Solis et al. | |
| 2006/0089907 A1 | 4/2006 | Kohlmaier et al. | |
| 2006/0224412 A1 | 10/2006 | Frank et al. | 705/1 |
| 2006/0235789 A1 | 10/2006 | Koch | 705/39 |
| 2006/0259427 A1 | 11/2006 | Randell et al. | 705/40 |
| 2006/0287954 A1 | 12/2006 | DeWitt et al. | 705/40 |
| 2007/0011057 A1* | 1/2007 | Archer et al. | 705/26 |
| 2007/0016514 A1 | 1/2007 | Al-Abdulqader et al. | 705/37 |
| 2007/0038566 A1 | 2/2007 | Shestakov et al. | 705/44 |
| 2007/0038567 A1 | 2/2007 | Allaire et al. | |
| 2007/0050261 A1 | 3/2007 | Lin | |
| 2007/0100842 A1 | 5/2007 | Wykes et al. | 707/100 |
| 2007/0124213 A1 | 5/2007 | Esau et al. | |
| 2007/0143665 A1 | 6/2007 | Machiraju et al. | 715/513 |
| 2007/0185785 A1 | 8/2007 | Carlson et al. | |
| 2007/0219880 A1 | 9/2007 | Stone et al. | |
| 2007/0232223 A1 | 10/2007 | Bilange | |
| 2007/0255578 A1 | 11/2007 | Salomon et al. | |
| 2007/0299736 A1 | 12/2007 | Perrochon et al. | 705/26 |
| 2008/0091577 A1 | 4/2008 | Holmes et al. | |
| 2008/0114712 A1 | 5/2008 | Gleim et al. | |
| 2008/0120189 A1 | 5/2008 | Singh et al. | |
| 2008/0162164 A1 | 7/2008 | Segler et al. | 705/1 |
| 2008/0189341 A1 | 8/2008 | Blea et al. | |
| 2008/0195506 A1 | 8/2008 | Koretz et al. | 705/27 |
| 2008/0228625 A1 | 9/2008 | Isaf et al. | |
| 2008/0281662 A1 | 11/2008 | Ginsburg et al. | |
| 2008/0312987 A1 | 12/2008 | Damodaran et al. | |
| 2009/0157548 A1 | 6/2009 | Gong | 705/44 |
| 2009/0171909 A1 | 7/2009 | Bank et al. | |
| 2009/0222279 A1 | 9/2009 | Reiz | 705/1 |
| 2009/0289107 A1 | 11/2009 | Prentice | |
| 2010/0023452 A1 | 1/2010 | Brown | 705/40 |
| 2010/0030675 A1 | 2/2010 | Hanan et al. | 705/34 |

OTHER PUBLICATIONS

International Search Report for PCT/US2003/038346 dated Jan. 3, 2005.
Office Action for U.S. Appl. No. 10/318,814, dated Oct. 5, 2004.
Notice of Allowability for U.S. Appl. No. 10/318,814, Apr. 27, 2005.
Notice of Allowance, U.S. Appl. No. 12/283,280, Jan. 28, 2011, 11 pgs.
Office Action, Canadian Patent Application 2513715, Aug. 31, 2009, 4 pgs.
Office Action, European Patent Application 03787246.2, Mar. 22, 2007, 5 pgs.
Office Action, U.S. Appl. No. 12/283,274, Dec. 22, 2010, 13 pgs.
Office Action, U.S. Appl. No. 12/283,277, Sep. 29, 2010, 9 pgs.
Office Action, U.S. Appl. No. 12/283,278, Jun. 9, 2010, 9 pgs.
Office Action, U.S. Appl. No. 12/283,278, Jan. 22, 2010, 7 pgs.
Office Action, U.S. Appl. No. 12/283,280, Aug. 19, 2009, 15 pgs.
Office Action, U.S. Appl. No. 12/283,280, Jan. 28, 2009, 14 pgs.
Office Action, U.S. Appl. No. 12/286,506, Jul. 28, 2010, 15 pgs.
Office Action, U.S. Appl. No. 12/286,506, Sep. 30, 2009, 13 pgs.
Office Action, U.S. Appl. No. 12/286,508, Oct. 14, 2009, 16 pgs.
Office Action, U.S. Appl. No. 12/286,508, Jun. 22, 2010, 18 pgs.
Supplementary European Search Report, EP Application 03787246, Aug. 16, 2006, 2 pgs.
Watson, Tailor catalogs to capture savings, Purchasing, Dec. 13, 2007, vol. 136, Iss. 15, 2 pgs.

(56) References Cited

OTHER PUBLICATIONS

Notice of Allowance, U.S. Appl. No. 12/283,275, Mar. 16, 2011, 14 pgs.
Notice of Allowance, U.S. Appl. No. 12/283,280, Mar. 24, 2011, 6 pgs.
Notice of Allowance, U.S. Appl. No. 12/286,508, Mar. 16, 2011, 11 pgs.
Final Office Action, U.S. Appl. No. 12/283,277, May 2, 2011, 10 pgs.
Office Action, U.S. Appl. No. 12/283,282, Apr. 13, 2011, 17 pgs.
Office Action, U.S. Appl. No. 12/286,506, Mar. 14, 2011, 15 pgs.
Office Action, U.S. Appl. No. 12/286,507, May 13, 2011 24 pgs.
Office Action for U.S. Appl. No. 12/283,274 dated Sep. 6, 2011, 15 pgs.
Office Action for U.S. Appl. No. 12/283,276 dated Jul. 7, 2011, 7 pgs.
Final Office Action for U.S. Appl. No. 12/286,506 dated Sep. 22, 2011, 12 pgs.
Office Action for U.S. Appl. No. 12/283,279 dated Sep. 29, 2011, 12 pgs.
Notice of Allowance for U.S. Appl. No. 12/283,275 dated Jun. 30, 2011, 8 pgs.
Notice of Allowance for U.S. Appl. No. 12/283,280 dated Jul. 12, 2011, 7 pgs.
Notice of Allowance for U.S. Appl. No. 12/286,508 dated Jul. 25, 2011, 7 pgs.
Notice of Allowance for U.S. Appl. No. 12/283,278 dated Sep. 27, 2011, 8 pgs.
"Commerce One Announces Largest Commercially-Available Pre-Packed Catalog Content for Rapid Implementation of Electronic Procurement," Business Editors. Business Wire, New York: Jun. 10, 1998, 3 pgs.
Ballaro, Notice of Allowance, U.S. Appl. No. 12/283,281, May 25, 2012, 19 pgs.
Usama Fayyad, Optimizing Customer Insight, Intelligent Enterprise, vol. 6, Iss. 8, May 13, 2003, 5 pgs.
B. Omelayenko et al. "An Analysis of Integration Problems of XML-Based Catalogs for B2B Electronic Commerce", Proceedings of the 9th IFIP 2.6 Working Conference on Database Semantics (DS-9), Apr. 25-28, Hong Kong, 2001, 15 pgs.
No Author, "Open Catalog Interface" Release 2.0B, © 2000 SAP AG, 24 pgs.
Ballaro, Office Action, U.S. Appl. No. 12/283,276, Jan. 23, 2012, 10 pgs.
Ballaro, Office Action, U.S. Appl. No. 12/283,277, Oct. 7, 2011, 15 pgs.
Ballaro, Office Action, U.S. Appl. No. 12/283,277, Mar. 30, 2012, 17 pgs.
Ballaro, Office Action, U.S. Appl. No. 12/283,279, Mar. 29, 2012, 14 pgs.
Ballaro, Office Action, U.S. Appl. No. 12/283,281, Oct. 6, 2011, 67 pgs.
Ballaro, Office Action, U.S. Appl. No. 12/283,282, Nov. 3, 2011, 33 pgs.
Ballaro, Office Action, U.S. Appl. No. 12/286,506, Feb. 7, 2012, 13 pgs.
Ballaro, Office Action, U.S. Appl. No. 12/286,507, Oct. 27, 2011, 24 pgs.
Ballaro, Notice of Allowance, U.S. Appl. No. 12/283,276, Sep. 14, 2012, 14 pgs.
Ballaro, Office Action, U.S. Appl. No. 12/283,277, Aug. 30, 2012, 14 pgs.
Ballaro, Office Action, U.S. Appl. No. 12/283,282, Aug. 1, 2012, 14 pgs.
Ballaro, Office Action, U.S. Appl. No. 12/286,506, Aug. 24, 2012, 15 pgs.
Leukel, Coordination and exchange of XML catalog data in B2B, Oct. 23-27, 2002, 5 pgs.
Ballaro, Office Action, U.S. Appl. No. 12/283,277, Feb. 21, 2013, 14 pgs.
Ballaro, Office Action, U.S. Appl. No. 12/283,282, Feb. 28, 2013, 17 pgs.
Ballaro, Office Action, U.S. Appl. No. 12/286,506, May 6, 2013, 16 pgs.
Ballaro, Office Action, U.S. Appl. No. 12/283,282, Nov. 7, 2013, 14 pgs.
Anonymous, Illinois Inventors Develop Corporate Procurement Process, US Fed News Service, Including US State News, Feb. 20, 2008, 2 pgs.

\* cited by examiner

Weet Organization

PROFILE | LOGOUT

USER MANAGEMENT - HR CONFIGURATION        SEARCH FOR [SUPPLIER PROFILE ▷]   6 ITEM(S)

HOME | MY FAVORITES | PRODUCT SEARCH | CARTS | APPROVALS | HISTORY | SETTLEMENT | USER MGT. ▷
USERS | REGISTRATIONS | USER IMPORT | HR CONFIGURATION

CLICK ON A ROLE NAME BELOW TO MODIFY IT, OR SELECT A ROLE AND CLICK "ADD CHILD ROLE"
TO CREATE A NEW SUB-ROLE. TO CREATE A NEW TOP-LEVEL ROLE, CLICK ON "ROLES" BEFORE
CLICKING "ADD CHILD ROLE."
NOTE: ONCE YOU CLICK "ADD CHILD ROLE" YOU CANNOT DELETE THE NEW ROLE, ONLY INACTIVATE IT.

DEPARTMENTS  ADMIN  POSITIONS | ROLES | RELATIONSHIP

[ADD CHILD ROLE]

SELECT A ROLE TO EDIT     SELECTED ROLE: ADMINISTRATOR
OR CREATE NEW ROLES                              ╲_ 446b

ROLES
- ADMINISTRATOR                 ROLE PROPERTIES | PURCHASING | PERMISSIONS  MATERIALS MGT  HISTORY
  + JR ADMIN                    CUSTOM FIELDS | PURCHASING/APPROVAL LIMITS | PRODUCT VIEWS | PUNCHOUT ACCESS
  ↳ JR ADMIN 3
  ↳ LCM ADMIN                   | LIMIT | VALUE | OVERRIDE ROLE |
  ↳ APPROVER                    |---|---|---|
  ↳ CATALOG MANAGER             | REQUISITION LIMIT | | ☐ |
  ↳ CHEMICAL MANAGEMENT ONLY    | REQUISITION LINE ITEM LIMIT | | ☐ |
  + JUNIOR EDITOR               | REQUISITION APPROVAL LIMIT | | ☐ |
  ↳ LBM ADMINISTRATOR           | REQUISITION LINE ITEM APPROVAL LIMIT | | ☐ |
  ↳ LEGAL                       | PURCHASE ORDER LIMIT | | ☐ |
  ↳ RECEIVING                   | PURCHASE ORDER LINE ITEM LIMIT | | ☐ |
  + REQUISITIONER               | PURCHASE ORDER APPROVAL LIMIT | | ☐ |
  ↳ RESEARCHER - DO NOT TOUCH   | PURCHASE ORDER LINE ITEM APPROVAL LIMIT | | ☐ |
  ↳ SENIOR EDITOR               | LIMITED PURCHASE ORDER LIMIT | | ☐ |
  + SENIOR TECHNICAL WRITER     | LINE ITEM LIMITED PURCHASE ORDER LIMIT | | ☐ |
  ↳ SUPPLIER

[SAVE]

[APPLY ALL CHANGES]

PROFILE | LOGOUT

[Weet Organization logo] USER MANAGEMENT - HR CONFIGURATION      SEARCH FOR [SUPPLIER PROFILE ▷]  [6 ITEM(S)]

HOME | MY FAVORITES | PRODUCT SEARCH | CARTS | APPROVALS | HISTORY | SETTLEMENT | USER MGT.
USERS | REGISTRATIONS | USER IMPORT | HR CONFIGURATION

CLICK ON A ROLE NAME BELOW TO MODIFY IT, OR SELECT A ROLE AND CLICK "ADD CHILD ROLE"
TO CREATE A NEW SUB-ROLE. TO CREATE A NEW TOP-LEVEL ROLE, CLICK ON "ROLES" BEFORE
CLICKING "ADD CHILD ROLE."
NOTE: ONCE YOU CLICK "ADD CHILD ROLE" YOU CANNOT DELETE THE NEW ROLE, ONLY INACTIVATE IT.

DEPARTMENTS  ADMIN  POSITIONS [ROLES] RELATIONSHIP

[ADD CHILD ROLE]

SELECT A ROLE TO EDIT           SELECTED ROLE:  ADMINISTRATOR ——446b
OR CREATE NEW ROLES

ROLES
- ADMINISTRATOR
  └ JR ADMIN
    └ JR ADMIN 3
  └ LCM ADMIN
  └ APPROVER
  └ CATALOG MANAGER
  └ CHEMICAL MANAGEMENT ONLY
  + JUNIOR EDITOR
    └ LBM ADMINISTRATOR
  └ LEGAL
  └ RECEIVING
  + REQUISITIONER
  └ RESEARCHER - DO NOT TOUCH
  └ SENIOR EDITOR
  + SENIOR TECHNICAL WRITER
  └ SUPPLIER

[ROLE PROPERTIES] [PURCHASING] [PERMISSIONS] [MATERIALS MGT] [HISTORY]
[CUSTOM FIELDS | PURCHASING/APPROVAL LIMITS | PRODUCT VIEWS | PUNCHOUT ACCESS]

| SUPPLIER | AVAILABLE | OVERRIDE ROLE |
|---|---|---|
| MRO/FACILITIES | | |
| GRAINGER, INC. | × | ☐ |
| BOOKS | | |
| AMAZON.COM | × | ☐ |
| LAB SUPPLIES | | |
| APPLIED BIOSYSTEMS | × | |
| FISHER SCIENTIFIC | ☑ | ☐ |
| INVITROGEN | × | |
| KRACKELER SCIENTIFIC, INC. | ☑ | ☑ |
| SCIQUEST, INC. | ☑ | ☑ |
| SIGMA-ALDRICH | × | |
| VINIMAYA | | |
| VWR INTERNATIONAL | ☑ | ☑ |

[UPDATE]

| SUPPLIER | AVAILABLE | OVERRIDE ROLE |
|---|---|---|
| FURNITURE | | |
| OM WORKSPACE | ☑ | ☑ |
| ONE WORKPLACE | × | ☐ |
| STEELCASE OFFICE FURNITURE | × | ☐ |
| OFFICE/COMPUTER | | |
| CANNON IV, INC. | × | |
| CDW | ☑ | ☑ |
| CORPORATE EXPRESS | ☑ | ☑ |
| DELL | × | |
| HEWLETT-PACKARD COMPANY | × | |
| INSIGHT | × | |
| OFFICE DEPOT | ☑ | ☑ |
| STAPLES | ☑ | ☑ |
| SUN MICROSYSTEMS | × | |

[APPLY ALL CHANGES]

PROFILE | LOGOUT

USER MANAGEMENT - HR CONFIGURATION

SEARCH FOR [SUPPLIER PROFILE ▼]  [    ] 6 ITEM(S) ▼  ⊗

HOME | MY FAVORITES | PRODUCT SEARCH | CARTS | APPROVALS | HISTORY | SETTLEMENT | USER MGT.
USERS | REGISTRATIONS | USER IMPORT | HR CONFIGURATION

CLICK ON A ROLE NAME BELOW TO MODIFY IT, OR SELECT A ROLE AND CLICK "ADD CHILD ROLE"
TO CREATE A NEW SUB-ROLE. TO CREATE A NEW TOP-LEVEL ROLE, CLICK ON "ROLES" BEFORE
CLICKING "ADD CHILD ROLE."
NOTE: ONCE YOU CLICK "ADD CHILD ROLE" YOU CANNOT DELETE THE NEW ROLE, ONLY INACTIVATE IT.

DEPARTMENTS ADMIN POSITIONS [ROLES] RELATIONSHIP

[ADD CHILD ROLE]

SELECT A ROLE TO EDIT    SELECTED ROLE: ADMINISTRATOR
OR CREATE NEW ROLES

ROLES
-ADMINISTRATOR
  ∟JR ADMIN
  ∟JR ADMIN 3
  ∟LCM ADMIN
∟APPROVER
∟CATALOG MANAGER
∟CHEMICAL MANAGEMENT ONLY
+JUNIOR EDITOR
∟LBM ADMINISTRATOR
∟LEGAL
∟RECEIVING
+REQUISITIONER
∟RESEARCHER - DO NOT TOUCH
∟SENIOR EDITOR
+SENIOR TECHNICAL WRITER
∟SUPPLIER

ROLE PROPERTIES  PURCHASING  [PERMISSIONS]  MATERIALS MGT HISTORY
SHOPPING/CART  ORDERS  | APPROVALS | ACCOUNTS PAYABLE | ADMINISTRATION | MATERIALS MGT | CUSTOM FIELDS PERMISSIONS  ?

— 446c

| PERMISSION | VALUE | OVERRIDE PERMISSION |
|---|---|---|
| BUDGET | | |
| VIEW BUDGET DETAILS | ☐ | ☑ |
| CREATE/EDIT BUDGET DETAILS | ☐ | ☑ |

| PERMISSION | VALUE | OVERRIDE PERMISSION |
|---|---|---|
| SETTLEMENT MANAGER | | |
| CREATE/VIEW RECEIPTS | ☐ | ☑ |
| ENABLE BLIND RECEIVING - (HIDE ORDER QUANTITY DURING RECEIVING) | ☐ | ☑ |
| VIEW INVOICES | ☐ | ☑ |
| CREATE/EDIT INVOICES | ☐ | ☑ |
| SET INVOICE AS PAYABLE | ☐ | ☑ |
| SET INVOICE AS PAID | ☐ | ☑ |
| MATCH DOCUMENTS WITHIN TOLERANCES | ☐ | ☑ |
| FORCE MATCH DOCUMENTS | ☐ | ☑ |
| UNMATCH DOCUMENTS | ☐ | ☑ |
| RESEND INVOICES TO EXTERNAL SYSTEM | ☐ | ☑ |

[APPLY ALL CHANGES]

[UPDATE]

FIG. 40

PROFILE | LOGOUT

USER MANAGEMENT - HR CONFIGURATION        SEARCH FOR [SUPPLIER PROFILE ▾]    [          ]  6 ITEM(S)

HOME | MY FAVORITES | PRODUCT SEARCH | CARTS | APPROVALS | HISTORY | SETTLEMENT | USER MGT.  ▾  ⓒ
USERS | REGISTRATIONS | USER IMPORT | HR CONFIGURATION                                         ?

CLICK ON A ROLE NAME BELOW TO MODIFY IT, OR SELECT A ROLE AND CLICK "ADD CHILD ROLE"
TO CREATE A NEW SUB-ROLE. TO CREATE A NEW TOP-LEVEL ROLE, CLICK ON "ROLES" BEFORE
CLICKING "ADD CHILD ROLE."
NOTE: ONCE YOU CLICK "ADD CHILD ROLE" YOU CANNOT DELETE THE NEW ROLE, ONLY INACTIVATE IT.

DEPARTMENTS  ADMIN  POSITIONS  ROLES  RELATIONSHIP

| ADD CHILD ROLE |
| --- |
| SELECT A ROLE TO EDIT OR CREATE NEW ROLES |

ROLES
- ADMINISTRATOR
  + JR ADMIN
    ‐ JR ADMIN 3
  ‐ LCM ADMIN
- APPROVER
- CATALOG MANAGER
- CHEMICAL MANAGEMENT ONLY
- JUNIOR EDITOR
- LBM ADMINISTRATOR
- LEGAL
- RECEIVING
+ REQUISITIONER
- RESEARCHER - DO NOT TOUCH
- SENIOR EDITOR
+ SENIOR TECHNICAL WRITER
- SUPPLIER

SELECTED ROLE: ADMINISTRATOR

[APPLY ALL CHANGES]

ROLE PROPERTIES  PURCHASING  PERMISSIONS  MATERIALS MGT HISTORY
SHOPPING/CART | ORDERS | APPROVALS | ACCOUNTS PAYABLE | ADMINISTRATION | MATERIALS MGT | CUSTOM FIELDS PERMISSIONS  ?

~ 446c

| PERMISSION | VALUE | OVERRIDE PERMISSION |
| --- | --- | --- |
| SYSTEM ADMINISTRATION | | |
| ADMINISTRATION | ☑ | ▾ |
| FIELD MANAGEMENT | ☑ | ▾ |
| LIST MANAGEMENT | ☐ | ▾ |
| CUSTOM FIELD MANAGEMENT | ☐ | ▾ |
| ADDRESS MANAGEMENT | ☑ | ▾ |
| MANAGE SHARED WORKFLOW FOLDERS | | |
| CATALOG MANAGEMENT | ☑ | ▾ |
| SYSTEM CONFIGURATION | ☐ | ▾ |
| LICENSE | ☑ | ▾ |
| TRANSACTION REPORTS | ☐ | ▾ |
| CATALOG REPORTS | ☑ | ▾ |
| USAGE REPORTS | ☐ | ▾ |
| CONSORTIUM REPORTS | ☐ | ▾ |

| PERMISSION | VALUE | OVERRIDE PERMISSION |
| --- | --- | --- |
| USER ADMINISTRATION | | |
| VIEW MY PROFILE | ☑ | ▾ |
| EDIT MY PROFILE | ☑ | ▾ |
| CHANGE PASSWORD | ☑ | ▾ |
| EDIT PERSONAL INFORMATION | ☑ | ▾ |
| VIEW ALL USER PROFILES | ☑ | ▾ |
| EDIT ALL USER PROFILES/ROLES/PERMISSIONS | | |
| EDIT ROLES/DEPTS/RELATIONSHIPS | ☑ | ▾ |
| EDIT MY SUPERVISOR FOR APPROVALS | ☐ | |
| EDIT USER'S FINANCIAL APPROVERS | ☐ | |
| CUSTOMIZE NAVIGATION | ☑ | ▾ |

PROFILE | LOGOUT

USER MANAGEMENT - HR CONFIGURATION          SEARCH FOR [SUPPLIER PROFILE ▼]          6 ITEM(S) [▼]

HOME | MY FAVORITES | PRODUCT SEARCH | CARTS | APPROVALS | HISTORY | SETTLEMENT | USER MGT.
USERS | REGISTRATIONS | USER IMPORT | HR CONFIGURATION

CLICK ON A ROLE NAME BELOW TO MODIFY IT, OR SELECT A ROLE AND CLICK "ADD CHILD ROLE"
TO CREATE A NEW SUB-ROLE. TO CREATE A NEW TOP-LEVEL ROLE, CLICK ON "ROLES" BEFORE
CLICKING "ADD CHILD ROLE."
NOTE: ONCE YOU CLICK "ADD CHILD ROLE" YOU CANNOT DELETE THE NEW ROLE, ONLY INACTIVATE IT.

DEPARTMENTS  ADMIN  POSITIONS  [ROLES]  RELATIONSHIP

[ADD CHILD ROLE]

SELECT A ROLE TO EDIT          SELECTED ROLE:   ADMINISTRATOR
OR CREATE NEW ROLES

ROLES                                       [APPLY ALL CHANGES]
- ADMINISTRATOR
  + JR ADMIN
    JR ADMIN 3                              446c
    LCM ADMIN
  APPROVER                     ROLE PROPERTIES  PURCHASING  [PERMISSIONS]  MATERIALS MGT  HISTORY
  CATALOG MANAGER              SHOPPING/CART | ORDERS | APPROVALS | ACCOUNTS PAYABLE | ADMINISTRATION | MATERIALS MGT | CUSTOM FIELDS PERMISSIONS
  CHEMICAL MANAGEMENT ONLY
  + JUNIOR EDITOR
  LBM ADMINISTRATOR
  LEGAL
  RECEIVING
  + REQUISITIONER
  RESEARCHER - DO NOT TOUCH
  SENIOR EDITOR
  + SENIOR TECHNICAL WRITER
  SUPPLIER

| PERMISSION | VALUE | OVERRIDE ROLE | | PERMISSION | VALUE | OVERRIDE ROLE |
|---|---|---|---|---|---|---|
| ACCOUNT (CC) | | | | POWF | | |
| VIEW PERSONAL LIST | ☑ | ☑ | | VIEW PERSONAL LIST | ☐ | ☑ |
| EDIT PERSONAL LIST | ☑ | ☑ | | EDIT PERSONAL LIST | ☐ | ☑ |
| VIEW ORGANIZATION VALUES | ☐ | ☑ | | VIEW ORGANIZATION VALUES | ☐ | ☑ |
| CREATE VALUES FOR PERSONAL LIST | ☑ | ☑ | | CREATE VALUES FOR PERSONAL LIST | ☐ | ☑ |
| ACTIVITY (PI) | | | | PROJECT | | |
| VIEW PERSONAL LIST | ☑ | ☑ | | VIEW PERSONAL LIST | ☑ | ☑ |
| EDIT PERSONAL LIST | ☑ | ☑ | | EDIT PERSONAL LIST | ☑ | ☑ |
| VIEW ORGANIZATION VALUES | ☐ | ☑ | | VIEW ORGANIZATION VALUES | ☑ | ☑ |
| CREATE VALUES FOR PERSONAL LIST | ☐ | ☑ | | CREATE VALUES FOR PERSONAL LIST | ☐ | ☑ |
| CHART-ORG | | | | PRWF | | |
| VIEW PERSONAL LIST | ☐ | | | VIEW PERSONAL LIST | ☐ | ☑ |
| EDIT PERSONAL LIST | ☐ | | | EDIT PERSONAL LIST | ☐ | ☑ |
| VIEW ORGANIZATION VALUES | ☐ | | | VIEW ORGANIZATION VALUES | ☐ | ☑ |
| | | | | CREATE VALUES FOR PERSONAL LIST | ☐ | ☑ |

PROFILE | LOGOUT

USER MANAGEMENT - HR CONFIGURATION  SEARCH FOR [SUPPLIER PROFILE ▷]  6 ITEM(S) [▷]

HOME | MY FAVORITES | PRODUCT SEARCH | CARTS | APPROVALS | HISTORY | SETTLEMENT | USER MGT.
USERS | REGISTRATIONS | USER IMPORT | HR CONFIGURATION

CLICK ON A ROLE NAME BELOW TO MODIFY IT, OR SELECT A ROLE AND CLICK "ADD CHILD ROLE"
TO CREATE A NEW SUB-ROLE. TO CREATE A NEW TOP-LEVEL ROLE, CLICK ON "ROLES" BEFORE
CLICKING "ADD CHILD ROLE."
NOTE: ONCE YOU CLICK "ADD CHILD ROLE" YOU CANNOT DELETE THE NEW ROLE, ONLY INACTIVATE IT.

DEPARTMENTS  ADMIN  POSITIONS  ROLES  RELATIONSHIP

[ADD CHILD ROLE]

SELECT A ROLE TO EDIT     SELECTED ROLE:  ADMINISTRATOR
OR CREATE NEW ROLES

ROLES                     ROLE PROPERTIES  PURCHASING  PERMISSIONS  MATERIALS MGT  HISTORY ⟵ 446e
- ADMINISTRATOR
  + JR ADMIN              - FILTERS
    - JR ADMIN 3          START DATE         [MM/DD/YYYY]
    - LCM ADMIN
  - APPROVER              END DATE           [MM/DD/YYYY]
  - CATALOG MANAGER
  - CHEMICAL MANAGEMENT ONLY  ACTION [                    ]
  + JUNIOR EDITOR         SECTION [                   ]
  - LBM ADMINISTRATOR
  - LEGAL                           [APPLY]
  - RECEIVING
  + REQUISITIONER                          HISTORY
  - RESEARCHER - DO NOT TOUCH              RECORDS FOUND: 207           EXPORT CSV
  - SENIOR EDITOR
  + SENIOR TECHNICAL WRITER  RESULTS PER PAGE 20 [ ]                    ◁PAGE 1 ☐ OF 11▷
  - SUPPLIER
                          DATE ▽  USER △  ACTION △           SECTION △          SELECTION △    FIELD △  OLD VALUE  NEW VALUE
                          5:44 AM MICHAEL PUNCHOUT           PUNCHOUT ACCESS    OFFICE DEPOT
                                          ACCESS ADDED
                          1:09 PM MICHAEL PUNCHOUT           PUNCHOUT ACCESS    STAPLES INC.
                                          ACCESS REMOVED

*FIG. 4T*

| Time | User | Action | Category | Detail | | Value |
|---|---|---|---|---|---|---|
| 3:34 PM | NEIL | PUNCHOUT ACCESS REMOVED | PUNCHOUT ACCESS | GATEWAY, INC. | | |
| 3:34 PM | NEIL | PUNCHOUT ACCESS ADDED | PUNCHOUT ACCESS | XEROX | | |
| 3:34 PM | NEIL | PUNCHOUT ACCESS ADDED | PUNCHOUT ACCESS | FISCHER SCIENTIFIC | | |
| 3:34 PM | NEIL | PUNCHOUT ACCESS ADDED | PUNCHOUT ACCESS | WEST PRESS | | |
| 3:34 PM | NEIL | PUNCHOUT ACCESS ADDED | PUNCHOUT ACCESS | IKON OFFICE PRODUCTS | | |
| 7:49 AM | CHRISTINE | MODIFIED | PERMISSIONS : CART/REQUISITION | MODIFY PO | VALUE | FALSE (INHERITED) FALSE |
| 7:49 AM | CHRISTINE | MODIFIED | PERMISSIONS : CART/REQUISITION | CLAUSES IN PR/PO WITHDRAW PR | VALUE | FALSE (INHERITED) FALSE |
| 7:49 AM | CHRISTINE | MODIFIED | PERMISSIONS : CART/REQUISITION | BYPASS REVIEW | VALUE | FALSE (INHERITED) FALSE |
| 7:49 AM | CHRISTINE | MODIFIED | PERMISSIONS : CART/REQUISITION | ALLOW EDITING OF TAX, SHIPPING, AND HANDLING | VALUE | FALSE (INHERITED) FALSE |
| 7:49 AM | CHRISTINE | MODIFIED | PERMISSIONS : CART/REQUISITION | LINE-LEVEL EXTERNAL ATTACHMENTS | VALUE | FALSE (INHERITED) FALSE |
| 7:49 AM | CHRISTINE | MODIFIED | PERMISSIONS : CART/REQUISITION | VIEW SENSITIVE CREDIT CARD DETAILS | VALUE | FALSE (INHERITED) FALSE |
| 7:49 AM | CHRISTINE | MODIFIED | PERMISSIONS : CART/REQUISITION | SELECT CREDIT CARD FROM PROFILE | VALUE | FALSE (INHERITED) FALSE |
| 7:49 AM | CHRISTINE | MODIFIED | PERMISSIONS : CART/REQUISITION | MANUALLY OVERRIDE PRICING | VALUE | FALSE (INHERITED) FALSE |
| 7:49 AM | CHRISTINE | MODIFIED | PERMISSIONS : CART/REQUISITION | EDIT CREDIT CARD PO NUMBER | VALUE | FALSE (INHERITED) FALSE |
| 7:49 AM | CHRISTINE | MODIFIED | PERMISSIONS : CART/REQUISITION | EDIT PO NUMBER | VALUE | FALSE (INHERITED) FALSE |
| 7:49 AM | CHRISTINE | MODIFIED | PERMISSIONS : CART/REQUISITION | EDIT USER'S CART ASSIGNEES | VALUE | FALSE (INHERITED) FALSE |
| 7:49 AM | CHRISTINE | MODIFIED | PERMISSIONS : CART/REQUISITION | ASSIGN CART TO ANOTHER USER | VALUE | FALSE (INHERITED) FALSE |
| 7:49 AM | CHRISTINE | MODIFIED | PERMISSIONS : CART/REQUISITION | DO NOT PERMIT PLACE ORDER | VALUE | FALSE (INHERITED) FALSE |

RESULTS PER PAGE 20 ☐                                   ◁PAGE 1 ☐ OF 11▷

| | | | | | PROFILE \| LOGOUT | | | GO |
|---|---|---|---|---|---|---|---|---|
| Weet Organization | MY PROFILE | | | | | 6 ITEM(S) | | |
| HOME \| MY FAVORITES \| PRODUCT SEARCH \| CARTS \| APPROVALS \| HISTORY | | | | | | SEARCH FOR SUPPLIER PROFILE ▷ | | |
| | | 520 | | | | | PROFILE ▷ | ? |
| USER SETTINGS \| PURCHASING \| PERMISSIONS \| MATERIALS MGT \| HISTORY | | | | | | | CHANGE PASSWORD | |
| CUSTOM FIELDS \| FINANCIAL APPROVERS \| PURCHASING/APPROVAL LIMITS \| ADDRESSES \| PRODUCT VIEWS \| PUNCHOUT ACCESS | | | | | | | | ? |
| 520a | 520b | 520c | | 520d | 520e | 520f | | |

| LIMIT | VALUE | OVERRIDE ROLE |
|---|---|---|
| REQUISITION LIMIT | 100 | ☐ |
| REQUISITION LINE ITEM LIMIT | 50 | ☐ |
| REQUISITION APPROVAL LIMIT | 200 | ☐ |
| REQUISITION LINE ITEM APPROVAL LIMIT | 100 | ☐ |
| PURCHASE ORDER LIMIT | 0 | ☐ |
| PURCHASE ORDER LINE ITEM LIMIT | 0 | ☐ |
| PURCHASE ORDER APPROVAL LIMIT | 0 | ☐ |
| PURCHASE ORDER LINE ITEM APPROVAL LIMIT | 0 | ☐ |
| LIMITED PURCHASE ORDER LIMIT | 0 | |
| LINE ITEM LIMITED PURCHASE ORDER LIMIT | 0 | |

SAVE

*FIG. 5E*

| | PROFILE | LOGOUT | | | | | | 6 ITEM(S) | GO |
|---|---|---|---|---|---|---|---|---|---|
| HOME | MY FAVORITES | PRODUCT SEARCH | CARTS | APPROVALS | HISTORY | SETTLEMENT | | SEARCH FOR SUPPLIER PROFILE ▷ | |
| USER SETTINGS | PURCHASING | PERMISSIONS | MATERIALS MGT | HISTORY | | | | PROFILE ▷ | |
| | 520 | | | | | | | CHANGE PASSWORD | |

CUSTOM FIELDS | FINANCIAL APPROVERS | PURCHASING/APPROVAL LIMITS | ADDRESSES | PRODUCT VIEWS | PUNCHOUT ACCESS |

520a  520b  520c  520d  520e  520f

| SUPPLIER | AVAILABLE | OVERRIDE ROLE | | SUPPLIER | AVAILABLE | OVERRIDE ROLE |
|---|---|---|---|---|---|---|
| MRO/FACILITIES | | | | FURNITURE | | |
| GRAINGER, INC. | ✗ | ☐ | | OM WORKSPACE | ✓ | ☐ |
| BOOKS | | | | ONE WORKPLACE | ✗ | ☐ |
| AMAZON.COM | ✗ | ☐ | | STEELCASE OFFICE FURNITURE | ✓ | ☐ |
| LAB SUPPLIES | | | | OFFICE/COMPUTER | | |
| APPLIED BIOSYSTEMS | ✗ | ☐ | | CANNON IV, INC. | ✗ | ☐ |
| FISHER SCIENTIFIC | ✓ | ☐ | | CDW | ✓ | ☐ |
| INVITROGEN | ✓ | ☐ | | CORPORATE EXPRESS | ✓ | ☐ |
| KRACKELER SCIENTIFIC, INC. | ✓ | ☐ | | DELL | ✓ | ☐ |
| SCIQUEST, INC. | ✗ | ☐ | | HEWLETT-PACKARD COMPANY | ✗ | ☐ |
| SIGMA-ALDRICH | ✓ | ☐ | | INSIGHT | ✓ | ☐ |
| VINIMAYA | ✗ | ☐ | | OFFICE DEPOT | ✓ | ☐ |
| VWR INTERNATIONAL | ✓ | ☐ | | STAPLES | ✗ | ☐ |
| | | | | SUM MICROSYSTEMS | | ☐ |

SAVE

| | | PROFILE | LOGOUT | | | | 6 ITEM(S) | | GO |
|---|---|---|---|---|---|---|---|---|---|

MY PROFILE  SEARCH FOR |SUPPLIER PROFILE ▷|

| HOME | MY FAVORITES | PRODUCT SEARCH | CARTS | APPROVALS | HISTORY | SETTLEMENT | PROFILE ▷ |

CHANGE PASSWORD

USER SETTINGS  PURCHASING  PERMISSIONS  MATERIALS MGT  HISTORY
SHOPPING/CART | ORDERS | APPROVALS | ACCOUNTS PAYABLE | ADMINISTRATION | MATERIALS MGT | CUSTOM FIELDS PERMISSIONS

530

| PERMISSION | VALUE | OVERRIDE ROLE |
|---|---|---|
| BUDGET | | |
| VIEW BUDGET DETAILS | ✗ | ☐ |
| CREATE/EDIT BUDGET DETAILS | ✗ | ☐ |

| PERMISSION | VALUE | OVERRIDE ROLE |
|---|---|---|
| SETTLEMENT MANAGER | | |
| CREATE/VIEW RECIEPTS | ✓ | ☐ |
| ENABLE BLIND RECEIVING - (HIDE ORDER QUANTITY DURING RECEIVING) | ✗ | ☐ |
| VIEW INVOICES | ✓ | ☐ |
| CREATE/EDIT INVOICES | ✓ | ☐ |
| SET INVOICE AS PAYABLE | ✓ | ☐ |
| SET INVOICE AS PAID | ✓ | ☐ |
| MATCH DOCUMENTS WITHIN TOLERENCES | ✗ | ☐ |
| FORCE MATCH DOCUMENTS | ✗ | ☐ |
| UNMATCH DOCUMENTS | ✗ | ☐ |
| RESEND INVOICES TO EXTERNAL SYSTEM | ✗ | ☐ |

SAVE

| EQUIPMENT TAB | | | | | REQUISITION TYPE | | | | |
|---|---|---|---|---|---|---|---|---|---|
| VIEW PERSONAL LIST | ✓ | ☐ | ☐ | ☐ | VIEW PERSONAL LIST | ✓ | ☐ | ☐ | ☐ |
| EDIT PERSONAL LIST | ✓ | ☐ | ☐ | ☐ | EDIT PERSONAL LIST | ✓ | ☐ | ☐ | ☐ |
| VIEW ORGANIZATION VALUES | ✓ | ☐ | ☐ | ☐ | VIEW ORGANIZATION VALUES | ✓ | ☐ | ☐ | ☐ |
| CREATE VALUES FOR PERSONAL LIST | ✓ | ☐ | ☐ | ☐ | CREATE VALUES FOR PERSONAL LIST | ✓ | ☐ | ☐ | ☐ |
| FUND/GRANT (BG/DYN) | | | | | SEARCHABLE CUSTOM FIELD VALUES (51) | | | | |
| VIEW PERSONAL LIST | ✓ | ☐ | ☐ | ☐ | VIEW PERSONAL LIST | ✓ | ☐ | ☐ | ☐ |
| EDIT PERSONAL LIST | ✓ | ☐ | ☐ | ☐ | EDIT PERSONAL LIST | ✓ | ☐ | ☐ | ☐ |
| VIEW ORGANIZATION VALUES | ✓ | ☐ | ☐ | ☐ | VIEW ORGANIZATION VALUES | ✓ | ☐ | ☐ | ☐ |
| CREATE VALUES FOR PERSONAL LIST | ✓ | ☐ | ☐ | ☐ | CREATE VALUES FOR PERSONAL LIST | ✓ | ☐ | ☐ | ☐ |
| LOCATION | | | | | SERVICE REQUEST | | | | |
| VIEW PERSONAL LIST | ✓ | ☐ | ☐ | ☐ | VIEW PERSONAL LIST | ✗ | ☐ | ☐ | ☐ |
| EDIT PERSONAL LIST | ✓ | ☐ | ☐ | ☐ | EDIT PERSONAL LIST | ✗ | ☐ | ☐ | ☐ |
| VIEW ORGANIZATION VALUES | ✓ | ☐ | ☐ | ☐ | VIEW ORGANIZATION VALUES | ✗ | ☐ | ☐ | ☐ |
| CREATE VALUES FOR PERSONAL LIST | ✓ | ☐ | ☐ | ☐ | CREATE VALUES FOR PERSONAL LIST | ✗ | ☐ | ☐ | ☐ |
| ORGANIZATION (SB) | | | | | SERVICE REQUEST? | | | | |
| VIEW PERSONAL LIST | ✓ | ☐ | ☐ | ☐ | VIEW PERSONAL LIST | ✗ | ☐ | ☐ | ☐ |
| EDIT PERSONAL LIST | ✓ | ☐ | ☐ | ☐ | EDIT PERSONAL LIST | ✗ | ☐ | ☐ | ☐ |
| VIEW ORGANIZATION VALUES | ✓ | ☐ | ☐ | ☐ | VIEW ORGANIZATION VALUES | ✗ | ☐ | ☐ | ☐ |
| CREATE VALUES FOR PERSONAL LIST | ✓ | ☐ | ☐ | ☐ | CREATE VALUES FOR PERSONAL LIST | ✗ | ☐ | ☐ | ☐ |

[SAVE]

| HOME | MY FAVORITES | PRODUCT SEARCH | CARTS | APPROVALS | HISTORY | PROFILE | LOGOUT |

QUICK ORDER - ALL

SEARCH TOOLS | MY FAVORITES

SEARCH FOR SUPPLIER PROFILE ▽ | 6 ITEM(S)
SETTLEMENT | MORE >>

FAVORITES | QUICK ORDER | PRODUCT SEARCH | FORMS

QUICK ORDER HELP

QUICK ORDER IS A QUICK AND EASY WAY TO ADD ITEMS TO THE SHOPPING CART WHEN THE CATALOG NUMBER OR SKU IS KNOWN. QUICK ORDER SEARCHES BOTH THE SUPPLIER AND MANUFACTURER (WHERE PROVIDED BY THE SUPPLIER) CATALOG NUMBERS.

TO USE QUICK ORDER SELECT THE APPROPRIATE CATEGORY (ALL IF NOT KNOWN), ENTER THE CATALOG NUMBER(S), AND HIT THE [ENTER] KEY OF SELECT THE ADD TO CURRENT CART BUTTON. IF THE CATALOG NUMBER IS UNIQUE, i.e., THERE IS ONLY ONE PRODUCT WITH THAT CATALOG NUMBER, THE PRODUCT IS AUTOMATICALLY ADDED TO THE CART. INFORMATION FOR AUTOMATICALLY ADDED PRODUCT(s) APPEARS ON THE LEFT SIDE OF THE SCREEN.

IF THE CATALOG NUMBER ENTERED IS NOT UNIQUE, i.e., MORE THAN ONE PRODUCT HAS THE ENTERED CATALOG NUMBER, A LINK FOR SEARCH IS PRESENTED. SELECT THIS LINK TO SEE ALL THE ITEMS MATCHING THE ENTERED CATALOG NUMBER.

IF NO PRODUCTS ARE FOUND FOR THE ENTERED CATALOG NUMBER, A LINK TO THE NON-CATALOG FORM APPEARS. SELECT THIS LINK TO CREATE A NON-CATALOG REQUEST FOR THIS CATALOG NUMBER.

IF THE EXACT CATALOG NUMBER IS NOT KNOWN, SELECT THE INCLUDE SIMILAR TERMS CHECKBOX. THE SEARCH ENGINE WILL TRY TO FIND PRODUCTS WITH CATALOG NUMBERS THAT ARE SIMILAR TO THE ONE ENTERED. SELECTING THIS CHECK BOX IS "REMEMBERED" BY THE SYSTEM FOR ALL FUTURE SEARCHES, AND IT MUST BE EXPLICITLY TURNED OFF TO DISABLE THIS TYPE OF SEARCHING.

CATEGORIES
- ALL
- LAB SUPPLIES
- ANTIBODIES
- OFFICE / COMPUTER
- MRO / FACILITIES
- FURNITURE
- SERVICES
- MANUFACTURING
- BOOKS
- ELECTRONICS
- SPECIALTY
- FOOD / FOOD EQUIPMENT
- SUPPLIES MANAGER

NON-CATALOG ITEM

QUICK ORDER SEARCH   830

CATALOG NO. (SKU)
CATALOG NO. (SKU)
CATALOG NO. (SKU)
CATALOG NO. (SKU)
CATALOG NO. (SKU)

☐ INCLUDE SIMILAR TERMS

[ADD TO ACTIVE CART]

FIG. 8B

| HOME | MY FAVORITES | PRODUCT SEARCH | CARTS | APPROVALS | HISTORY | SETTLEMENT | MORE >> |

PROFILE | LOGOUT
BROWSE BY CATEGORY
SEARCH FOR SUPPLIER PROFILE
6 ITEM(S)

SEARCH TOOLS | MY FAVORITES

CATEGORIES

CATEGORY SEARCH > FURNITURE > FURNITURE AND FURNISHINGS > ACCOMMODATION FURNITURE > OUTDOOR FURNITURE

- LAB SUPPLIES
- OFFICE COMPUTER
- MRO / FACILITIES
- FURNITURE
  - FURNITURE AND FURNISHINGS  VIEW (INCL. SUB-CATEGORIES)
    - ACCOMMODATION FURNITURE  VIEW (INCL. SUB-CATOGORIES)
      - BABY AND TODDLER FURNITURE AND ACCESSORIES  VIEW (INCL. SUB-CATEGORIES)
      - FURNITURE  VIEW (INCL. SUB-CATEGORIES)
      - GENERAL FURNITURE PARTS AND ACCESSORIES  VIEW (INCL. SUB-CATEGORIES)
      - OFFICE FURNITURE  VIEW (INCL. SUB-CATEGORIES)
      - OUTDOOR FURNITURE  VIEW (INCL. SUB-CATORIES)
        - BICYCLE RACKS  VIEW
        - FLOWER STANDS  VIEW
        - OUTDOOR BENCHES  VIEW
        - OUTDOOR CHAIRS  VIEW
        - OUTDOOR SWINGS  VIEW
        - OUTDOOR TABLE OR PICNIC TABLES  VIEW
        - OUTDOOR UMBRELLAS  VIEW
        - OUTDOOR CLOTHES DRYER  VIEW
    - CLASSROOM AND INSTRUCTIONAL AND INSTITUTIONAL FURNITURE AND FIXTURES  VIEW (INCL. SUB-CATEGORIES)
    - COMMERCIAL AND INDUSTRIAL FURNITURE  VIEW (INCL. SUB-CATEGORIES)
  - INFORMATION TECHNOLOGY BROADCASTING AND TELECOMMUNICATIONS  VIEW (INCL. SUB-CATEGORIES)
  - PRINTING AND PHOTOGRAPHIC AND AUDIO AND VISUAL EQUIPMENT AND SUPPLIES  VIEW (INCL. SUB-CATEGORIES)
  - SERVICE INDUSTRY MACHINERY AND EQUIPMENT AND SUPPLIES  VIEW (INCL. SUB-CATOGORIES)
  - STRUCTURES AND BUILDING AND CONSTRUCTION AND MANUFACTURING COMPONENTS AND SUPPLIES  VIEW (INCL. SUB-CATOGORIES)
- SERVICES
- MANUFACTURING
- BOOKS
- ELECTRONICS
- SPECIALTY
- FOOD/FOOD EQUIPMENT
- SUPPLIES MANAGER

```
PROFILE | LOGOUT                                                              | 6 ITEM(S) |
PRICING - PRICE SETS                              SEARCH FOR  SUPPLIER PROFILE □
HOME | MY FAVORITES | PRODUCT SEARCH | CARTS | APPROVALS | HISTORY | SETTLEMENT | CATALOG MGT □
SUPPLIERS | CATEGORIES | SUPPLIER CLASSES | CATEGORY CLASSES | PRODUCT VIEWS | PRICING | MAP ATTRIBUTES | CONSORTIUM MGT | ENABLEMENT   ?

| PRICE SETS | SCIENCE CATALOG   PRICE REVIEW FILES |
```

-PRICE SET SEARCH
SUPPLIER NAME/ID:
PRICE SET TYPE:                               ┌─960─┐           ┌─970─┐
PRICE SET VERSION STATUS:                     | ALL |           | SEARCH FOR SUPPLIER |
SHOW AUDIT HISTORY OF PRICE SETS: □           | NOT REVIEWED |
                                              [ SEARCH ]

PRICE SET VERSIONS BECOME EFFECTIVE IMMEDIATELY UPON APPROVAL. NEW PRODUCTS REQUIRE A SEARCH LOAD BEFORE THEY BECOME VIEWABLE. SEARCH LOADS ARE DONE MONDAY THROUGH FRIDAY EVENINGS.

-HIDE PRICE SET DETAILS                                           APPROVE SELECTED PRICE SET VERSIONS □ [GO]

PRICE SETS
RESULTS PER PAGE [50]          TOTAL NUMBER OF RESULTS FOUND: 9                                              ◁ PAGE [1] OF 1 ▷ ?

| SUPPLIER △ | SET NAME | | | | | | | | | |
|---|---|---|---|---|---|---|---|---|---|---|
| AMERSHAM BIOSCIENCES INC. - DO NOT TOUCH | ORGANIZATION PRICE | | | | | USD | NO CONTRACT | ORGANIZATION | NOT REVIEWED | |
| VERSION | NOTE | DATE AVAILABLE | REVIEWED BY... | DATE REVIEWED | CURRENCY | CONTRACT | COMMENTS | PRICE SET TYPE | STATUS | EDIT... SELECT |
| 4 | GE_HEALTHCARE_BIO_SCIENCE_WEE... MORE... | 6:37 PM | | | | | | | NOT REVIEWED | EDIT... □ |
| 3 | CURRENT-1 | 8:37 PM | BOB TRAUB | 7:23 AM | | | | | APPROVED | SELECT □ |
| CORPORATE EXPRESS | ORGANIZATION PRICE | | | | USD | NO CONTRACT | | ORGANIZATION | NOT REVIEWED | |
| VERSION | NOTE | DATE AVAILABLE | REVIEWED BY... | DATE REVIEWED | CURRENCY | CONTRACT | COMMENTS | PRICE SET TYPE | STATUS | EDIT... SELECT |
| 1 | CORPORATE_EXPRESS_WEET_102560... MORE... | 7:06 AM | | | | | | | NOT REVIEWED | EDIT... □ |
| 0 | | 11:19 PM | | | | | | | IMPLICITLY APPROVED | SELECT □ |
| DEMO STOCKROOM | ORGANIZATION PRICE | | | | USD | NO CONTRACT | | ORGANIZATION | NOT REVIEWED | |
| VERSION | NOTE | DATE AVAILABLE | REVIEWED BY... | DATE REVIEWED | CURRENCY | CONTRACT | COMMENTS | PRICE SET TYPE | STATUS | EDIT... SELECT |
| 3 | | 8:46 AM | | | | | | | NOT REVIEWED | EDIT... □ |
| 2 | | 5:38 AM | BOB TRAUB | 7:08 AM | | | | | APPROVED | SELECT □ |

| GRAINGER, INC. | | ORGANIZATION PRICE | | | USD | NO CONTRACT | ORGANIZATION | | EDIT... |
|---|---|---|---|---|---|---|---|---|---|
| VERSION | NOTE | DATE AVAILABLE | REVIEWED BY... | DATE REVIEWED | DATE EFFECTIVE | COMMENTS | ORGANIZATION | STATUS | SELECT |
| 1 | GRAINGER_WEET_102410.CSV WAS T...MORE... | 6:15 PM | | | | | | NOT REVIEWED | ☐ |
| 0 | | 7:05 PM | | | | | | IMPLICITLY APPROVED | ☐ |
| MATRIX TECHNOLOGIES | | ORGANIZATION PRICE | | | USD | NO CONTRACT | ORGANIZATION | | EDIT... |
| VERSION | NOTE | DATE AVAILABLE | REVIEWED BY... | DATE REVIEWED | DATE EFFECTIVE | COMMENTS | ORGANIZATION | STATUS | SELECT |
| 1 | | 12:29 AM | | | | PRICING UPDATE | | NOT REVIEWED | ☐ |
| 0 | | 11:19 PM | | | | | | IMPLICITLY APPROVED | ☐ |
| OFFICE MAX | | ORGANIZATION PRICE | | | USD | NO CONTRACT | ORGANIZATION | | EDIT... |
| VERSION | NOTE | DATE AVAILABLE | REVIEWED BY... | DATE REVIEWED | DATE EFFECTIVE | COMMENTS | ORGANIZATION | STATUS | SELECT |
| 1 | OFFICE_MAX_CONTRACT_WEET_10239... MORE... | 11:27 AM | | | | | | NOT REVIEWED | ☐ |
| 0 | | 11:19 PM | | | | | | IMPLICITLY APPROVED | ☐ |
| SCIQUEST, INC | | ORGANIZATION PRICE | | | USD | NO CONTRACT | ORGANIZATION | | EDIT... |
| VERSION | NOTE | DATE AVAILABLE | REVIEWED BY... | DATE REVIEWED | DATE EFFECTIVE | COMMENTS | ORGANIZATION | STATUS | SELECT |
| 6 | | 11:28 AM | | | | | | NOT REVIEWED | ☐ |
| 5 | | 7:46 AM | | | IMPORTING NON-ERRORED ROWS | | | NOT REVIEWED | ☐ |
| 4 | | 7:39 AM | | | | | | NOT REVIEWED | ☐ |
| 3 | | 10:20 AM | | | | | | NOT REVIEWED | ☐ |
| 2 | | 11:40 AM | | | | | | NOT REVIEWED | ☐ |
| 1 | | 11:40 AM | | | | | | NOT REVIEWED | ☐ |
| 0 | | 7:44 AM | | | | | | NOT REVIEWED | ☐ |

| | PROFILE | LOGOUT | | | | 6 ITEM(S) |
|---|---|---|---|---|---|---|
| | CONTRACT SEARCH | | | SEARCH FOR | SUPPLIER PROFILE ▽ | GO |
| HOME | MY FAVORITES | PRODUCT SEARCH | CARTS | APPROVALS | HISTORY | SETTLEMENT | CONTRACTS ▽ |

CONTRACTS |

- SEARCH FOR CONTRACTS

CONTRACT NUMBER
CONTRACT KEYWORD
SUPPLIER / CATALOG NAME

[SELECT SUPPLIER]

[SEARCH]

SHOW ASSOCIATED ORGANIZATION FORMS

CONTRACT SEARCH RESULTS
NUMBER OF CONTRACTS FOUND: 6

RESULTS PER PAGE [10]  ◁PAGE [1] OF 1 ▷

| CONTRACT NO. △ | RENEWAL NO. △ | SUPPLIER NAME △ | CONTRACT NAME △ | EFFECTIVE DATA △ | EXPIRATION DATE △ | ACTIVE △ |
|---|---|---|---|---|---|---|
| 12-121222 | 0 | JOE'S LIMO SERVICES | JOE'S LIMO SERVICES | | | ✓ |
| 123865 | 0 | FISHER SCIENTIFIC | FIRST CONTRACT | | | ✓ |
| LS-1221 | 0 | BALLARO ENTERPRISES | LIMO SERVICES | | | ✓ |
| MTH38383 | 0 | QIAGEN, INC. | QIAGEN -MATH DEPT | | | ✓ |
| Q-324243 | 0 | QIAGEN, INC. | QIAGEN - ORGANIZATION WIDE | | | ✓ |
| Q98473 | 0 | QIAGEN, INC. | QIAGEN - PURCHASING DEPT. | | | |

RESULTS PER PAGE [10]  NUMBER OF CONTRACTS FOUND: 6  ◁PAGE [1] OF 1 ▷

| HEWLETT-PACKARD COMPANY MORE INFO... | | | | | | | |
|---|---|---|---|---|---|---|---|
| | CONTRACT PO NUMBER QUOTE NUMBER | NO VALUE TO BE ASSIGNED | | | | | |

THE ITEMS WERE RETRIEVED FROM AN EXTERNAL SUPPLIER SITE, THEREFORE YOUR ABILITY TO EDIT OR VIEW THE ITEMS IN THIS APPLICATION MAY BE LIMITED. CLICK THIS MESSAGE FOR MORE DETAILS.
THE FOLLOWING LINES CANNOT BE ACCESSED ON THE SUPPLIER'S WEBSITE. CLICK THIS MESSAGE FOR MORE DETAILS. LINE(S): 5
ADD NON-CATALOG ITEM FOR THIS SUPPLIER...

| | PRODUCT DESCRIPTION | CATALOG NO | SIZE / PACKAGING | UNIT PRICE | QUANTITY | EXT. PRICE | |
|---|---|---|---|---|---|---|---|
| 5 | HP COMPAQ TC4400 TABLET PC ◇ MORE INFO... | EN358UA#ABA | EA | 2,099.00 | 1 EACH | 2,099.00 | ☐ ☐ |
| | | | SUPPLIER SUBTOTAL | | | 2,099.00 USD | |

| S.P. RICHARDS CO. MORE INFO... | | | | | | | |
|---|---|---|---|---|---|---|---|
| | CONTRACT PO NUMBER QUOTE NUMBER | NO VALUE TO BE ASSIGNED | | | | | |

ADD NON-CATALOG ITEM FOR THIS SUPLIER...

| | PRODUCT DESCRIPTION | CATALOG NO | SIZE / PACKAGING | UNIT PRICE | QUANTITY | EXT. PRICE | |
|---|---|---|---|---|---|---|---|
| 6 | LAPTOP BACKPACK WITH HANDLE, 13-1/2in.W x 7in.D, x 17-1/2INin.H BLACK 🔍 MORE INFO... | CCS55121 | EA | 9.99 | 1 EACH | 9.99 | ☐ ☐ |
| | | | SUPPLIER SUBTOTAL | | | 19.98 USD | |

SHIPPING, HANDLING, AND TAX CHARGES ARE CALCULATED AND CHARGED BY EACH SUPPLIER.
THE VALUES SHOWN HERE ARE FOR ESTIMATION PURPOSES, BUDGET CHECKING, AND WORKFLOW APPROVALS.

| | |
|---|---|
| SUBTOTAL | 2,148.95 |
| TAX1 | 0.00 |
| TAX2 | 0.00 |
| SHIPPING | 0.00 |
| HANDLING | 0.00 |
| TOTAL | 2,148.95 USD |

[SAVE]   SEE CONFIGURATION FOR THIS REQUISITION

MANUFACTURER PART NUMBER  CCS55121
UNSPSC:                    43-21-16-00    COMMODITY CODE        MISCELLANEOUS
MORE INFO...                              REPLENISH STOCK        X

EXTERNAL NOTE                 NO NOTE
ATTACHMENTS FOR SUPPLIER
  ADD ATTACHMENT...
PO CLAUSES
  NO CLAUSE

SUPPLIER SUBTOTAL     9.99
TAX1                  0.00
TAX2                  0.00
SHIPPING              0.00
HANDLING              0.00
SUPPLIER TOTAL        9.99 USD

SHIPPING, HANDLING, AND TAX CHARGES ARE CALCULATED AND CHARGED BY EACH SUPPLIER. THE VALUES SHOWN HERE ARE FOR ESTIMATION PURPOSES, BUDGET CHECKING, AND WORKFLOW APPROVALS.

SUBTOTAL      2,148.95
TAX1              0.00
TAX2              0.00
SHIPPING          0.00
HANDLING          0.00
TOTAL         2,148.95 USD

SEE CONFIGURATION FOR THIS REQUISITION

PO STATUS FILTERS

INCLUDE PO'S WITH ANY OF THESE STATUSES
— SHOW ALL —

ONLY INCLUDE PO'S WITH THESE STATUSES
— SHOW ALL —

SEARCH

PO DEPARTMENTS
— WORKFLOW —
PENDING
REJECTED
PARTIALLY REJECTED
COMPLETE
— SUPPLIER —
SENT TO SUPPLIER
SUPPLIER PROCESSING
CANCELLED
PARTIALLY SHIPPED
FULLY SHIPPED
OVER SHIPPED
— RECEIPT —
PARTIALLY RECEIVED
FULLY RECEIVED
OVER RECEIVED
— INVOICE —
PARTIALLY INVOICED
FULLY INVOICED
OVER INVOICED
— MATCHING —
PARTIALLY MATCHED
FULLY MATCHED
NO MATCHES
— A/P STATUS —
OPEN
CLOSED

PO STATUS
NO INVOICES
NO RECEIPTS
REQUIRES RECEIPTS
NO SHIPMENTS
WITH CREDITS
WITH RETURNS
WITH CANCELLATION
WITH BACKORDERS
WITH SUPPLIER MODIFICATIONS
WITH FORCED MATCHES

METHOD, MEDIUM, AND SYSTEM FOR PROCESSING REQUISITIONS

RELATED APPLICATIONS

This application is related to U.S. patent application Ser. No. 10/318,814, filed Dec. 13, 2002, now U.S. Pat. No. 6,944,613 entitled "Method and System for Creating a Database and Searching the Database for Allowing Multiple Customized Views" issued on Sep. 13, 2005, which is incorporated herein by reference.

FIELD OF INVENTION

The present invention relates generally to the field of procurement and, in particular, to a system and method for customized searching, procurement, data modeling, and order processing over a network using a single instance system that supports multi-tenants in a multi-business to multi-consumer type environment.

BACKGROUND OF INVENTION

Current e-commerce systems and methods provide consumers and businesses the ability to browse product lines and consummate sales transactions. However, current e-commerce systems do not allow for easy customization of the needed functionality to facilitate the transaction. While current systems can be customized for a specific business or customer, the customization is a time consuming and complicated task. These customizations must generally be hard coded into the application by the developers, thereby incurring increases in costs, delay in implementation, and loss of productivity. In the field of procurement, for example, an organization in need of a product or service generally has contractual relationships with multiple vendors to provide the desired product or service. The contractual relationship may define such terms as price, lot size, form of delivery, amount of discount, and other business rules. These rules may become complex as one term may influence other terms, such as different levels of discounts based on the number of items ordered.

Procurement systems also generally require order authorization from a procurement officer of the organization or someone in charge of reviewing the orders for compliance with internal policies of the organization, in addition to the contractual relationships with the vendors. These orders must be processed and tracked as the orders progress through the approval process such that the individuals placing orders are notified of whether the order was approved or denied, as well as for internal audit purposes. Therefore, there is a need for a system and method that can provide an efficient and simple procurement process that is easily customizable for multiple organizations and multiple vendors with simple and complex business terms, and can also provide a single point-of-access for both businesses and consumers to interface, interact, and implement and execute transactions, in accordance with existing or newly defined relationships, using a custom and configurable methodology for realizing their requirements.

SUMMARY OF THE INVENTION

Accordingly, the present invention is directed to a procurement system and method over a network using a single instance multi-tenant architecture that substantially obviates one or more problems due to limitations and disadvantages of the related art.

An object of the present invention is to provide a system and method that can provide an efficient and simple procurement process that is easily customizable for multiple organizations and multiple vendors with simple and complex business terms, and can also provide a single point-of-access for both businesses and consumers to interface, interact, and implement and execute transactions, in accordance with existing or newly defined relationships, using a custom and configurable methodology for realizing their requirements.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a single instance, multi-tenant procurement system includes an access module to provide access to a plurality of end users associated with an organization to their respective accounts, each account being customized by a super user of the organization, a search engine to execute searches for products offered by one or more suppliers, a transaction module to process and track one or more requisitions generated by the plurality of end users, a business rules module to apply business rules established between the organization and the one or more suppliers to process the requisitions, and a data repository to store data generated on the system.

In another aspect, a method includes the steps of accessing a single instance, multi-tenant procurement system through an access module, customizing one or more end user accounts of an organization through the access module by a super user of the organization, executing searches for products offered by one or more suppliers through a search engine, processing one or more requisitions generated on the one or more end user accounts by applying business rules established between the organization and the one or more suppliers to process the requisitions, and storing generated data in a data repository.

In yet another aspect, a computer program product including a computer readable medium having stored thereon computer executable instructions that, when executed on a computer, configures the computer to perform a method including the steps of accessing a single instance, multi-tenant procurement system through an access module, customizing one or more end user accounts of an organization through the access module by a super user of the organization, executing searches for products offered by one or more suppliers through a search engine, processing one or more requisitions generated on the one or more end user accounts by applying business rules established between the organization and the one or more suppliers to process the requisitions, and storing generated data in a data repository.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings:

FIG. 5A illustrates an exemplary user setting tool in accordance with the present invention;

FIG. 5E illustrates an exemplary user purchasing tool in accordance with the present invention;

FIG. 5F illustrates an exemplary punch-out access tool in accordance with the present invention;

FIGS. 5G-5M illustrate exemplary user permission tools in accordance with the present invention;

FIGS. 5N-5O illustrate exemplary materials management tools in accordance with the present invention;

FIGS. 6A-6J illustrate exemplary organization setup tools in accordance with the present invention;

FIGS. 8A-8D illustrate exemplary search engines in accordance with the present invention;

FIGS. 9A-9F illustrate exemplary catalog management tools in accordance with the present invention;

FIG. 10 illustrates an exemplary contracts management tool in accordance with the present invention;

FIGS. 11A-D illustrates an exemplary cart and requisition tool in accordance with the present invention;

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on any type of client-server compatible system containing any type of client, network, server, and database elements.

Figure 1:
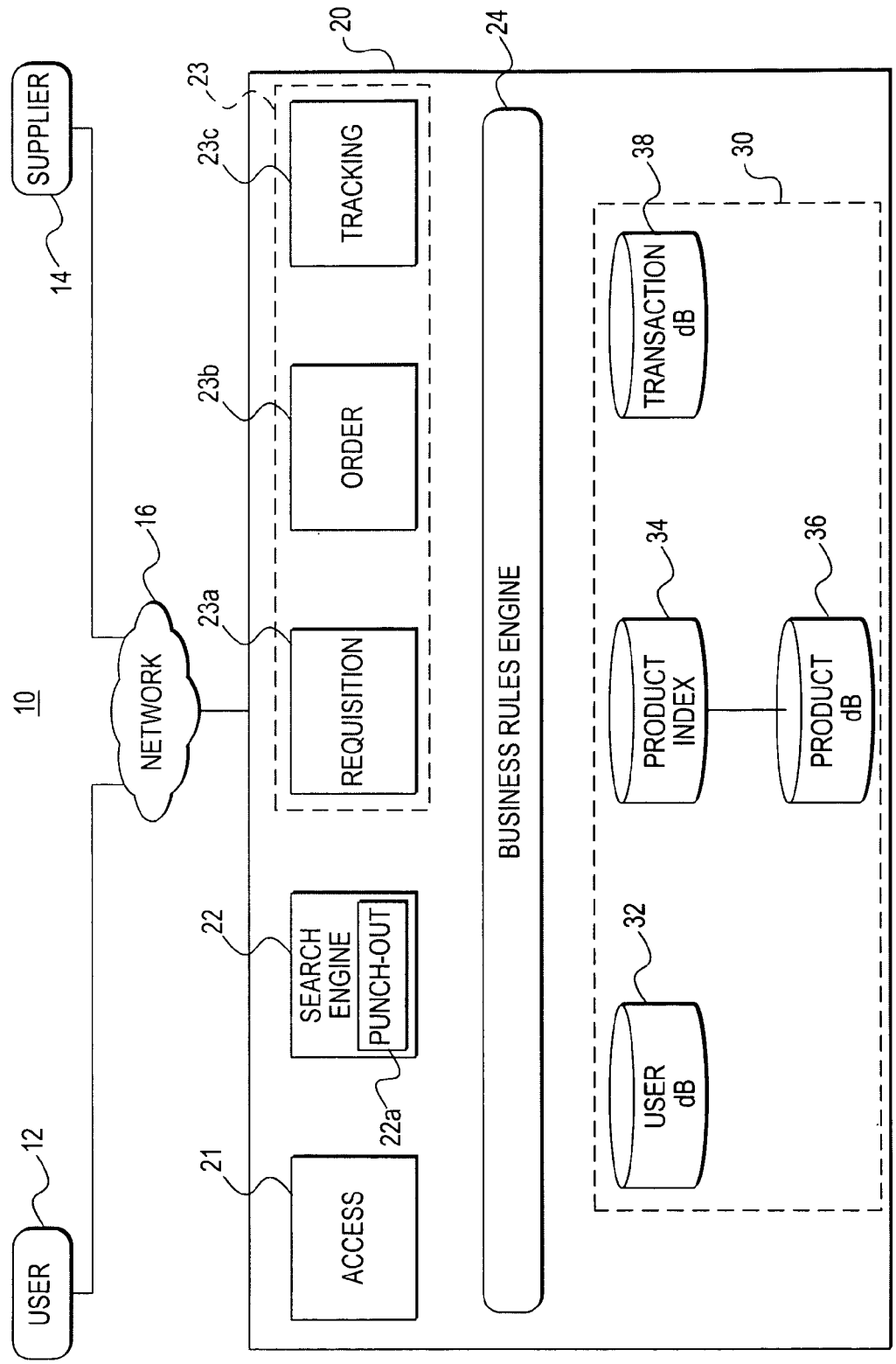
FIG. 1 is a block diagram illustrating an exemplary embodiment of an eProcurement system in accordance with the present invention.

FIG. 1 is a block diagram illustrating an exemplary embodiment of an eProcurement system in accordance with the present invention. The term "eProcurement architecture" used herein refers to a system and method that facilitates customized searching, data modeling, and order processing over an electronic network, using a client-server type architecture, where multi-tentants (e.g., end users/consumers, supplier users, etc.) can realize each of their specific business requirements with respect to the process of initiating and consummating transactions. In general, the eProcurement architecture of the present invention facilitates transactions between end users and suppliers. The end users may be individual users or members of an organization, such as a company or institution. For example, the end users may be any member of the organization authorized for performing procurement operations for the organization or the end user may be an individual of a sole proprietorship.

In a multi-person organization, procurement operations of the organization is a multi-level structure set up with a group of individuals who make requests for requisitions and an authorizing entity (e.g., manager) who approve such requests based on the organization's procurement policies. There may be a plurality of individuals assigned as the authorizing entity, and the authorizing entity may itself include multiple levels of authority with each higher level having more control over the procurement operations. The procurement policies may define the levels of authority, such as who can order what, and include one or more contractual relationships between the organization and one or more suppliers. By way of example only, the procurement policy may define that the lowest level end user of a particular department can only order certain products or services while a higher level end user can order or authorize orders of broader categories of products and/or services. In another example, the procurement policy may require that certain products or services be ordered exclusively from a supplier with an exclusive contract with the organization. As another example, the procurement policy may require that a particular product be ordered in a predetermined lot size due to a contractual discount negotiated from a particular supplier. The eProcurement architecture of the present invention facilitates transactions between multiple end users of any level of any organization with multiple suppliers taking into account the procurement policies associated with each end user and supplier on a single platform (i.e., single instance, multi-tenant architecture).

As shown in FIG. 1, the eProcurement system 10 of the present invention includes end users 12, supplier users 14, and the procurement module 20 connected over a data communications network 16. The procurement module 20 includes access module 21, search engine 22, transaction module 23, business rules module 24, and data repository 30. The data repository 30 may include one or more databases to store user data 32, hosted product index 34, product data 36, and transaction data 38.

The access module 21 allows the end users and suppliers to set up and gain access to their respective accounts in the eProcurement system 10. For example, the access module 21 may include registration/account setup procedures to create a new account on the eProcurement system 10. The access module 21 may also include authentication procedures (e.g., login ID and password) to determine the identity of the user and the user's profile (e.g., associated organization, level of access, etc.) before granting access to the procurement module 20. Once granted access, the user may configure the account for customized access. If the user is a "super user" (i.e., a user with higher levels of access, such as a procurement supervisor of an organization), the super user may set conditions for access of other users from the organization. If the user is a supplier, the supplier user may create or update the supplier account or provide/update product/service information (e.g., product catalog).

The search engine 22 allows the user to search through the hosted product index 34 to find the product and/or service provided by the one or more suppliers. In general, the search engine 22 searches through the hosted product index 34, which contains tokenized data of all the products from all the suppliers stored in the product database 36. The search results of the search are processed by the business rules module 24 and displayed to the user based on the business rules set for the user and the user's organization. The search engine 22 includes a punch-out module 22a that allows the user to "punch-out" to an unhosted supplier catalog for products/services not available through the eProcurement system 10. The user can only access those punch-out suppliers configured for him/her according to the business rules module 24.

The transaction module 23 includes requisition module 23a, order module 23b, and tracking module 23c to facilitate a transaction with one or more suppliers. The requisition module 23a processes items selected by the user from the search engine 22 and creates a requisition. If authorization is required, the requisition module 23a notifies the designated authorizing entity of the requisition to obtain authorization. If the requisition is denied, the requisition module 23a sends a notification back to the user of the decision. If the requisition is approved, the user is notified and the requisition is either sent a) to order module 23b, or b) is marked as "complete" based on the business rules engine 24 because not all requisitions are necessarily converted to orders. The order module 23b converts the requisition into a purchase order according to the business rules in the business rules module 24. The order module 23b sends the purchase order to the appropriate supplier in the proper format(s) designated for that supplier. Once the purchase order has been sent, the tracking module 23 receives confirmation of the purchase orders from the suppliers and keeps track of the purchase orders through the fulfillment process.

In general, a user (i.e., end user, super user, supplier user, etc.) gains access to the procurement module 20 through the access module 21. The access module 21 may include security measures, such as authentication (e.g., providing user ID and password), to identify the user by accessing the user data stored in the user database 32. User accounts may also be created through the access module 21. For example, a user (generally a super user) creates an account on the eProcurement system 10 by registering through the access module 21. The account may also be created by a system administrator of the eProcurement system 10 off-line and give access to the user via emailing a registration link to the access module 21. Once an account has been created, the user may access the eProcurement system 10 through the access module 21.

Figure 2:
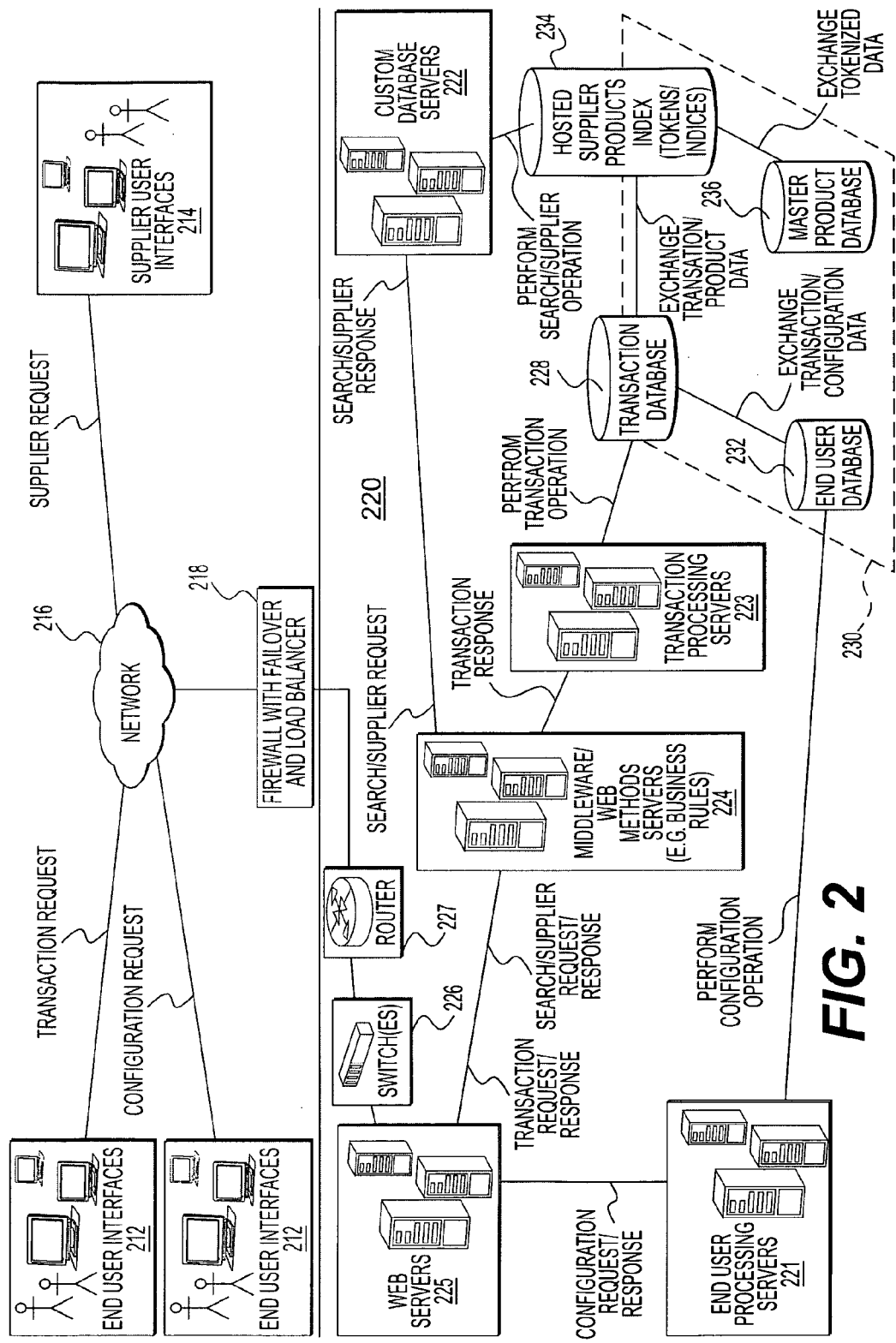
FIG. 2 illustrates an exemplary embodiment of an eProcurement architecture in accordance with the present invention.

FIG. 2 illustrates an exemplary embodiment of an eProcurement architecture in accordance with the present invention. As shown in FIG. 2, the eProcurement architecture of the present invention may include one or more end user/consumer interfaces 212 and supplier user interfaces 214, which may connect to one or more servers 220 over a wired or wireless network 216. These one or more servers 220 may be for user processing 221, product database hosting 222, transaction processing 223, middleware/web methods 224 (e.g., implementing business rules between end users and supplier users), and communication processing 225, such as streaming data/media, file hosting (e.g., FTP—File Transfer Protocol—server), web serving (e.g., HTTP/HTTPS, WWW, CGI—Common Gateway Interface, ASP—Active Server Pages, Servlets, JSP—Java Server Pages, etc.), facsimile transmission, proxy, telnet, chat, list, mail (e.g., SMTP—Simple Mail Transfer Protocol), news (e.g., NNTP—Network News Transfer Protocol), groupware, and other communication/data processing purposes. These one or more servers 220 may be hosted behind or outside a firewall 218 with or without failover and/or load balancers. These one or more servers 220 may be hosted over the Internet, within the same Intranet and/or subnet, on different Intranets and/or subnets, or in any other inter-networked configuration of network 216. The servers 220 may be implemented on Microsoft™ Windows NT/2000/XP™/XP Professional/Server™/Vista™ (e.g., Microsoft™ Internet Information Services (IIS)), Apache, Netscape Enterprise Server™, iPlanet™ Web Server, Sun Java System Web Server, Oracle™ Server, SQL Server™ (e.g., Microsoft™, Sybase™, etc.), Terradata server applications, or any other compatible server technology.

End user interfaces 212 and supplier user interfaces 214 may be implemented on Internet web browsers such as Microsoft Internet Explorer™, Netscape Navigator™, Mozilla™ Firefox™, Opera, or any other Internet web browser capable of sending and receiving data using the Hypertext Transfer Protocol (HTTP). The data may be transferred over an encrypted and authenticated communication layer (i.e., using secure HTTP, or as more commonly known, HTTPS). End user interfaces 212 and supplier user interfaces 214 may be implemented using a combination of HTML (Hypertext Markup Language), Macromedia Flash™, XML (Extensible Markup Language), CGI (Client Gateway Interface), ASP (Active Server Pages), JSP™ (JavaServer Pages), PHP (Hypertext Preprocessor), Java, C/C++, Visual Basic™, Visual Basic Script, Perl™, Tcl/Tk, SQL (Structured Query Language), and any other relevant markup/programming/scripting/query language or development environment.

Communication from the end user interfaces 212 and supplier user interfaces 214 to the server or plurality of servers 220, via the firewall 218 with failover and load balancer, may be implemented over wired communication protocols through network 216. For example, at the Wide Area Network (WAN) level or at the Local Area Network (LAN) level, routed Internet Protocol (IP) packets may be transported using the IEEE 802.3 Ethernet standard, for example, on the data link network layer. However, any network standard may be used, whether for packet encapsulation, path determination and logical addressing, or physical addressing, at any layer of these layers without departing from the scope of the invention. Also, the packet data may be transported over interconnected hubs (not shown), switches 226, routers 227, and other network elements. At the WAN level, protocols such as Packet over Synchronous Optical Network (SONET) or Synchronous Digital Hierarchy (SDH), Asynchronous Transfer Mode over SONET, Multi-protocol Label Switching (MPLS), packet over Frame Relay, or other analogous protocols may be used to deliver data over longer distances. Interconnect repeaters, multiplexers (e.g., add/drop), and cross connects may be used to facilitate and ensure accurate transmission over the long-haul from point-to-point.

Communication from the end user interface 212 and supplier user interfaces 214 to the server or plurality of servers 220, via the firewall 218 with failover and load balancer, may also be implemented over wireless communication protocols over network 216. For example, at the LAN level (i.e., WiFi), standards such as 802.11a, 802.11b, 802.11g, and 802.11n may be used to deliver data from point-to-point. Similarly, at the Metropolitan Area Network (MAN)/WAN level, standards such as 802.16e (i.e., WirelessMAN) and Universal Mobile Telecommunications System (UMTS) over Wideband Code Division Multiple Access (W-CDMA) may also be used to deliver data from point-to-point. As with the wired networks, other standards and protocols may be used without departing from the scope of the invention.

The eProcurement architecture of the present invention includes a data repository 230. The data repository 230 may be implemented using one or more databases to store end user data 232, hosted product index 234, master product data 236, and transaction data 238. The data repository 230 may be implemented using any type of data storage device without departing from the scope of the present invention. Moreover, the data repository 230 may be managed by any database platform (e.g., Oracle, Microsoft Access, etc.) without departing from the scope of the present invention.

End user interfaces 212 and supplier user interfaces 214 may also allow an implemented feature that enables the setting of user configuration preferences. This feature allows a super user, with enhanced administrative capabilities, to have full access to the features of end user and supplier user interfaces. Some of these features may include: sending an email notification of a specific requisition order, and a corresponding link for accessing the same; full access to the features of the end user and supplier user interfaces; the capability to approve or reject a full order or a specific order item requested by an end user; the capability to take ownership and/or control of a specific requisition order, which may be organized according to a product or supplier category; the capability to expedite or accelerate an order through to specific steps along the ordering process, including the final review step; and, the capability to invoke and view a summary and history of each end user's latest order activity.

Moreover, a super user, for example, may design the style, type, layout, and level of data that is displayed on the respective end user interface 212 and supplier interface 214 for their respective organizations. A super user is also able to invoke a setup feature to choose which end users may have access to specific suppliers. Furthermore, a super user may also determine what information is required from the end users and supplier users of their respective organization, and determine the level of access at which an end user may access a specific supplier within the hosted supplier products catalog. This capability enables a super user to configure whether an end user can view specific products from specific suppliers, and place orders. Moreover, the end user interface of the present invention allows for features of the present invention to be configured as permission driven. As such, certain features may be accessible to each end user, based on the end user's precedence within the organization, which likely affects his/her corresponding permission level. In addition, each feature is configurable to each end user based on a set of variable options. These variable options may include the ability to set a specific layout/view, a preferred number of search results, a preferred list of products, or a preferred list of suppliers. Also, each feature may include a help function that allows an end user to resolve inquiries or difficulties relating to the feature. The end user interface implementation is usually login-based and, as described in further detail above, may encompass multiple server types (e.g., running a Linux OS), a redundant firewall and load balancer, and a priority-based software programming architecture (e.g., implemented in JAVA and JSP).

Figure 3:
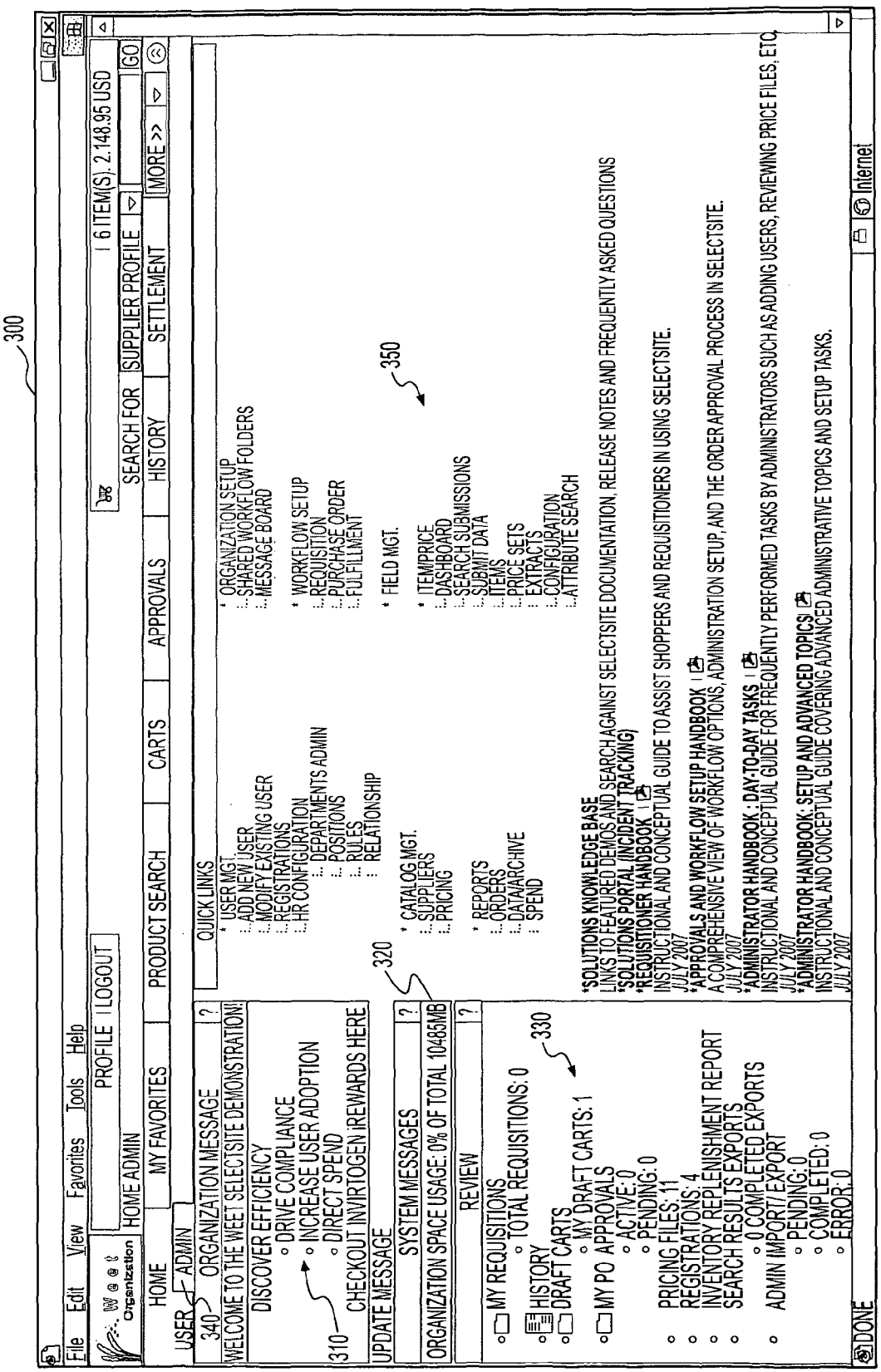
FIG. 3 illustrates an exemplary user interface in accordance with the present invention.

FIG. 3 illustrates an exemplary user interface in accordance with the present invention. For purposes of example only, an end user interface is used to describe various aspects of the present invention. As shown in FIG. 3, user interface 300 provides customized information for the user. For example, the user is a member of a fictitious group named Weet Organization. The user interface 300 includes an organizational message area 310, any system message area 320, and task items area 330. In the example shown, the user is a super user and therefore, the "Admin" tab 340 is active. Had the user been an end user, the "User" tab would be active. All of these areas and information displayed therein may be customized through the access module 21. Any configuration definitions are then stored in the user database 32 and invoked upon access.

FIG. 3 illustrates an exemplary embodiment of the configuration tools available to the super user. In general, the eProcurement system 10 of the present invention provides the super user the tools needed to configure every aspect of the eProcurement process of an organization for complete customization, thereby effectuating a single instance multi-tenant architecture. That is, the eProcurement system 10 establishes a centralized system that is customizable for each user and/or organization, thereby providing a robust and yet an efficient eProcurement system. More specifically, configuration tool 350 allows the super user to customize the configuration of the eProcurement system 10 specifically for an organization and its users. While exemplary configuration tools are shown, other tools may be included without departing from the scope of the present invention.

Figure 4A:
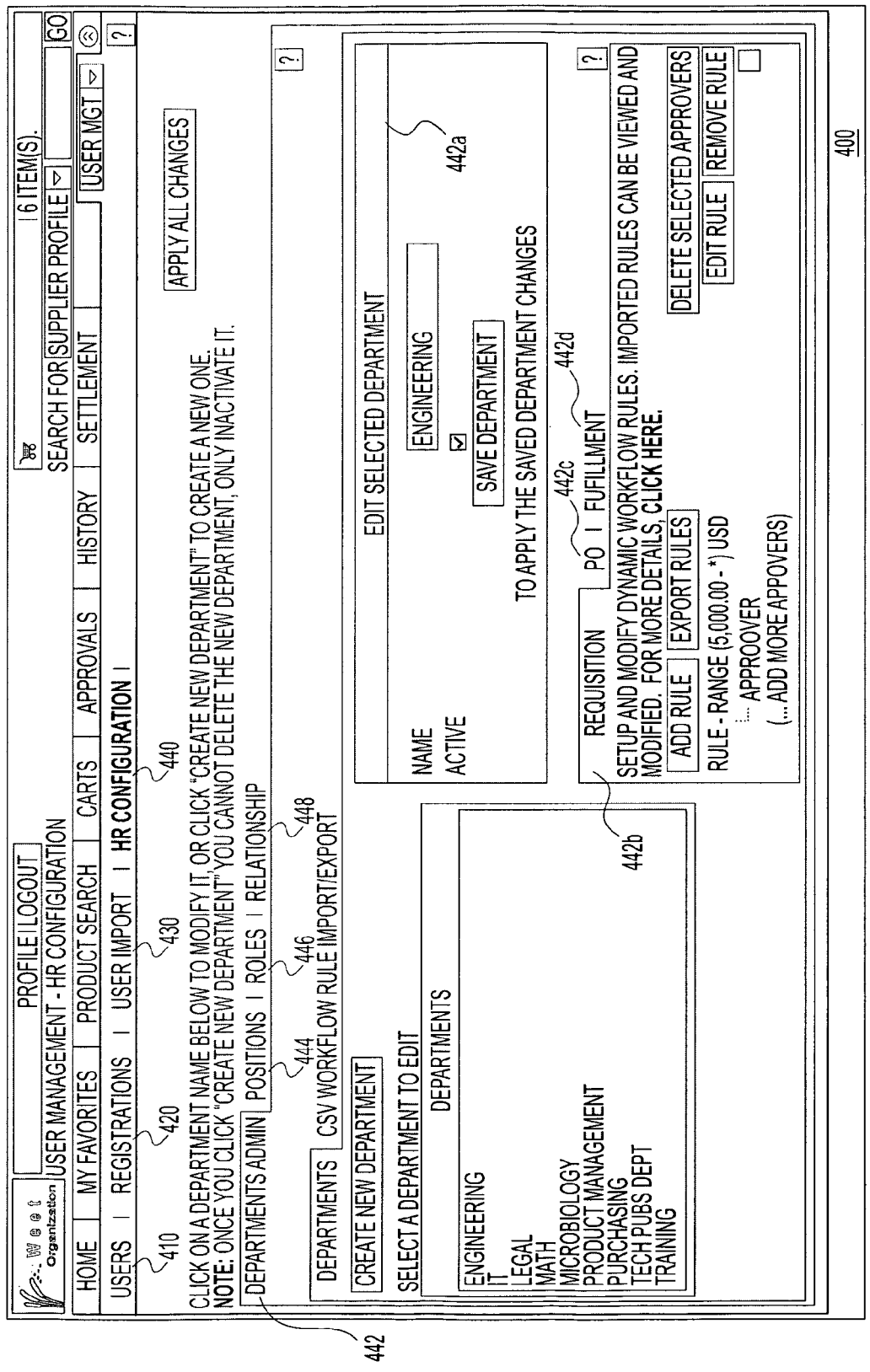
FIGS. 4A-4T illustrate exemplary user management tools in accordance with the present invention.
Figure 4B:
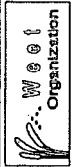
Figure 4C:
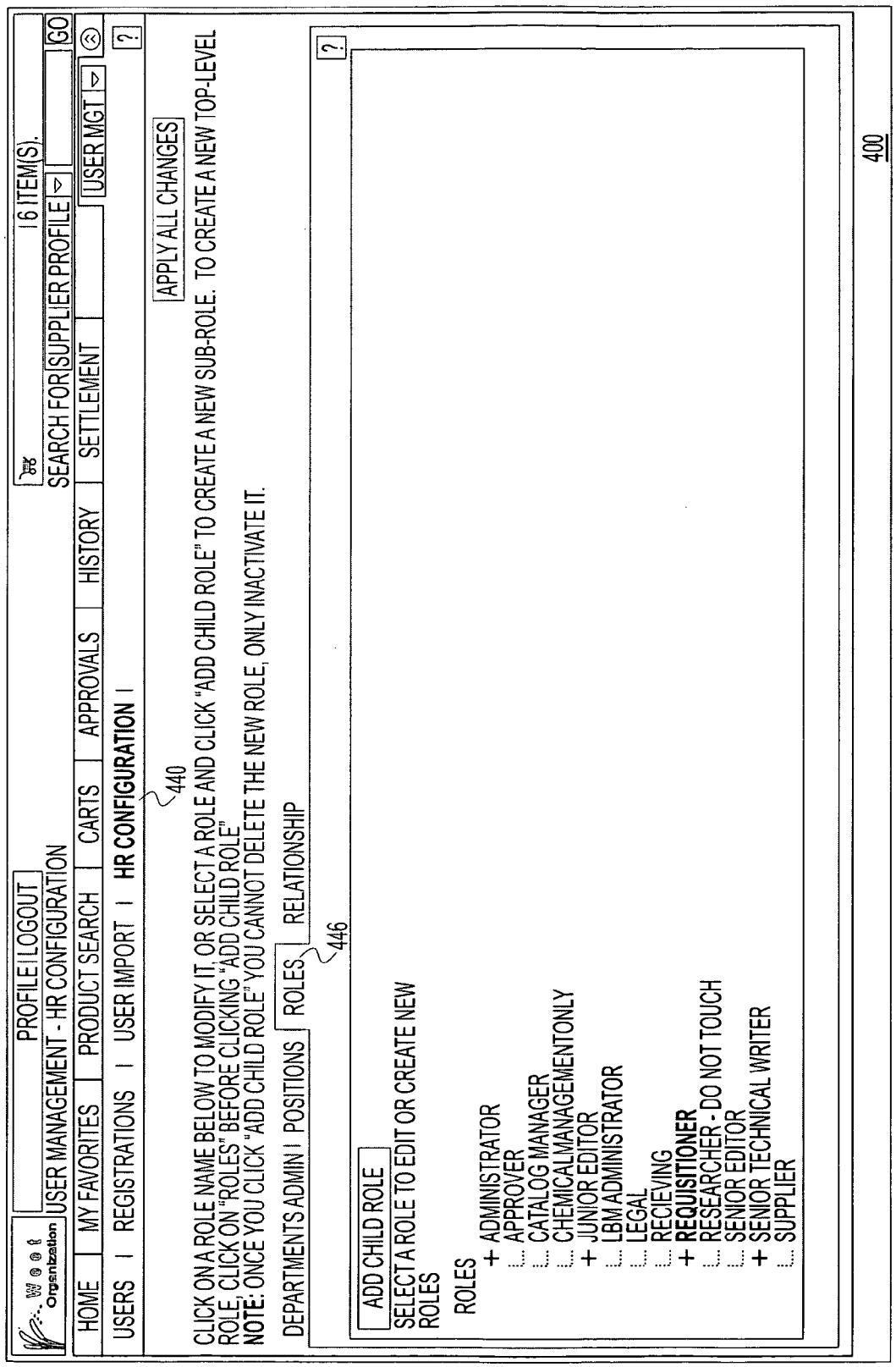
Figure 4D:
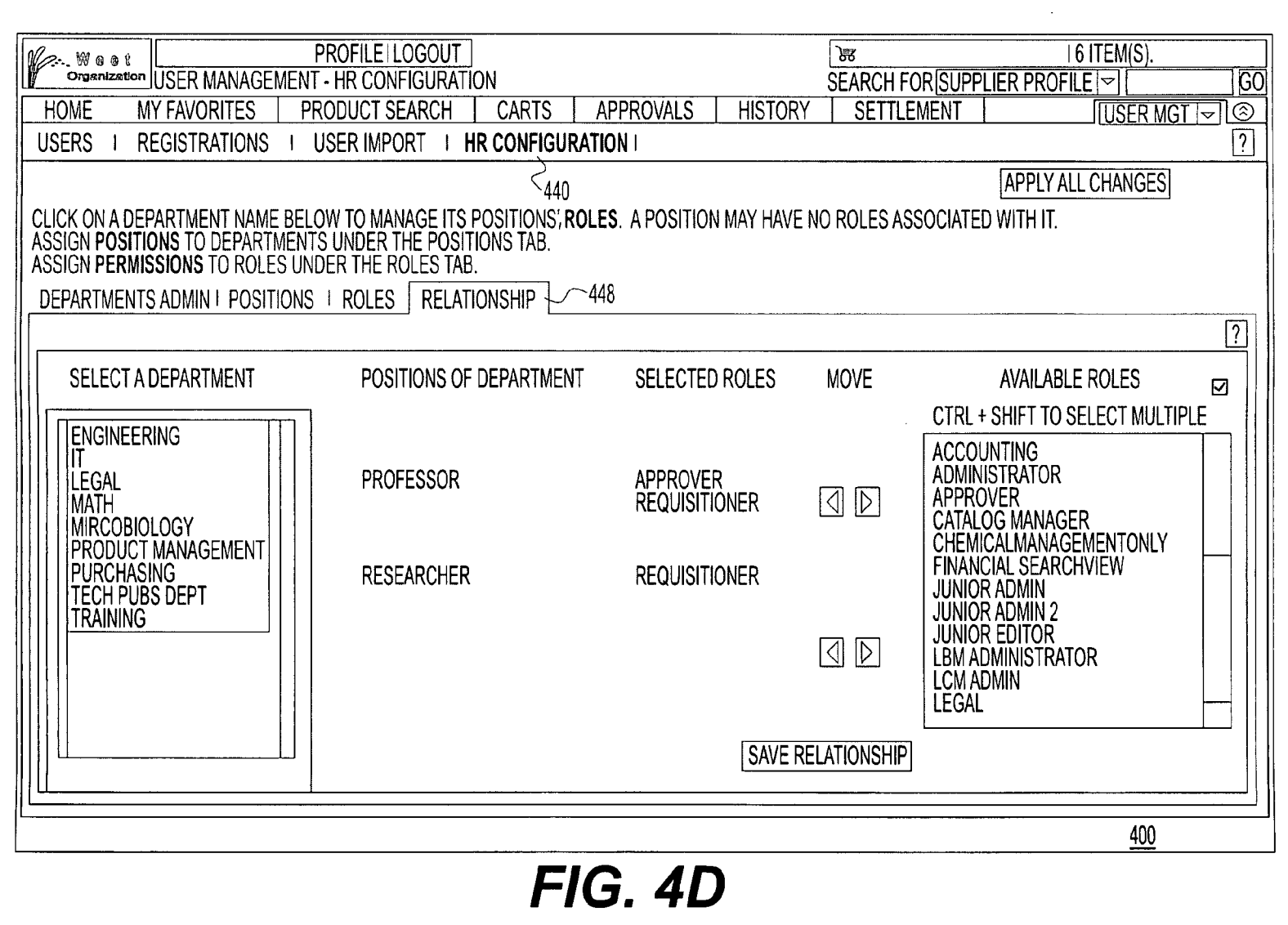

FIG. 4A illustrates an exemplary user management tool 400 to create or modify user access, manage user registration, and define the organizational structure. For example, FIG. 4A illustrates a user access human resources (HR) configuration tool 440. In particular, HR configuration tool 440 allows the super user to establish and describe the organization. For example, the HR configuration tool 440 may be used to define various departments of the organization (442), various positions of the organization (444), various roles of the users in the organization (446), and relationships between the roles, positions, and departments defined for the organization (448). As shown in FIG. 4A, the various departments of the organization that require procurement services may be "Engineering," "IT," "Legal," "Math," etc. As shown in FIG. 4B, there may be various positions within the organization, such as "Buyer," "Documentation Editor," "Professor, "Researcher," etc. As shown in FIG. 4C, the HR configuration tool 440 is used to define various roles of the users within the organization, such as "Administrator," "Approver," "Catalog Manager," etc. As shown in FIG. 4D, the HR configuration tool 440 is used to define the relationship between the department, position, and role of the users. For example, a "Professor" in "Engineering" may be designated as an "Approver" and "Requisitioner" for the organization while a "Researcher" of "Engineering" may only be a "Requisitioner." In this manner, the HR configuration tool 440 provides a simple yet efficient mechanism to define the organization for which the eProcurement system 10 is to be utilized.

Figure 4E:
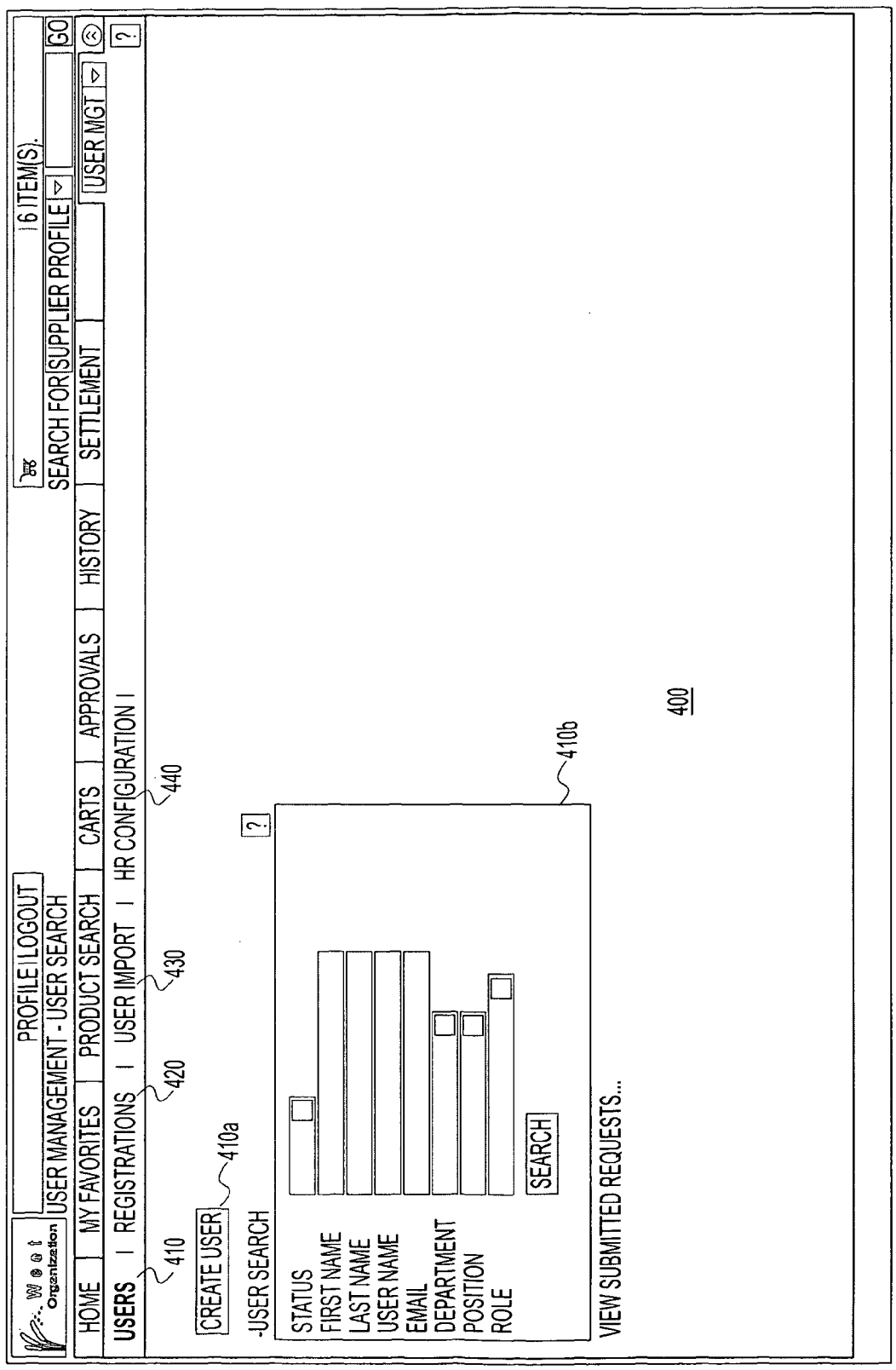
Figure 4F:
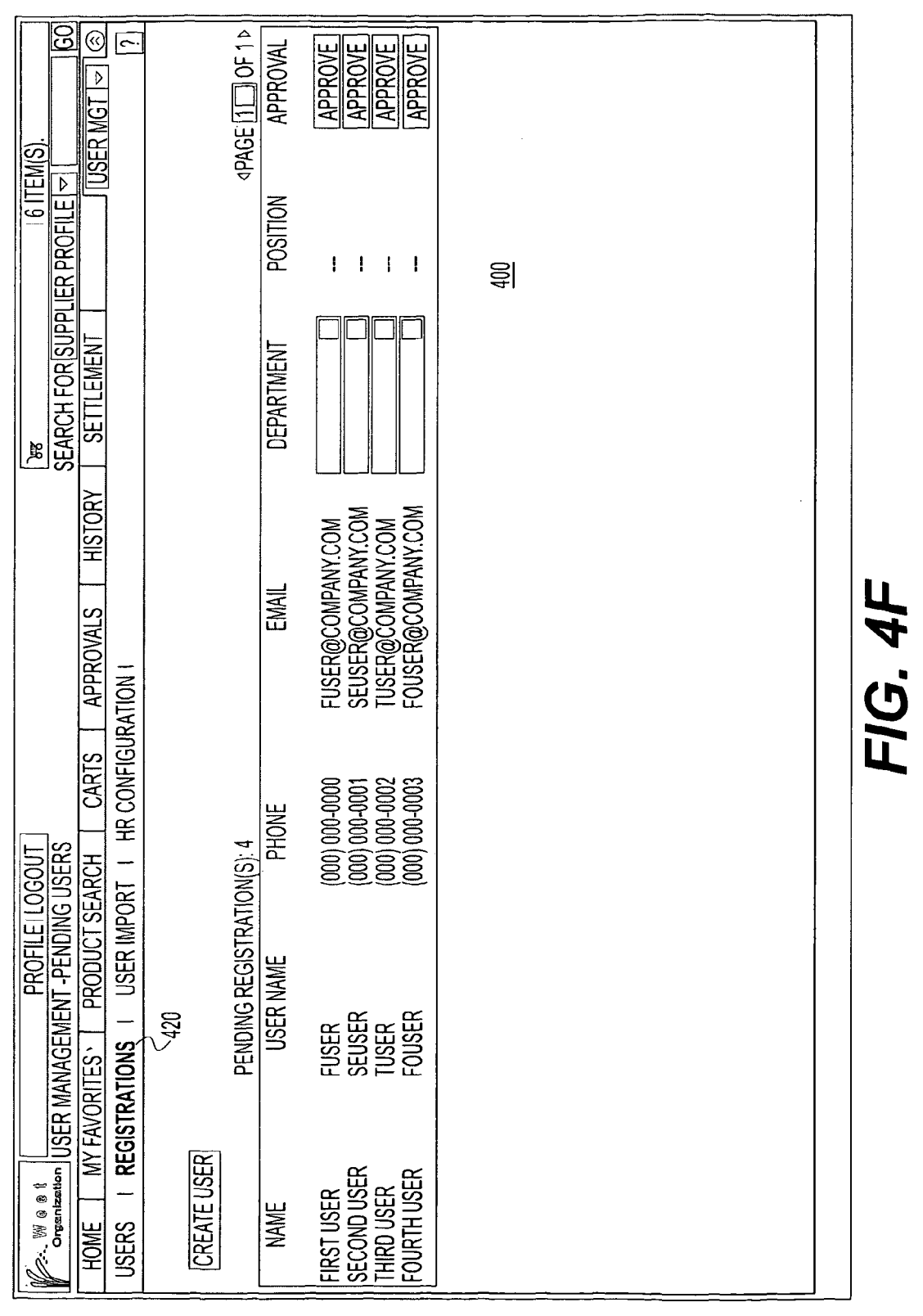

Once the organization has been defined through the HR configuration tool 440, user access tool 410 may be used to create or modify a user's access to the eProcurement system 10 for the user's organization. As shown in FIG. 4E, the user access tool 410 may be used to create a new user access account (410a) or the user database 32 may be searched (410b) for an existing user in the eProcurement system 10. To create a user access account, the user access tool 410 requires entry of the user's personal information (e.g., name, phone number(s), email address) and authentication information (e.g., login ID and password). In addition, the user's department and position information as created through the HR configuration tool 440 is also provided. In an exemplary embodiment, the department and position information created through the HR configuration tool 440 are shown in a drop-down menu for easy selection and entry. To simplify the creation of an account, existing user files may be imported into the user database 32 through the user import 430. Once a user access account has been created, the newly created accounts are activated through the user registration monitor 420. As shown in FIG. 4F, a list of new user access requests is presented in the user registration monitor 420. A designated approver for the organization then reviews and approves the user access account to be activated for the user.

Figure 4G:
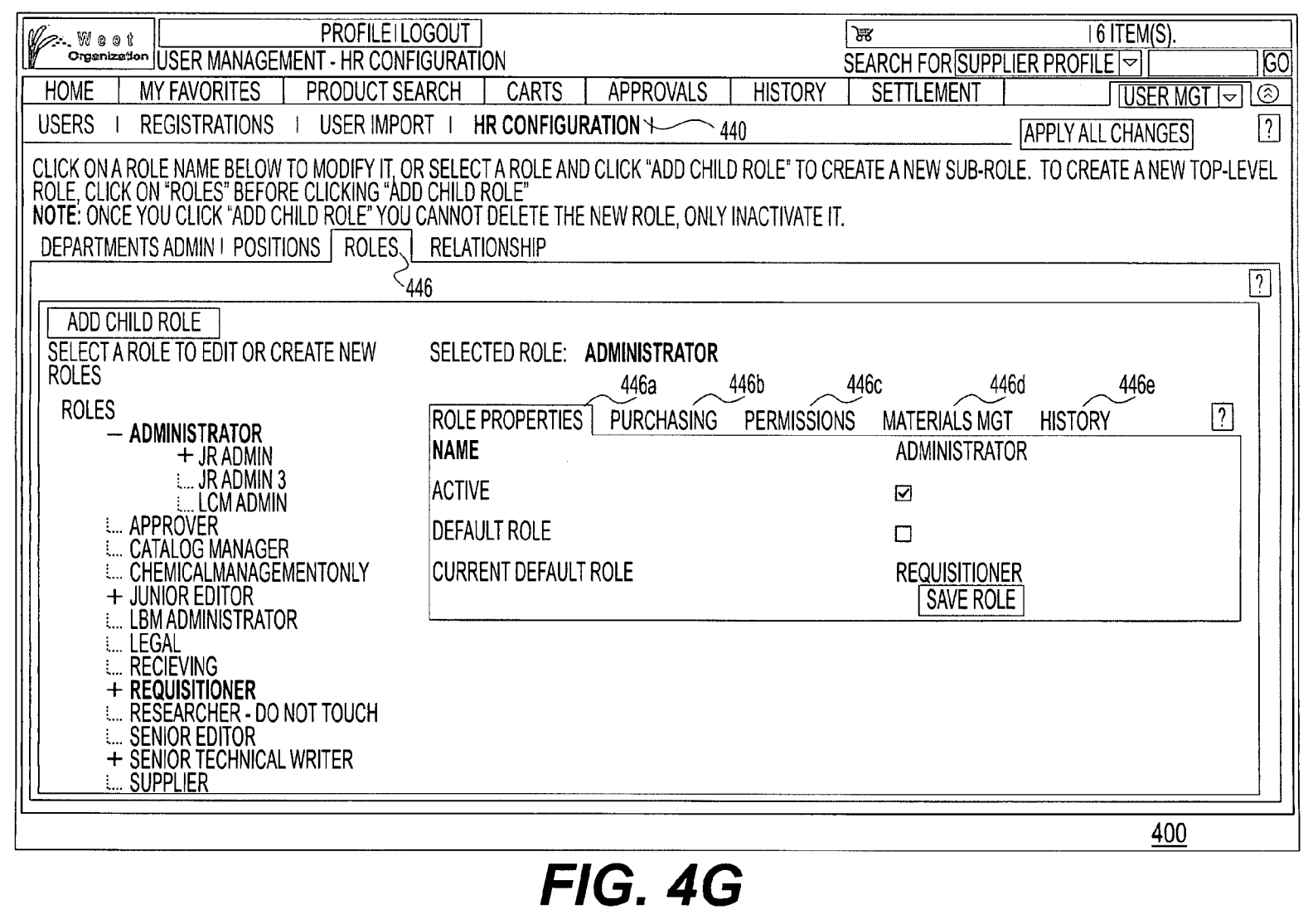

In accordance with an exemplary embodiment of the present invention, every aspect of the organization may be defined and customized in the eProcurement system 10. For example, as shown in FIG. 4A, once a "Department" has been created for an organization, the created department may be activated (442a). Moreover, each department may be defined with business rules related to the department's requisition (442b), purchase orders (442c), and fulfillment (442d). For example, FIG. 4A shows that the "Engineering" department has been designated as an active department with the "Requisition" and "Purchase Order" rules including a list of approvers for the Engineering department. As shown in FIG. 4B, a created position may be designated for a created department. For example, FIG. 4B shows that the organization has the "Professor" position for the "Engineering," "Microbiology," and "Purchasing" departments. FIG. 4G illustrates an exemplary embodiment of the HR configuration tool 440 for defining roles of the organization.

Figure 4H:
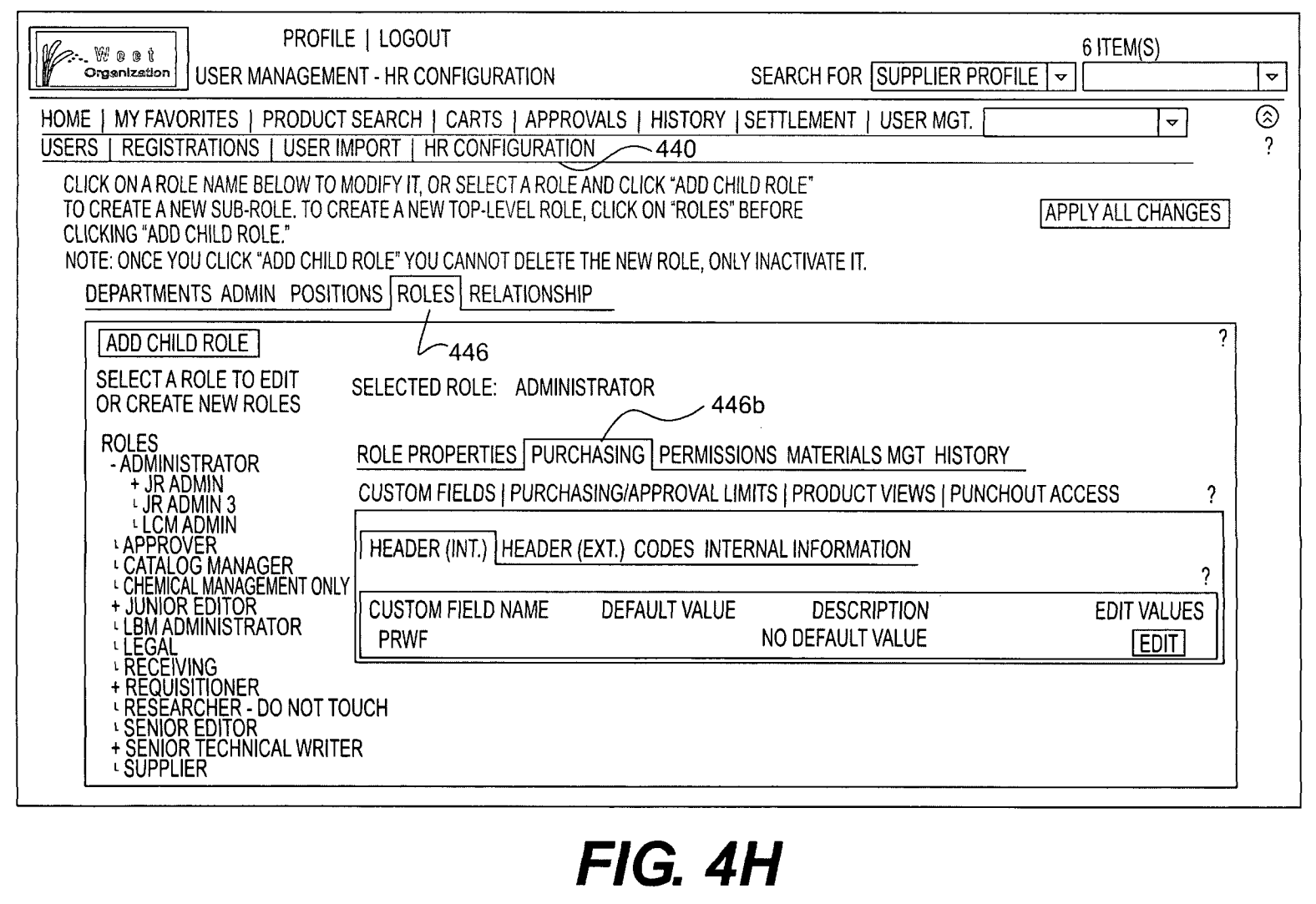
Figure 4J:
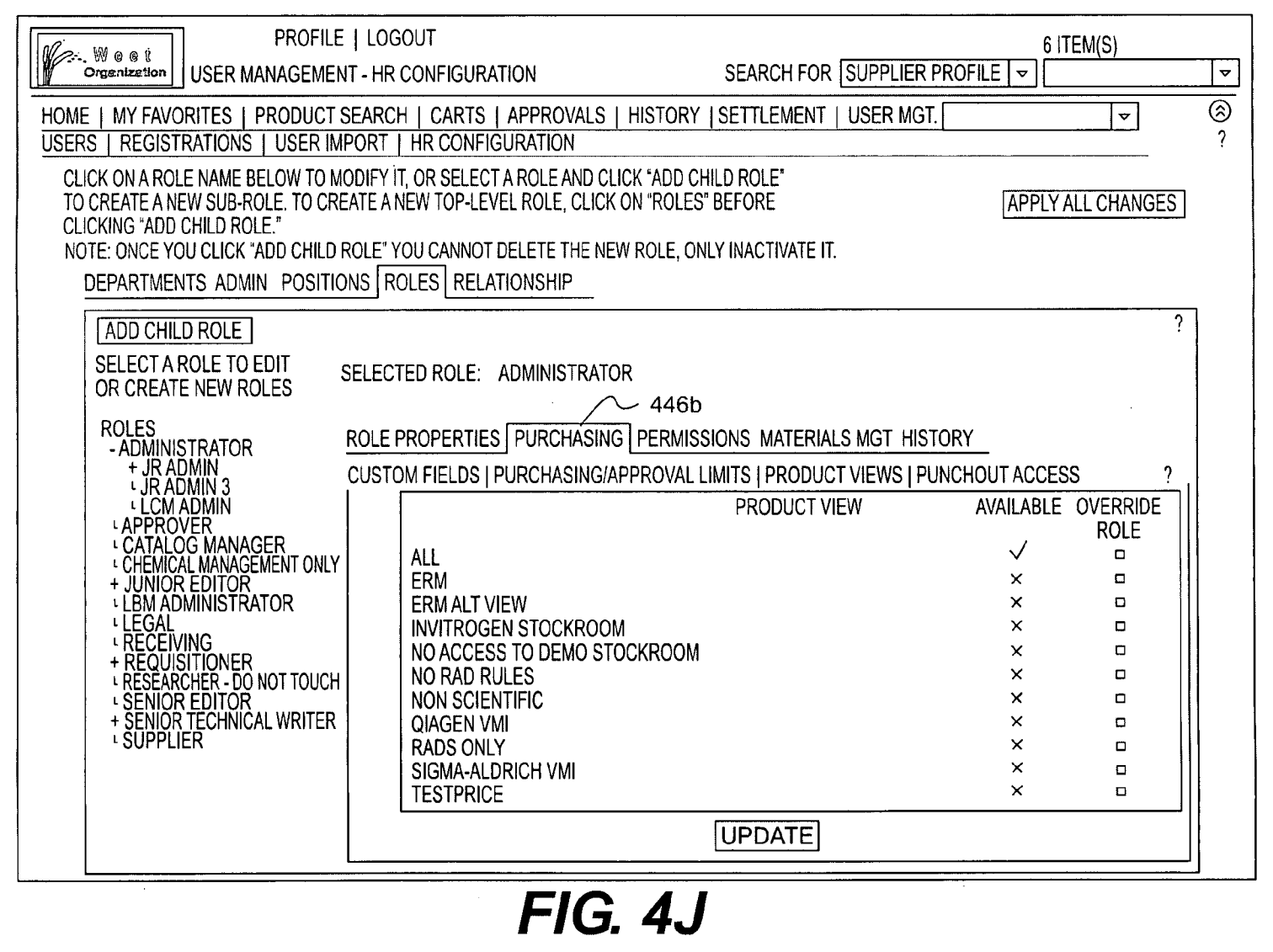
Figure 4L:
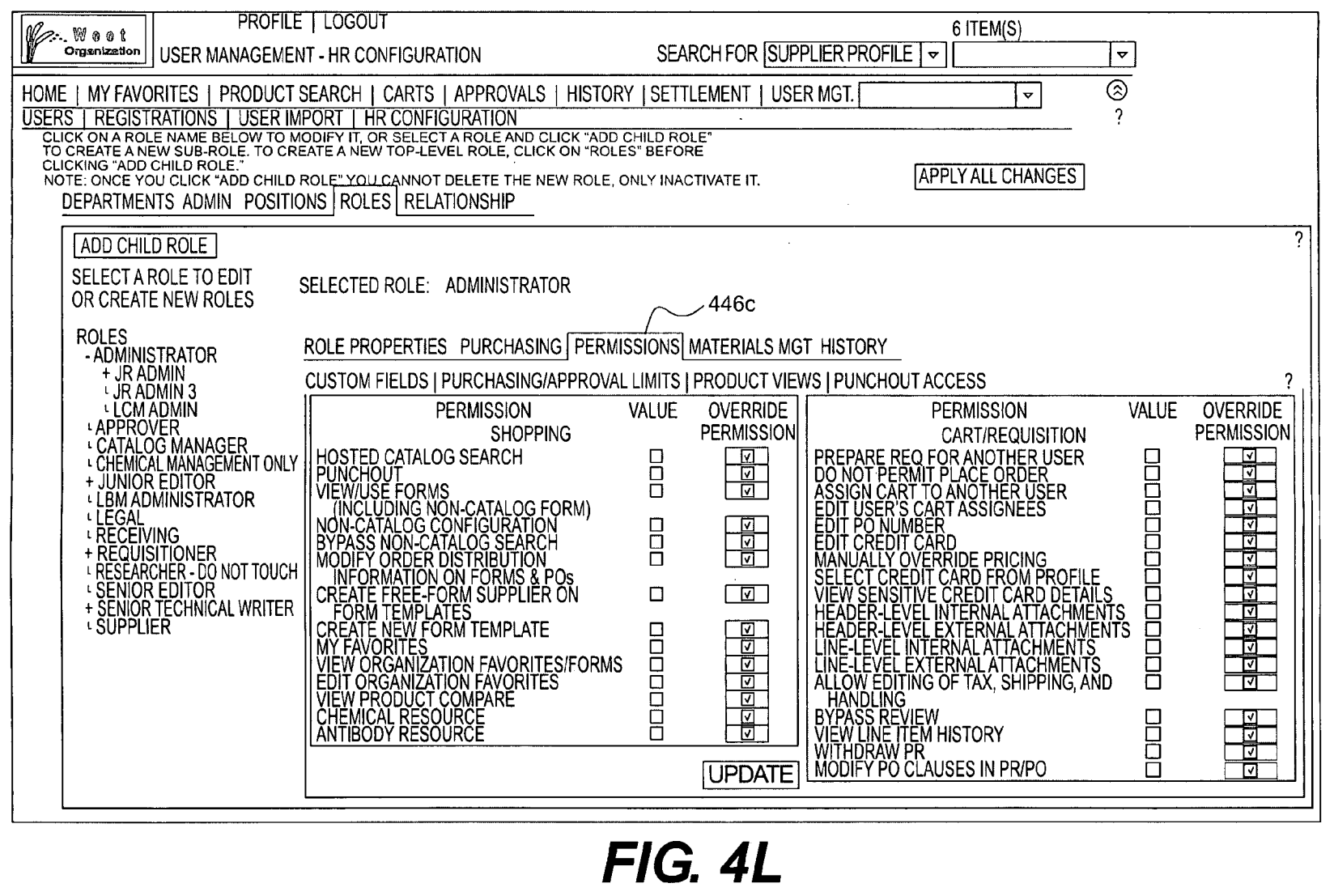
Figure 4M:
Figure 4N:
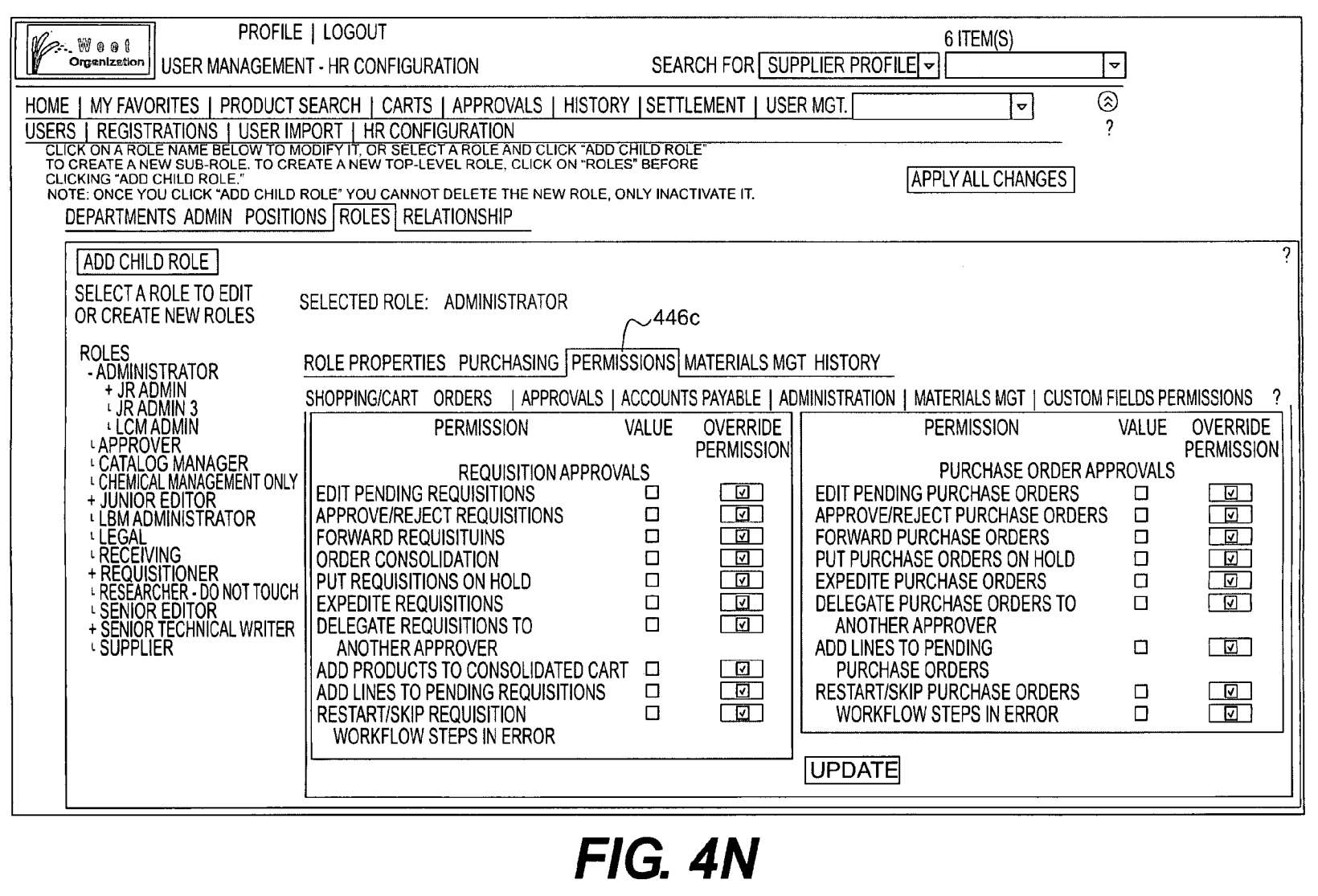
Figure 4P:
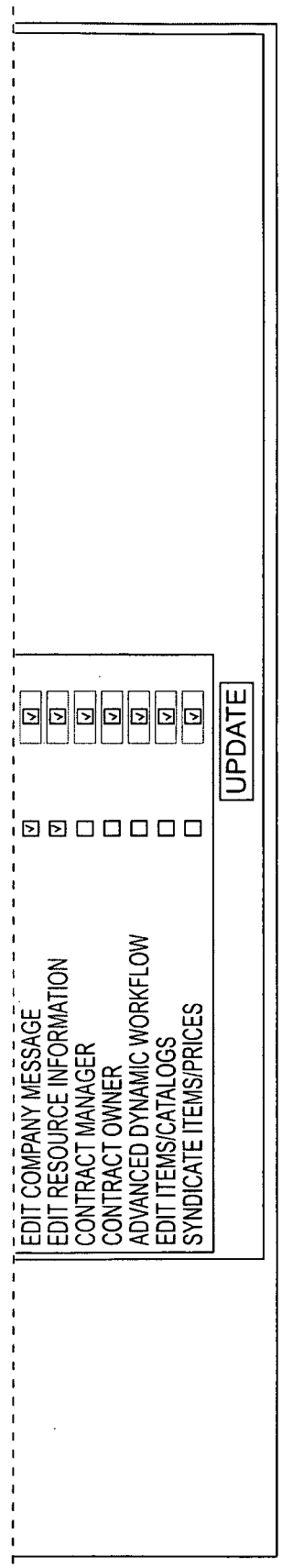
Figure 4Q:
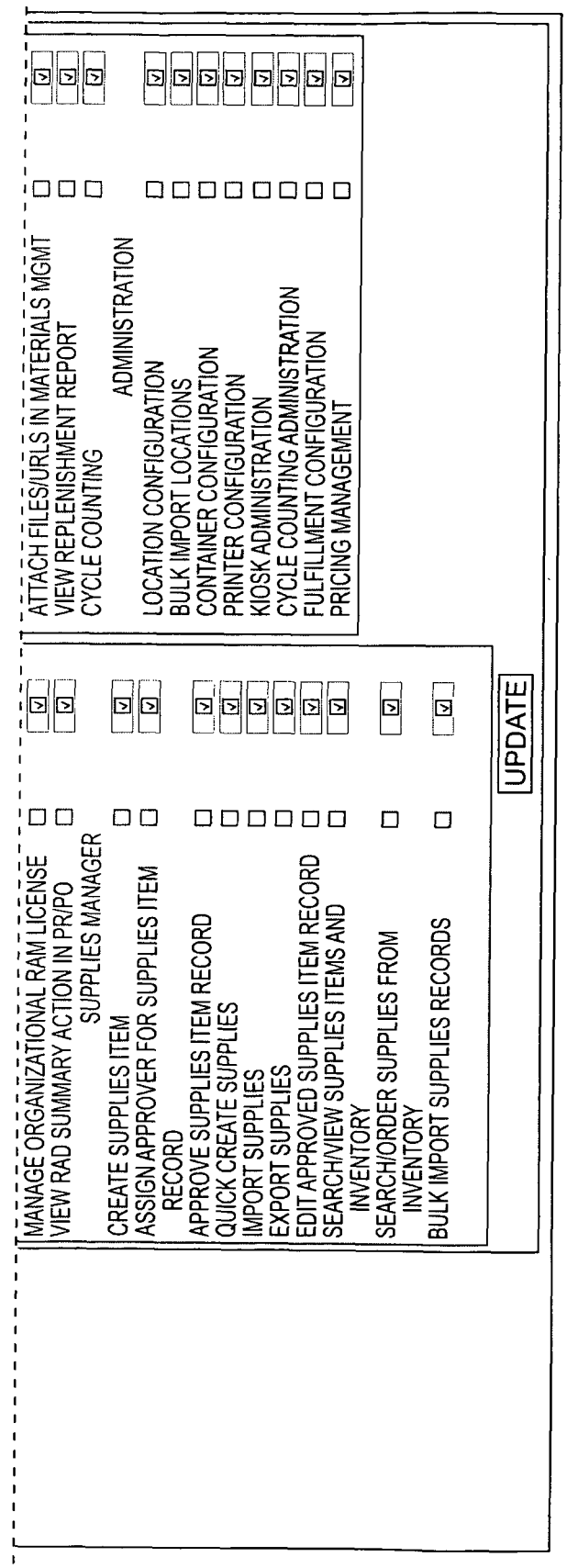
Figure 4R:
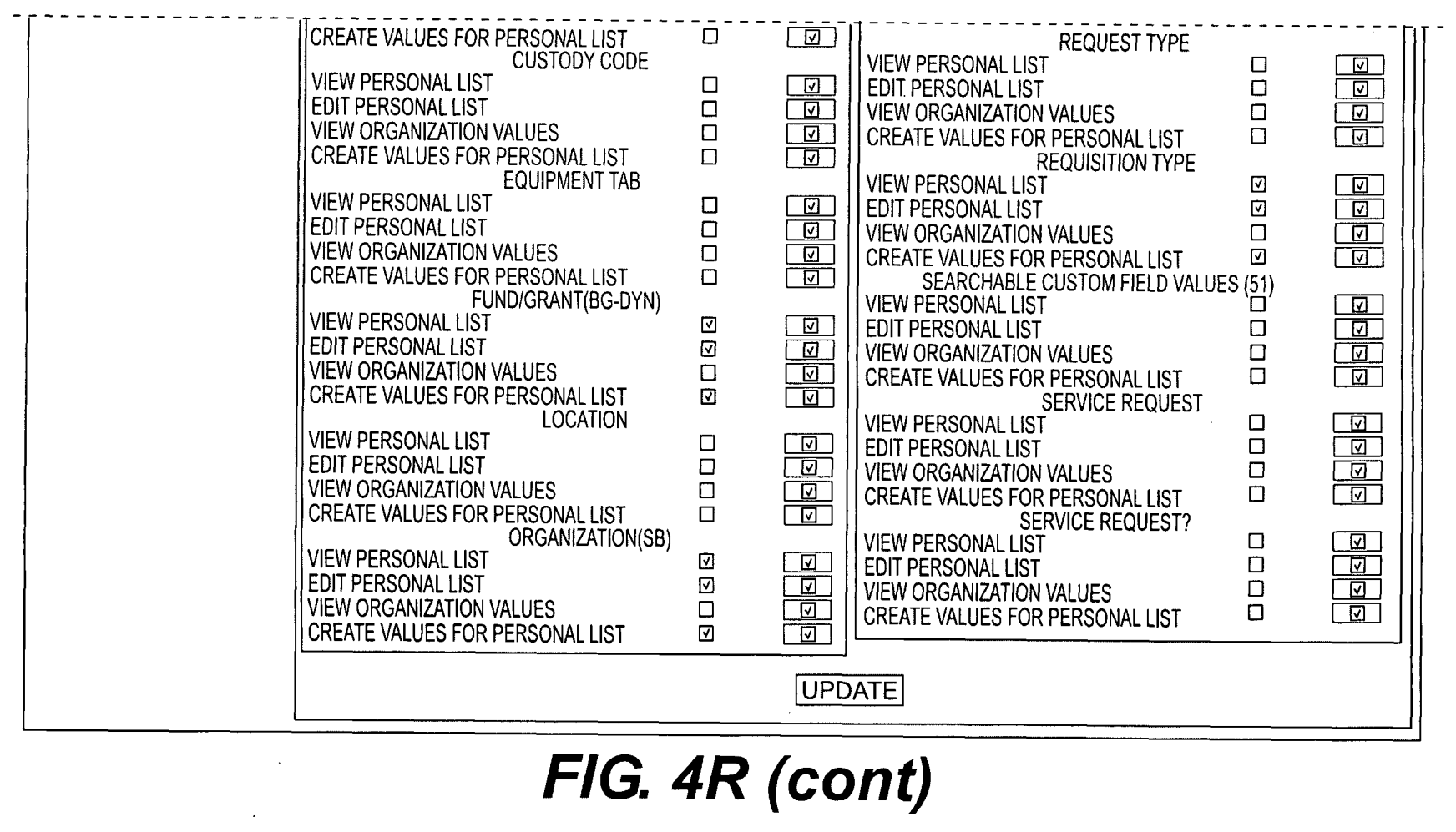
Figure 4S:
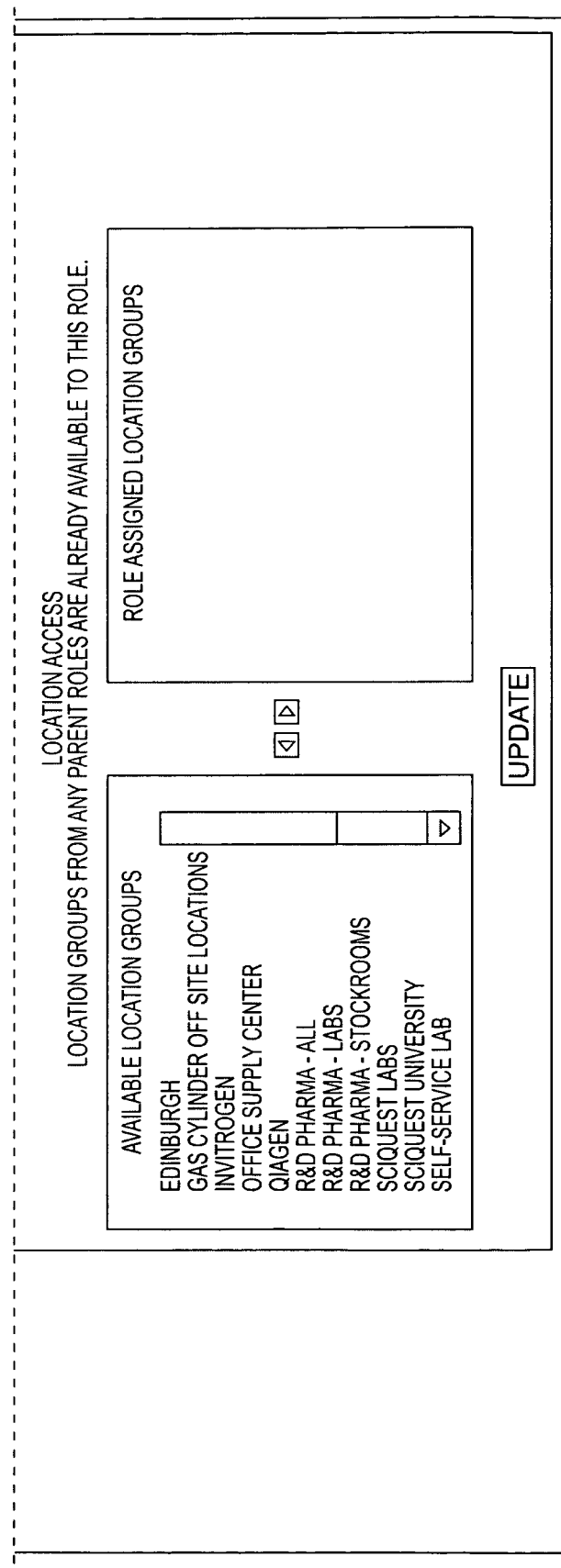

For each role, the roles configuration tool 446 is used to define the role properties (446a), purchasing properties (446b), access permissions (446c), materials management rules (446d), and history of modifications to these definitions (446e). For example, for the role of "Administrator," the role properties 446a (FIG. 4G) may include whether the designated role is active in the organization and the purchasing properties 446b may include definitions of any internal and external purchasing codes and information (e.g., "PRWF") (FIG. 4H), purchasing/approval limits (FIG. 4I), allowed product views (FIG. 4J), and allowed punch-out access (FIG. 4K). The access permissions 446c may be defined for the roles including shopping cart permissions (FIG. 4L), orders (FIG. 4M), approvals (FIG. 4N), accounts payable (FIG. 4O), administration (FIG. 4P), management of materials (FIG. 4Q), and custom fields permissions (FIG. 4R). The materials management 446d defines the available projects and location of groups to the various roles (FIG. 4S). The history section 446e keeps track of a history of all the actions (e.g., modified, created, product view added, product view removed, punch-out access added, punch-out access removed, project added, project removed, location added, location removed, etc.) and the sections to which the actions were applied (e.g., role properties, product views, punch-out access, materials management, permissions, purchasing/approval limits, custom field permission definitions, etc.) including the old value of the parameter and the new value of the parameter (FIG. 4T).

Figure 5A:
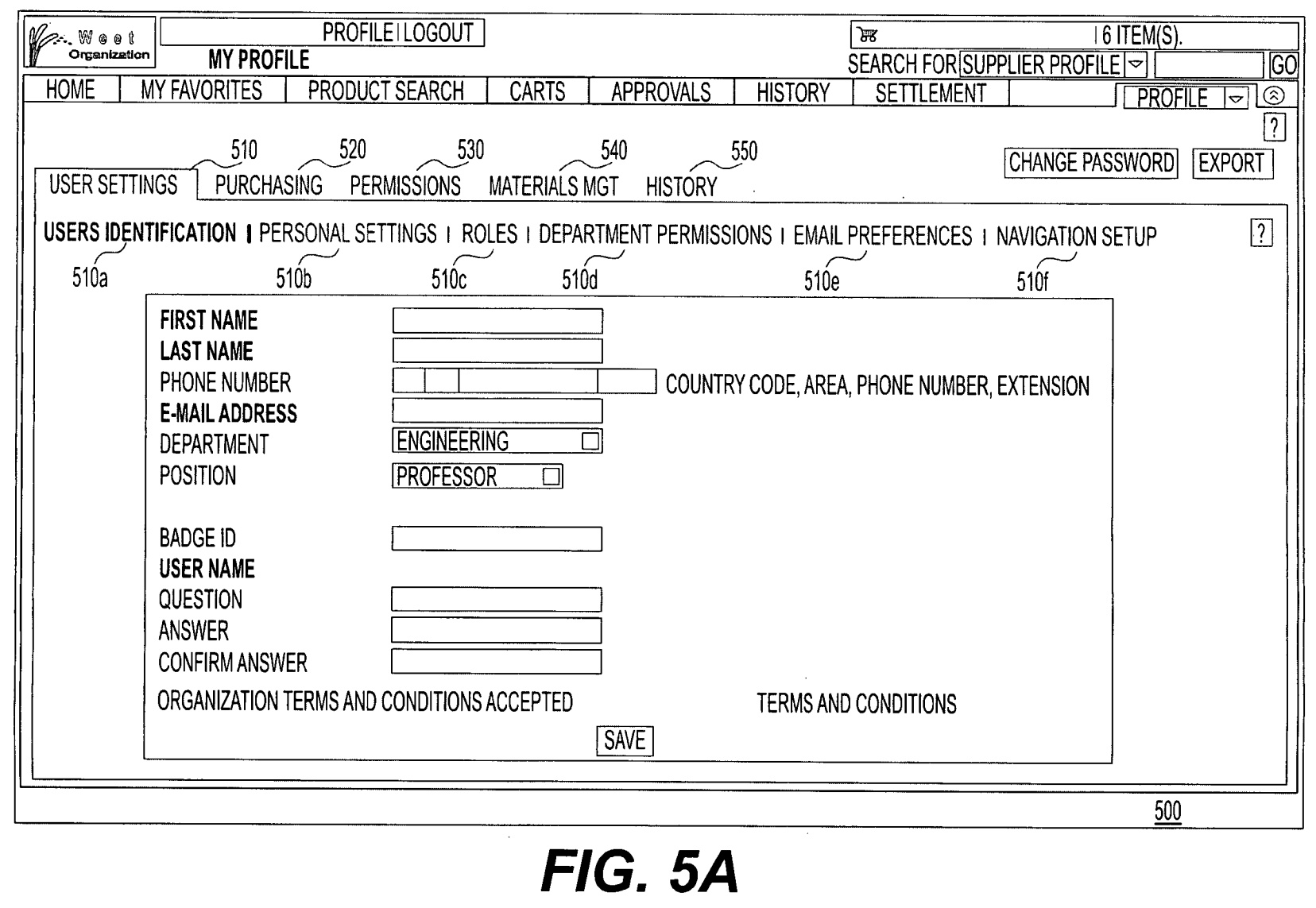

Once the internal organizational structure and descriptions of key positions of users in the organization have been defined using the user management tool 400, specific users and their level of access may be defined. As discussed above, the level of access of a user may be assigned globally based on their positions and/or roles in the organization. In addition, the eProcurement architecture of the present invention allows customization down to specific individuals all within the single instance, multi-tenant environment. For example, FIG. 5A illustrates an exemplary user profile tool 500 for defining a user's account in the eProcurement system of the present invention. As shown, the user profile tool 500 includes a user setting tool 510, user purchasing tool 520, user permissions tool 530, user materials management tool 540, and user setting history tool 550. These tools provide customization of the user's account for various levels of access to the eProcurement system of the present invention all within the single instance, multi-tenant environment.

Figure 5B:
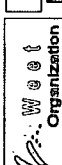
FIG. 5B illustrates an exemplary roles selection tool in accordance with the present invention.
Figure 5C:
FIG. 5C illustrates an exemplary email preference tool in accordance with the present invention.
Figure 5D:
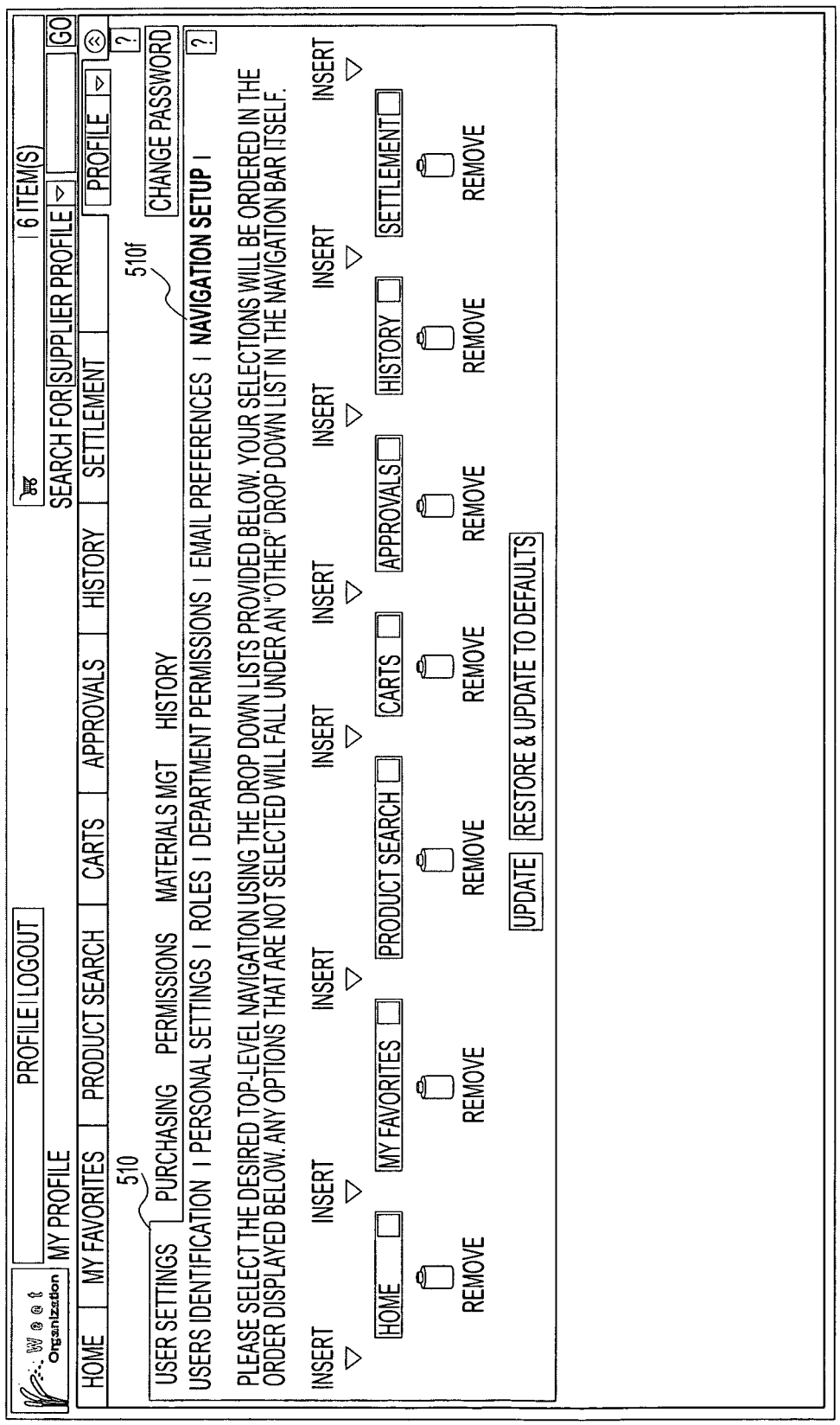
FIG. 5D illustrates an exemplary navigation setup tool in accordance with the present invention.

For example, as shown in FIG. 5A, an exemplary user setting tool 510 of the present invention shows that the user is a "Professor" in the "Engineering" department. As discussed above, users in this department and position have default levels of access defined by the super user using the user management tool 400. However, because a user may have additional roles assigned to the user that are beyond the normal scope of the user's position, the eProcurement system of the present invention allows the super user to modify the user's level of access on an individual level. For example, FIG. 5B illustrates an exemplary roles selection tool 510c to modify the roles assigned to the selected user. Through the roles selection tool 510c, the super user may be able to specifically tailor the roles of a user down to the individual level to provide customized access to the eProcurement system of the present invention. Similarly, the user's departmental permissions may be modified using the department permissions tool 510d. Various aspects of the user's account may also be customized, such as the user's personal settings 510b, email preferences 510e, and navigation setup 510f. As with the user management tool 400 and the roles/permissions tools 510c and 510d, all customizations may be performed by simply activating/deactivating a function available on the eProcurement system of the present invention. For example, FIG. 5C illustrates an exemplary email preference tool 510e, which lists all of the action notifications that may be received via email. A user only has to activate/deactivate by selecting the notifications the user wishes to receive via email. Similarly, FIG. 5D illustrates an exemplary navigation setup tool 510f. As shown, a user simply selects the navigation tools to be displayed (or removed) from the top-level navigation bar.

The user purchasing tool 520 allows the super user to define the purchasing activities of the user. For example, as shown in FIG. 5E, user purchasing tool 520 includes the custom fields tool 520a, financial approvers tool 520b, purchasing/approval limits tool 520c, shipping/billing address tool 520d, product views tool 520e, and punch-out access tool 520f. The custom fields tool 520a is similar to the purchasing properties tool 446b (FIG. 4H) to define the internal and external codes needed to make a purchase (e.g., product code). The financial approvers tool 520b designates purchase approvers for the user. Default, preferred, and additional approvers may be designated through the financial approvers tool 520b as well as removing approvers for the user. The purchasing/approval limits tool 520c designates the limits of purchases and/or approvals of purchases allowed for the user. FIG. 5E illustrates an exemplary view of the purchasing/approval limits tool 520c. As shown, the limit values of various activities related to purchases may be defined for the user. The shipping/billing address tool 520d designates the shipping/billing address associated with the user. The product views tool 520e designates the type of products the user is allowed to view. The punch-out access tool 520f designates the punch-out catalogs that are allowed to be accessed by the user. For example, FIG. 5F illustrates an exemplary punch-out access tool 520f. As discussed above, these settings may be designated as a default based on the department/position/role assigned to the user. However, these tools may be used to customize the default settings for the specific individual in accordance with the present invention.

Figure 5G:
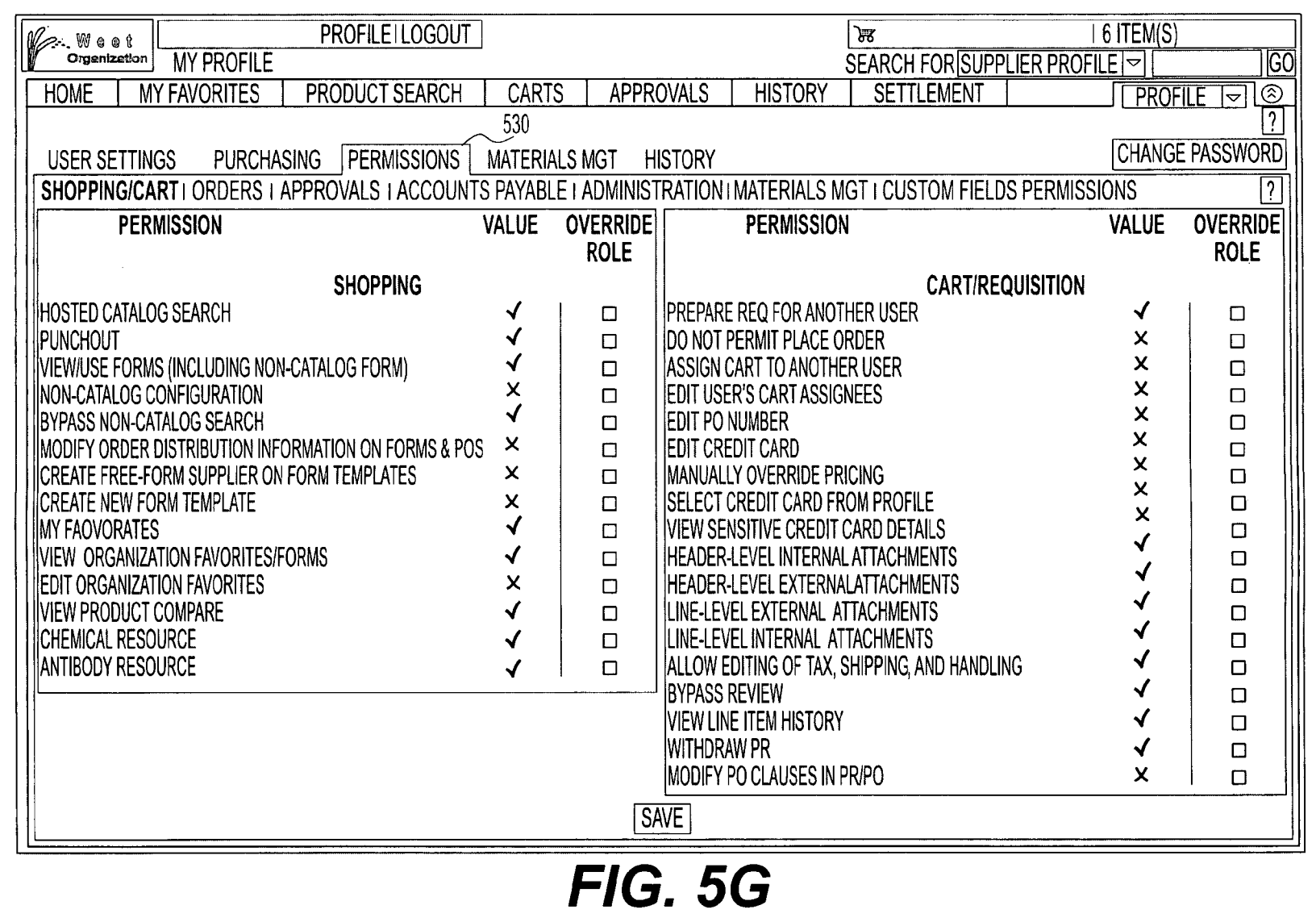
Figure 5H:
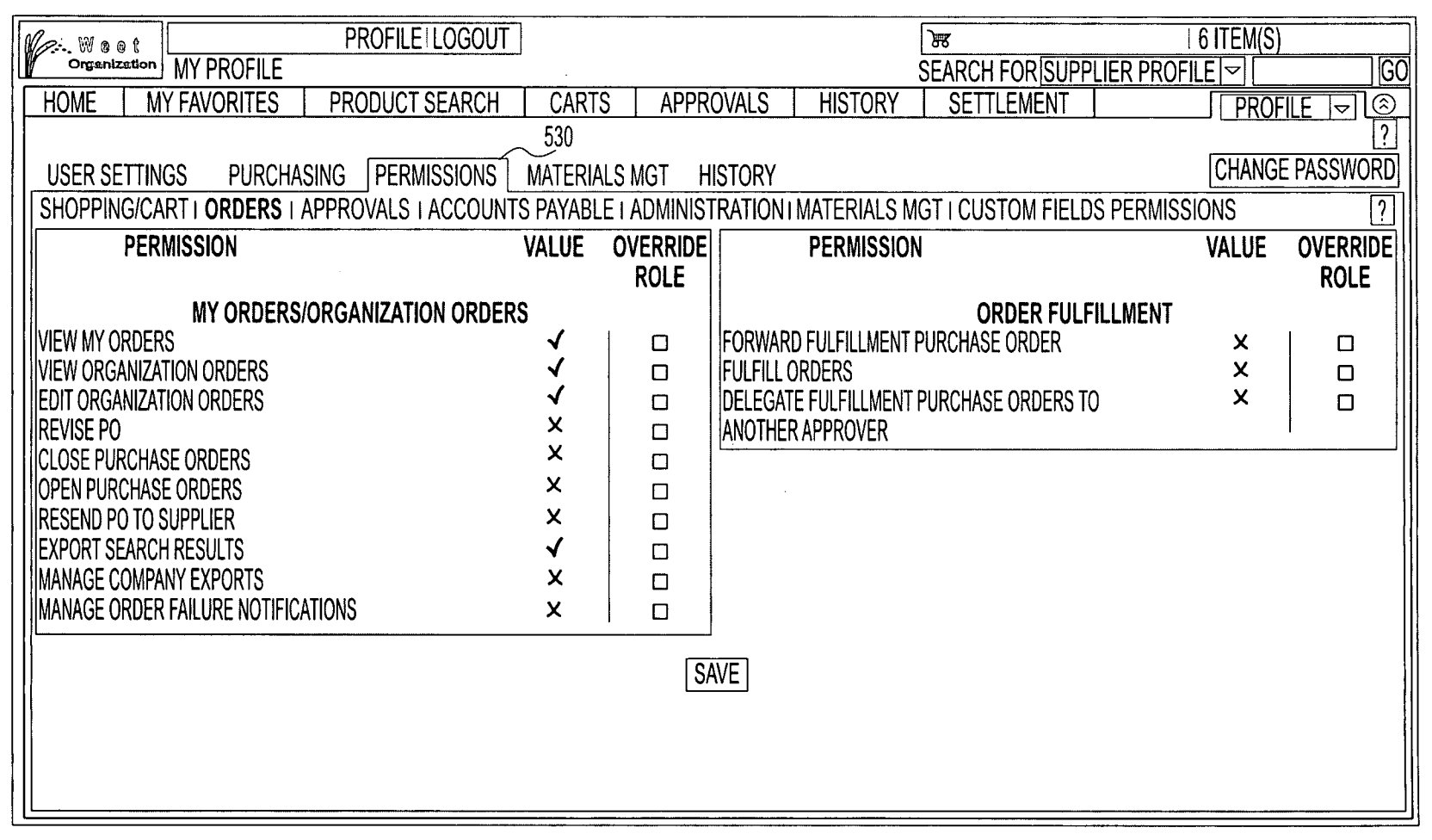
Figure 5I:
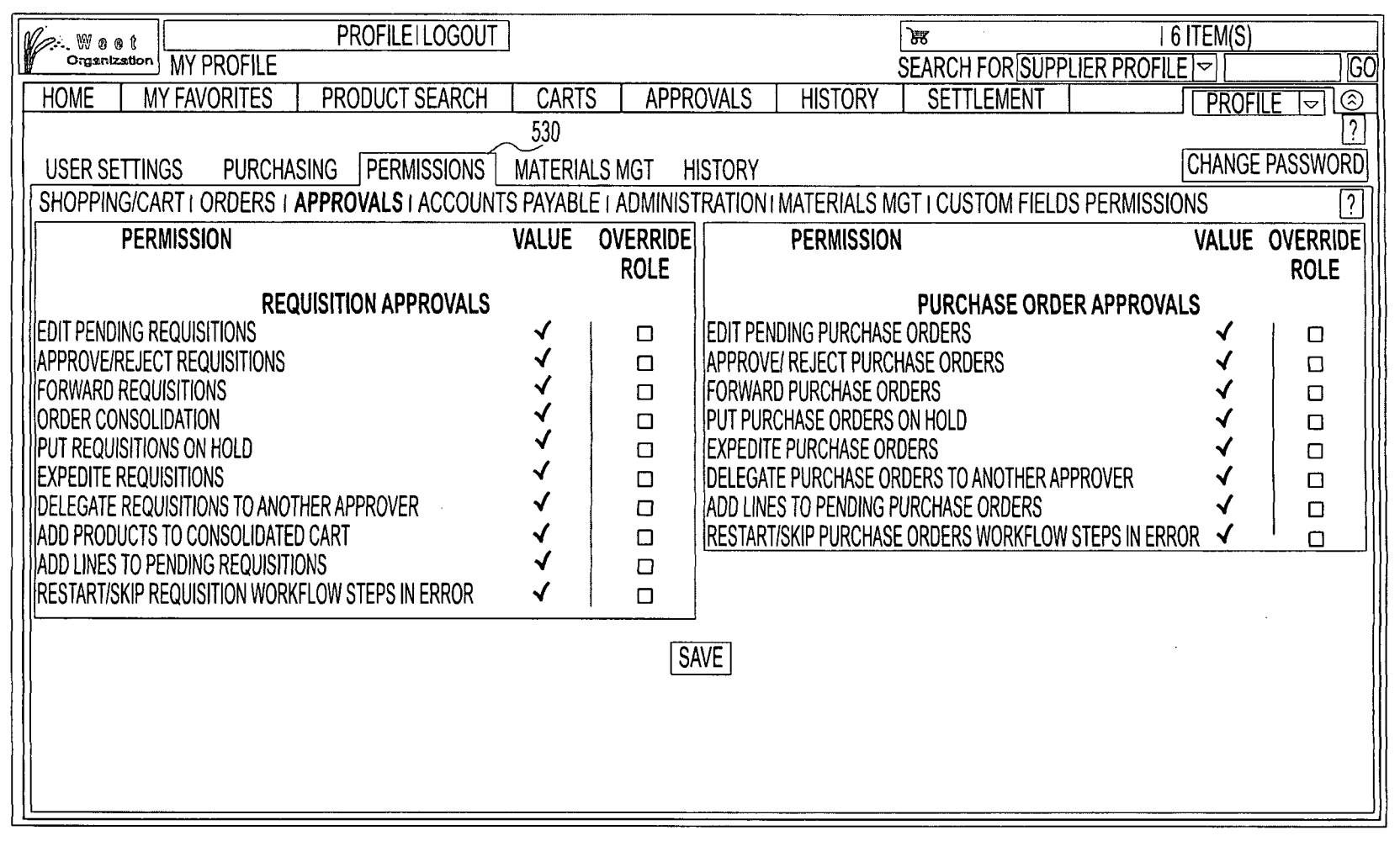
Figure 5K:
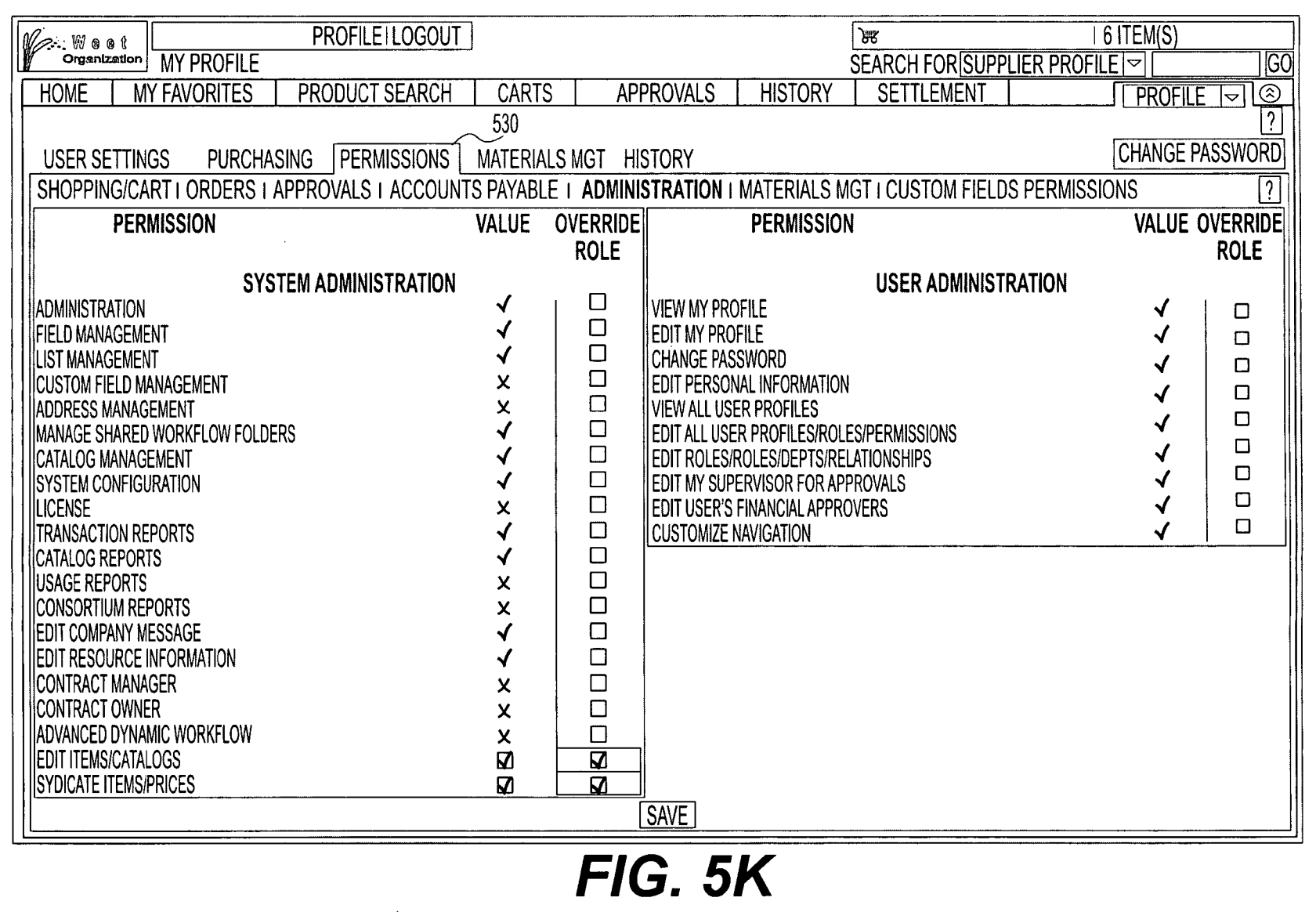
Figure 5L:
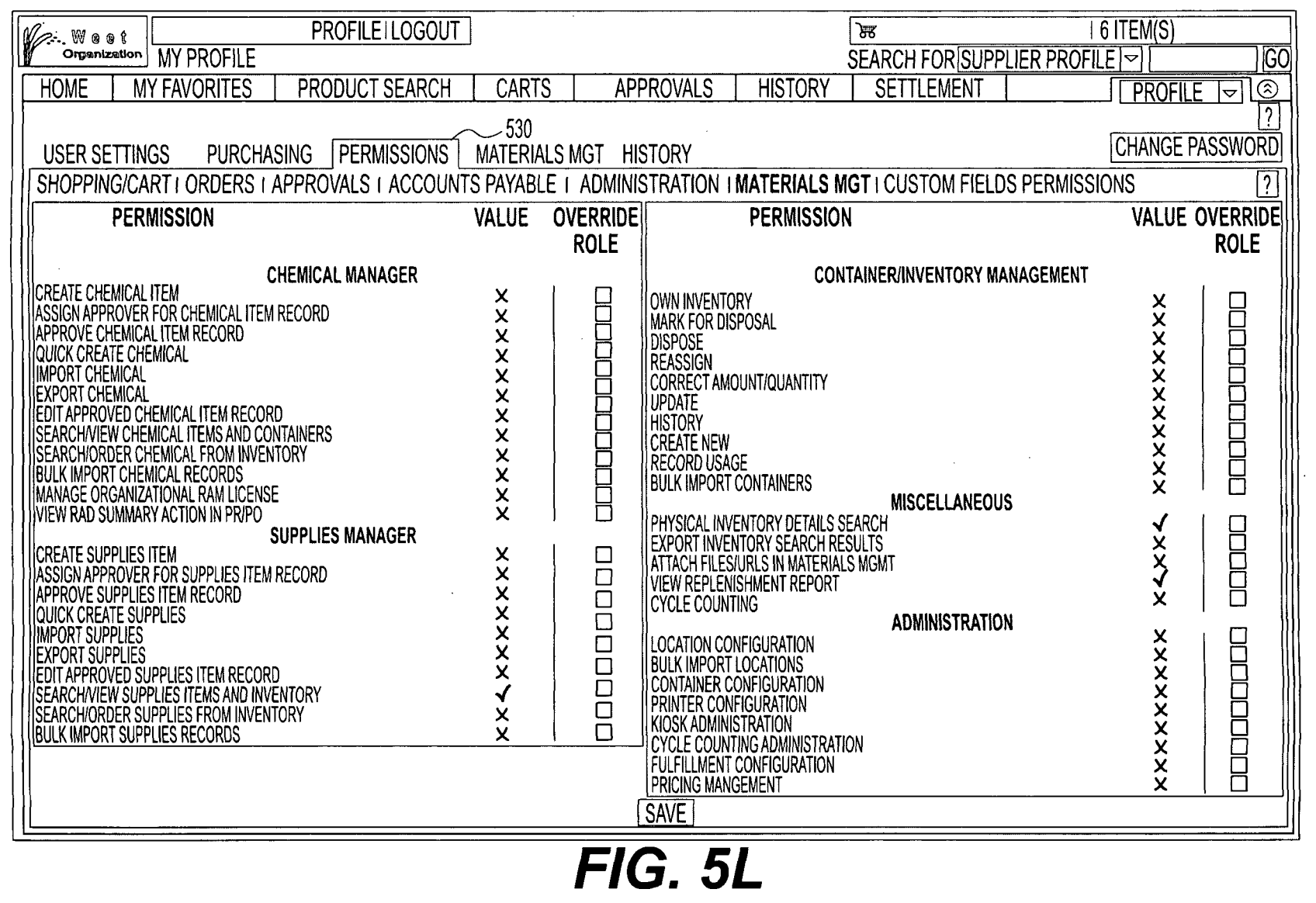
Figure 5M:
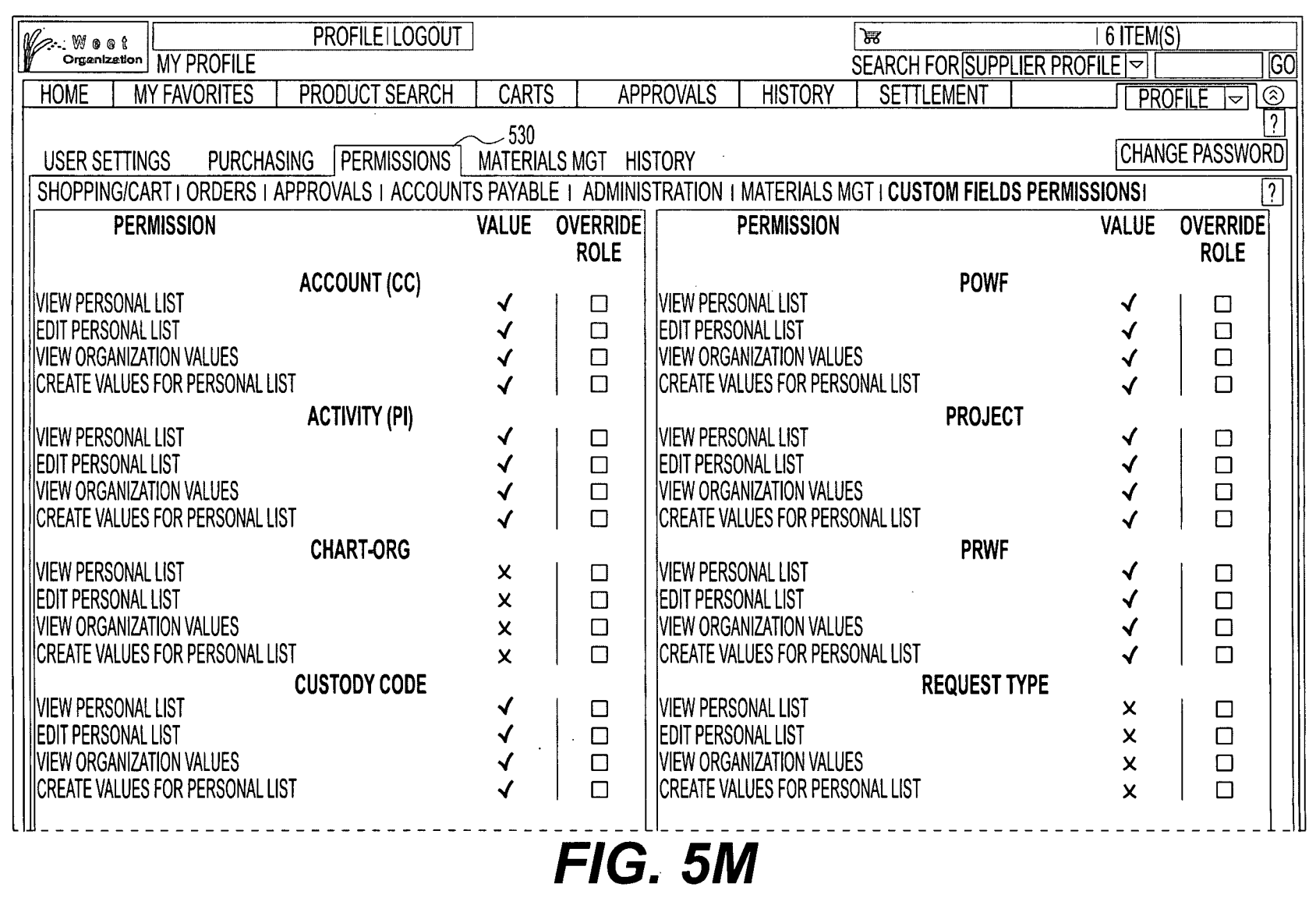
Figure 5N:
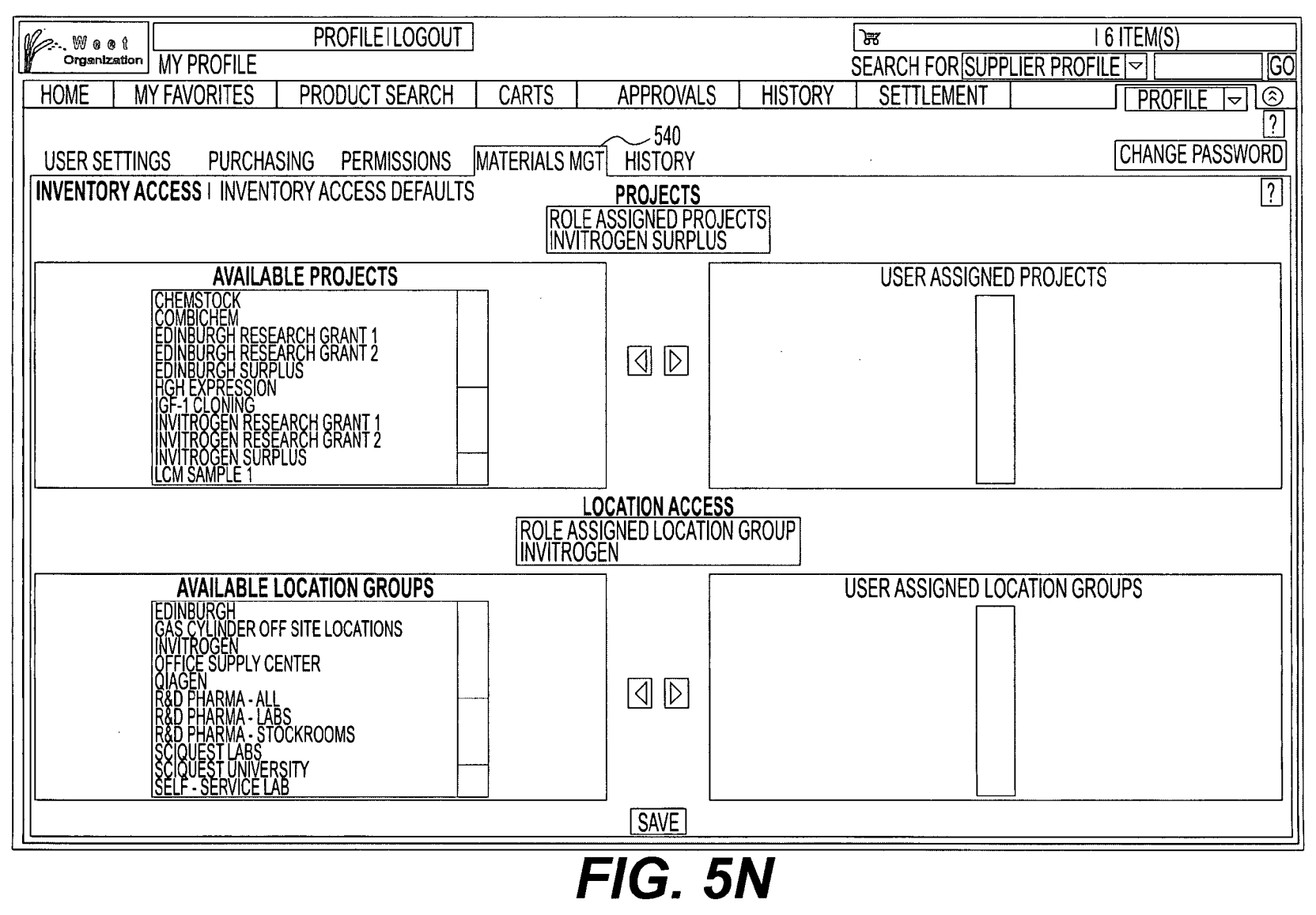

In a similar fashion, the user permissions tool 530 includes tools to customize the user's access to the shopping cart (FIG. 5G), order processing (FIG. 5H), approval processing (FIG. 5I), accounts payable processing (FIG. 5J), administration permissions (FIG. 5K), materials management (FIG. 5L), and custom fields permissions (FIG. 5M). The materials management tool 540 designates inventory locations based on projects and groups (FIG. 5N) as well as default/preferred access locations (FIG. 5O). As discussed above, the history tool 550 keeps track of all actions/changes made to the various parameters.

Figure 6A:
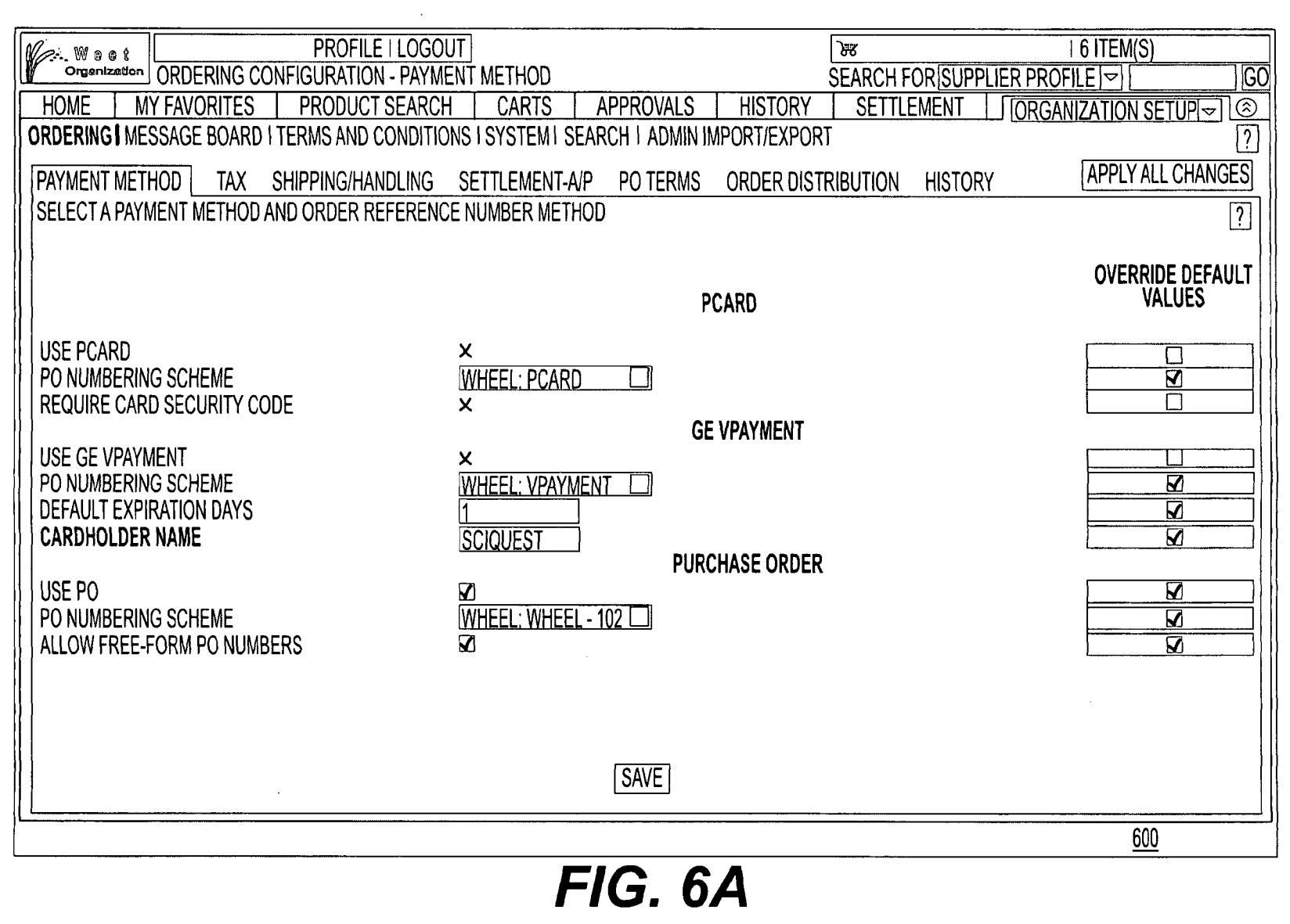
Figure 6B:
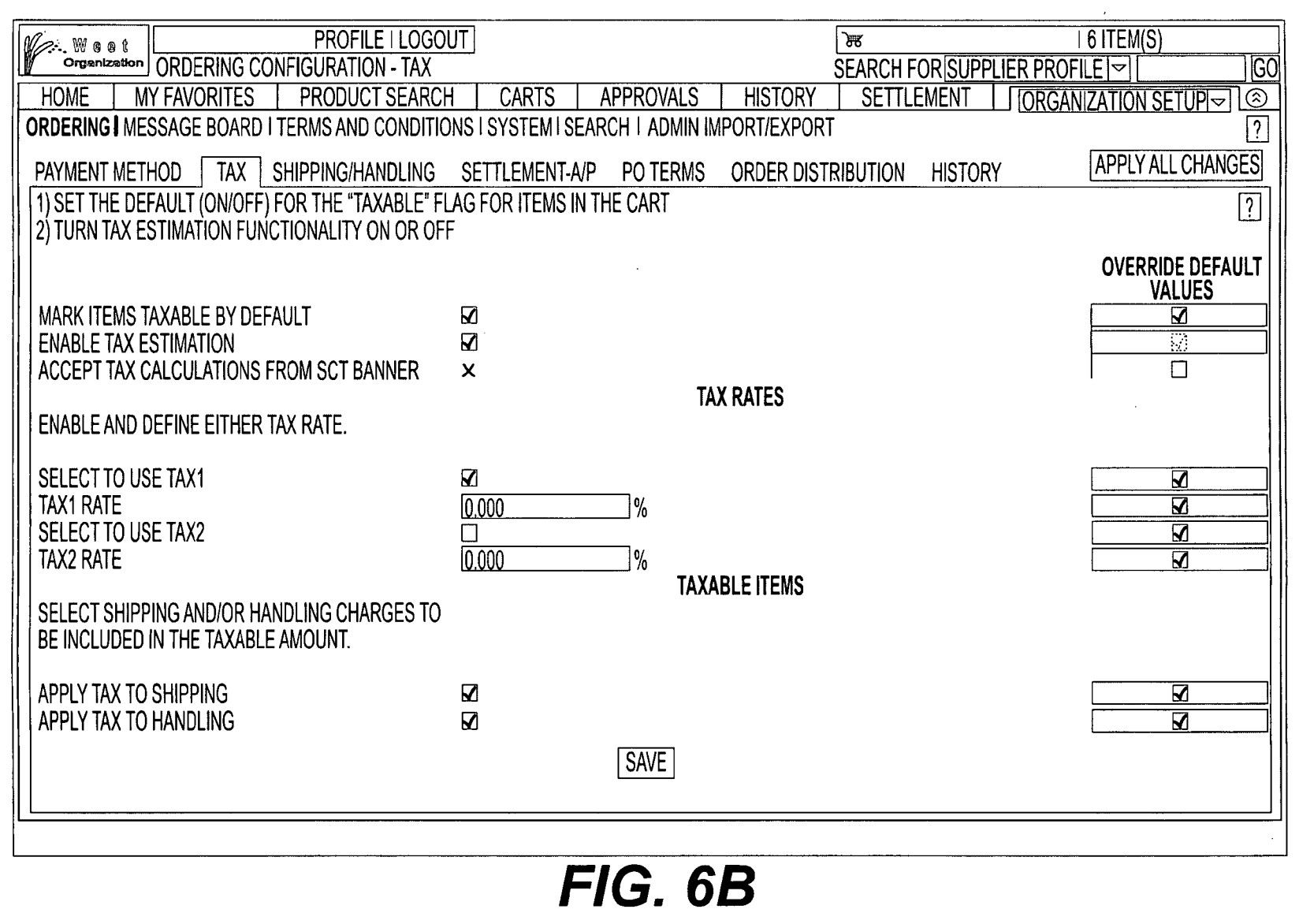
Figure 6C:
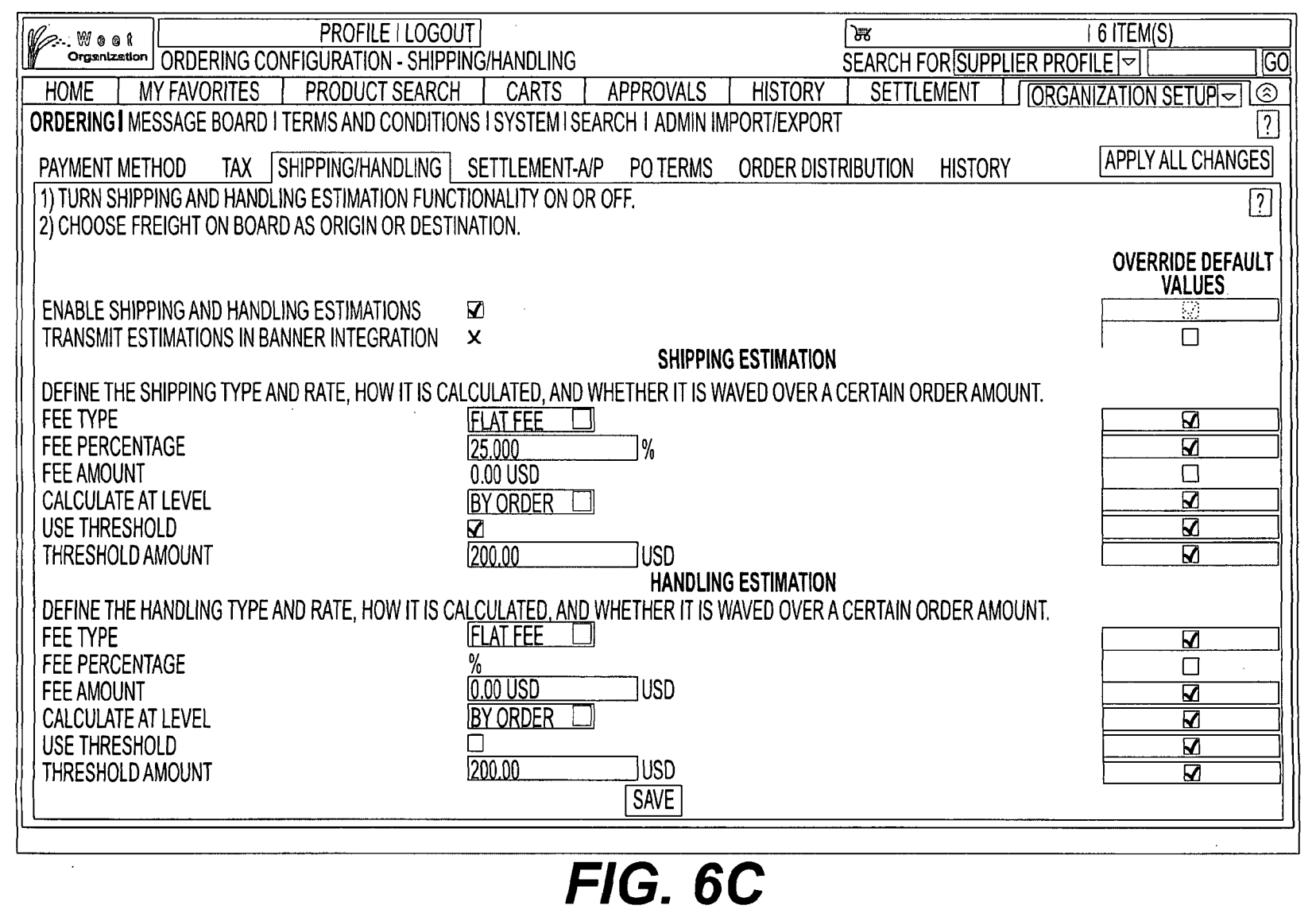
Figure 6D:
Figure 6D:
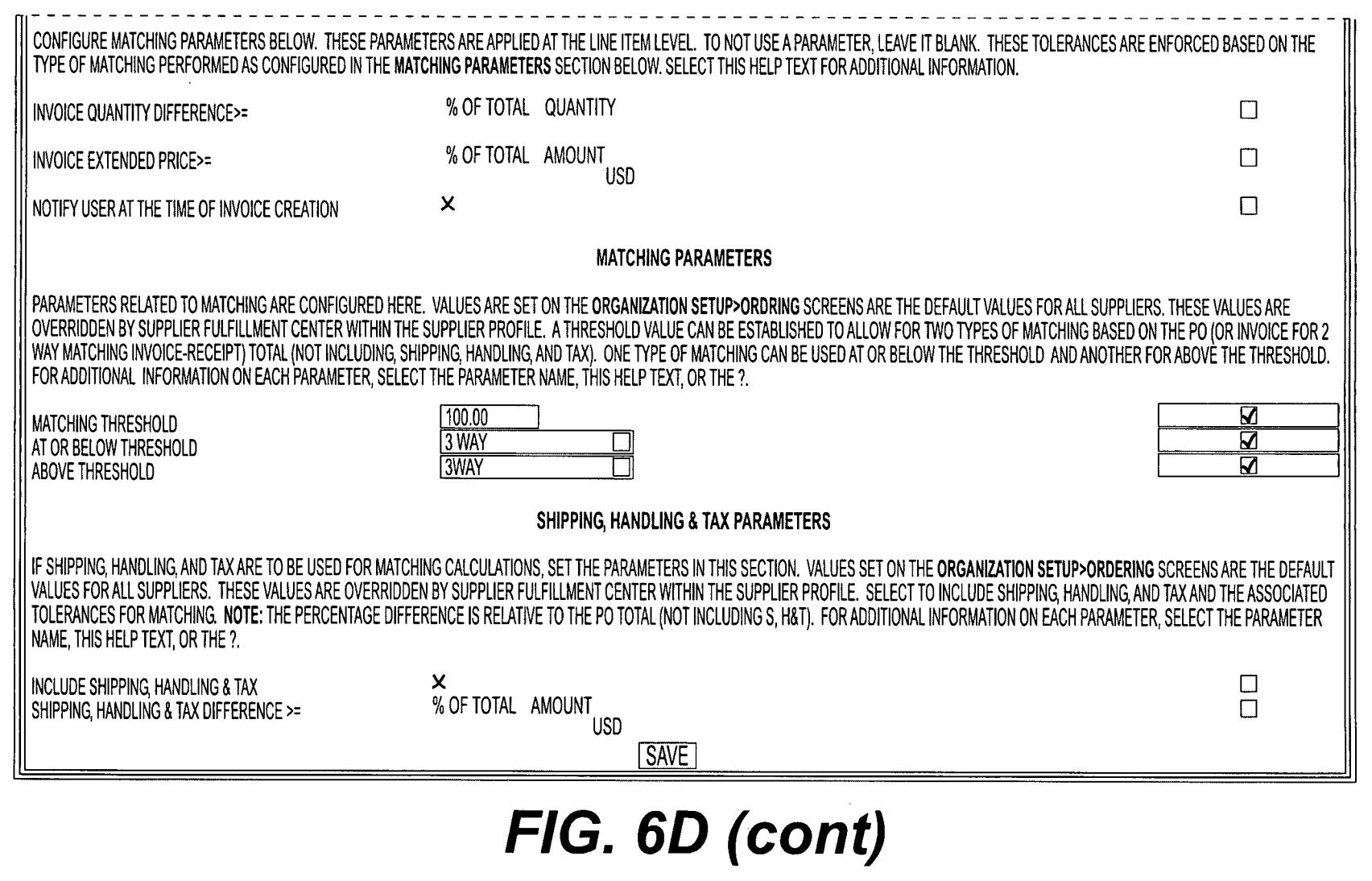
Figure 6E:
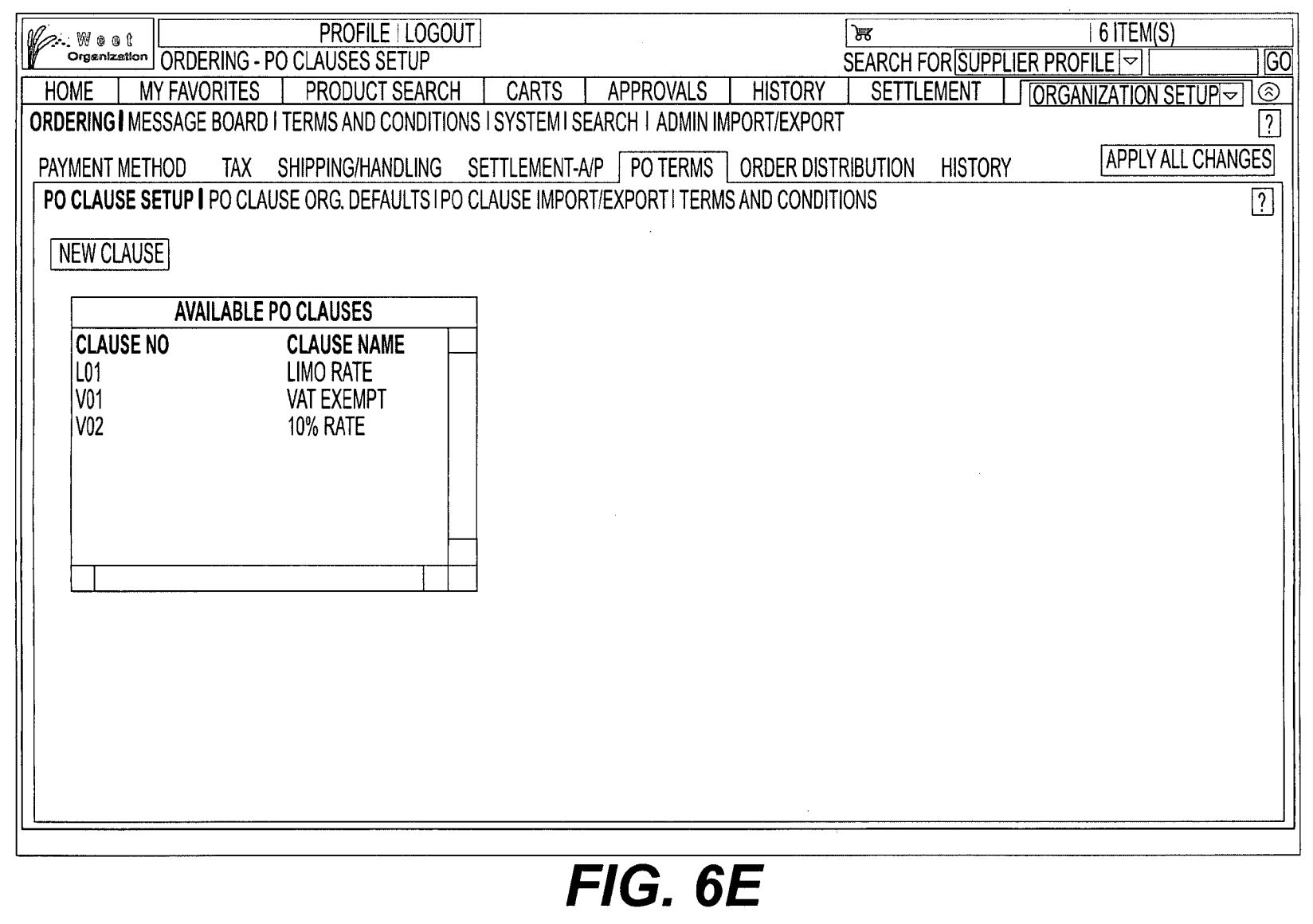
Figure 6F:
Figure 6G:
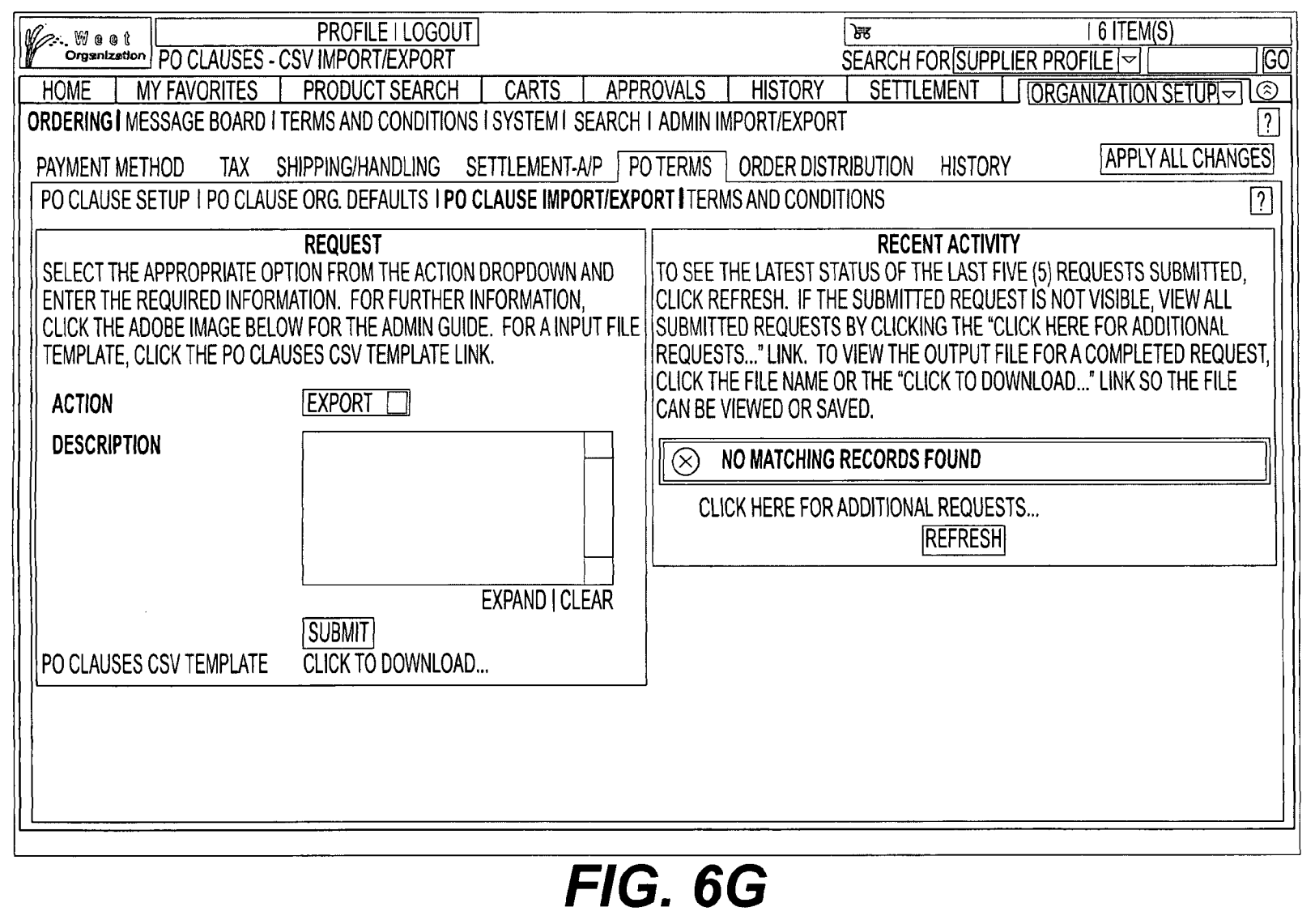
Figure 6H:
Figure 6J:

FIG. 6A illustrates an exemplary organization setup tool 600 for designating business rules such as method of payment (FIG. 6A), tax (FIG. 6B), shipping/handling (FIG. 6C), settlement (FIG. 6D), purchase order terms (FIGS. 6E-G), order distribution process (FIGS. 6I-J), and history of all actions effectuated through the organization setup tool. By organizing all of the terms and conditions of an order for each organization in a single instance, multi-tenant architecture, each requisition effectuated on the eProcurement system of the present invention are processed efficiently.

Figure 7:
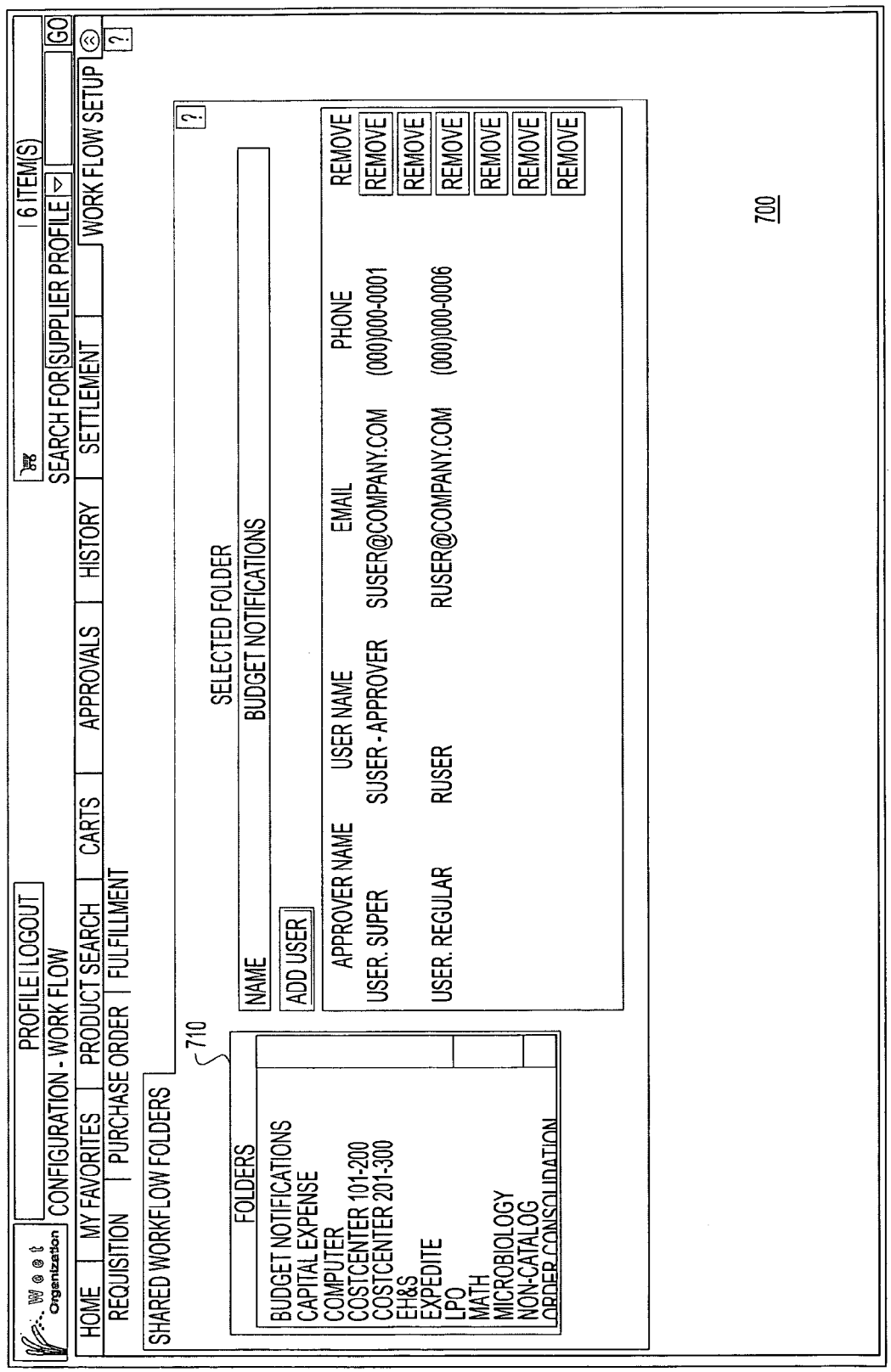
FIG. 7 illustrates an exemplary workflow setup tool in accordance with the present invention.

FIG. 7 illustrates an exemplary workflow setup tool 700 to define the workflow process of a requisition, purchase order, and fulfillment. As shown in FIG. 7, the workflow setup tool 700 in accordance with the present invention creates a shared workflow space 710 and users to be included in the workflow process.

Other configuration tools include document setup tool (not shown) to organize documents related to requisitions, purchase orders, and sales orders for access by the user. The document setup tool keeps track of the name of the document creator, version number, and any deployment dates, as well as other data related to the document. Moreover, the eProcurement system in accordance with the present invention includes a field management tool (not shown) that allows the super users to create, modify, and manage every field/parameter related to the procurement process used on the system. Accordingly, the eProcurement system of the present invention may be custom tailored for each organization/user while maintaining its single instance, multi-tenant environment.

As shown in FIG. 2, end user interfaces 212 and supplier user interfaces 214 according to the present invention provide access to the plurality of modules of the eProcurement system 10 (FIG. 1). As described above, the end user interface 212 is configurable by the end user and super users. Moreover, the end user interface 212 includes features, for example, such as searching and viewing a hosted supplier products catalog, invoking purchase/requisition orders, consummating sales transactions, invoking status queries and viewing the response, and setting end user configuration preferences as described further below. For example, the search and view feature allows for searching via product description, supplier name, manufacturer name, catalog no. (SKU), a filtering capability, and by browsing: catalog/non-catalog items, suppliers, or contracts. A user may invoke any of these search inputs alone or in combination with others. Also, Boolean logic functionality is available for searching and allows a user to devise targeted search strategies that may return more accurate search results. Once a user has invoked a search using any of the inputs described, the user may then view the returned results. The returned results can be filtered by a user based on category or supplier. Also, a user may choose to organize the returned results such that similar results are listed in proximity of one another. For example, a user may organize returned results by weight, supplier, category, catalog number, product description, UOM, product size, and price quantity.

The catalog may be implemented as single instance but multi-tenant, and may further include custom views of items as set by each internal end user organization. An end user may specify favorites within the catalog. Such favorites are available for later viewing or purchasing by the end user. Any updates made to an end user favorite within the catalog will be automatically propagated to the end user's favorite(s) view as well. The catalog may allow for supplier classifications and multiple products may be linked to a single supplier. Also, the catalog can be specifically activated or deactivated through a simple click on the end user interface, and specific product categories can be globally manipulated and applied to affect all end users. Each catalog may possibly contain information regarding one or more specific suppliers, and a master product database is primarily tasked with populating each hosted supplier products catalog. This master product database is a relatively large database with a plurality of attributes related to one or more specific products.

In addition to the hosted supplier products catalog, punch-out catalogs may also be implemented as an alternative and supplement to the hosted supplier products catalog, and are made available, for example, when the hosted supplier products catalog does not yield sufficient or satisfactory results. The punch-out catalogs essentially link to outside/third-party catalogs, are not hosted, and may also contain end user organization-specific prices. Processing modules executed on the custom database servers invoke each punch-out instance. Multiple punch-out catalogs are accessible by a single end user. An end user can return back from a punch-out catalog to the hosted supplier products catalog, and the remainder of the features of the eProcurement architecture, via a submit feature, which will then return to the processing module that initially invoked the punch-out instance. Punch-out catalogs may be configured to display relevant catalogs to an end user, based on the end user organization. An end user can browse punch-out catalogs to search for more accurate results and may, subsequently, invoke a requisition order via the third-party web site and order processing methods. Also, one or more purchase orders can be sent from one or more punch-out catalogs, but each punch-out order session may generate a single purchase order that may ultimately include orders from non-punch-out or hosted catalogs.

Further with respect to the hosted supplier products catalog, there may be a feature implemented to allow both its searching and viewing. The search/view catalog feature is invoked via a processing module that executes on the custom database servers. Upon the execution of such a search by an end user, search results can be displayed via the end user interface. The catalog search results can be displayed, for example, using a static or dynamic interactive list or table, attachment, graphic, or link. An end user may also have the option of choosing the appropriate supplier(s) from which to place an order. Upon an end user's selection of a particular supplier, the relevant supplier data is then forwarded to the transaction processing feature. The end user may later invoke a status query, via a processing module executed on the custom database servers, on a preexisting order and, subsequently, receive status notifications regarding the order.

The search feature may be implemented using several sub-features such as, for example, customized annotations (with icons) of preferred/contract suppliers, a product/supplier filter, and a product size filter. The search feature is invoked by a processing module that is executed on the custom database servers. The customized annotations (with icons) of preferred/contract suppliers allows certain products to be highlighted within search results. Furthermore, the product/supplier filter of the search feature allows certain products to be displayed, while certain others are hidden, depending on specific filter criteria chosen by the end user. Such criteria may include, for example, price thresholds, hazard level, approximate delivery date, product size, and supplier.

The search architecture is based upon an indexed, tokenized-type implementation. This search architecture may include a search engine and a tokenization feature, both of which are invoked via processing modules executed on the custom database servers. Product elements such as the product name, industry, price, and availability, among others, are primarily used to generate a product search index (e.g., a token). The process of generating a product search index/token is called "tokenization" and may be executed by a tokenization feature invoked via a processing module. The indices/tokens generated as a result of the tokenization feature, which relate to various products of a multitude of suppliers, may be stored within and executed on the hosted supplier products catalog. Searching is actually executed against what are termed as "verticals." A vertical is designed similar to a drill-down menu architecture that consists of root nodes and leaf nodes, which are children of their respective roots. Through the use of tokenization and verticals, a layer of abstraction is added that is unique in comparison to typical text-based searching of a large database, like the master product database. This added layer of abstraction allows for better organization of the underlying data. As a consequence, the use of tokens to search verticals, which organize supplier product data and search the hosted supplier products catalog, enables an efficient and methodical search strategy to be executed. Search results returned from searching the hosted supplier products catalog are forwarded back to the search engine and may appear via the end user or supplier user interfaces. For an end user, designated preferred suppliers usually appear first in the search results.

Further contained within the search architecture, a feature to allow the invocation of status queries and viewing of the response may be implemented. This feature allows a plurality of end users to send queries/requests via middleware/web methods, or direct Internet posting techniques, to the product catalog. The feature is itself invoked by a processing module that executes on the custom database servers. Such queries/requests may be intended for finding, buying, or managing products. Such products may be those of preferred contractors that are matched to the end user based on a plurality of criteria like permission, product type, industry, price, quality control metrics, delivery date, warranty types, and/or locale. Each product catalog may contain information regarding one or more specific products. A master product database populates the hosted supplier products catalog with various types of information relating to one or more specific products. The various types of information may include a "stock keeping unit" (SKU) identifier, supplier information, and product category/description/attribute information.

Further also to the search architecture, an in-stock query feature may be implemented to allow an end user, through the middleware/web methods, or direct Internet posting techniques, to determine whether any supplier might have a particular product in-stock. The feature is itself invoked by a processing module that executes on the custom database servers. Once the in-stock query feature is invoked, relevant suppliers are sent individual queries. Subsequently, each supplier response to an in-stock query is processed and the appropriate end user is notified after the in-stock query receives the supplier response(s), but before returning to the processing module.

Moreover, a quick order feature may also be implemented to enable several other sub-features such as, for example, searching by product category, SKU identifier, or host product category number/supplier part number. The feature is itself invoked by a processing module that executes on the custom database servers. Subsequently, the order feature is initially invoked by an end user that has completed a quick order search. Thus, the quick order feature enables an end user that may have knowledge of specific product attributes to perform an expedited search, retrieve search results, and proceed to ordering.

The search results of a product search exhibit other features of the invention such as those related to the presentation of results. For example, suppliers and categories contained within search results can be displayed using different customizable icons, which may be used to highlight specific suppliers and product categories. Such results can also be ranked according to priority based on whether they are supplied from preferred or contracted suppliers, or a preferred category of products from suppliers. Non-preferred or non-contracted supplier results may also presented to end users. Moreover, a product comparison chart can be invoked to highlight the differences and similarities among two or more products. The chart can contain static or dynamic presentation attributes based in part on supplier-provided data. For example, the in-stock attribute, a dynamic presentation attribute, can be used to identify whether specific products are actually available in a supplier's inventory, and their corresponding prices. A search result list can be organized by category and/or vendor based on end user preferences. Also, icons can be used to further display and highlight relevant information regarding products such as, for example, whether products are hazardous, toxic, poisonous, or are considered to be controlled substances. A proprietary taxonomy can also be implemented against modeling product categories to enable more efficient searching and, ultimately, user-friendly, organized search results.

Figure 8A:
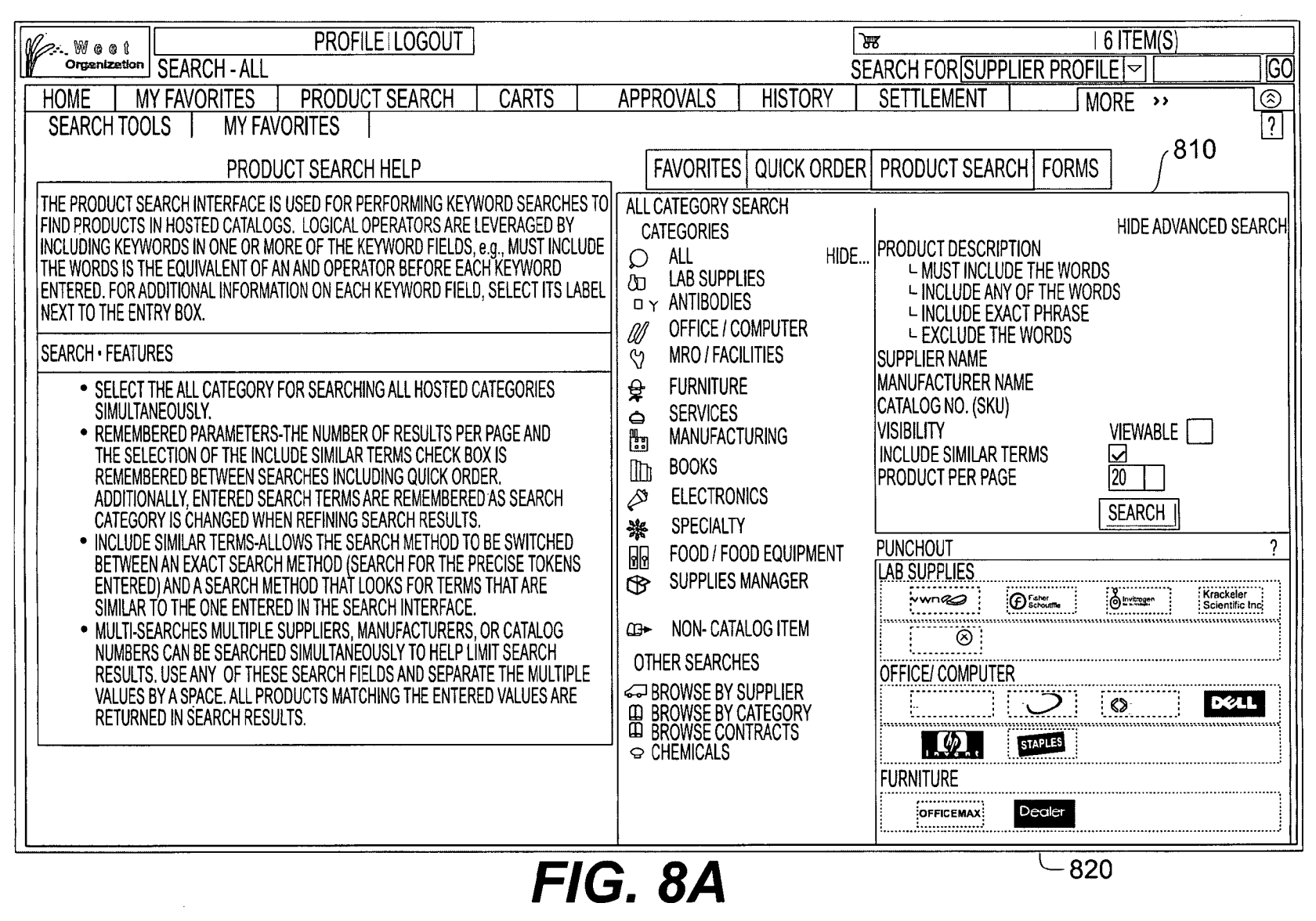
Figure 8C:

FIGS. 8A-8D illustrate exemplary search engines in accordance with the present invention. For example, FIG. 8A illustrates an exemplary parametric search engine 810 and punch-out catalogs 820. FIG. 8B illustrates an exemplary quick order search engine 830. FIG. 8C illustrates an exemplary browsing engine based on suppliers. FIG. 8D illustrates an exemplary browsing engine based on categories of the products and/or services. Other search engines may be used without departing from the scope of the present invention. Therefore, eProcurement system in accordance with the present invention couples the configuration tools described above for customizing access to specified suppliers and/or specified types of products based on department, position, and/or roles of the user for each organization with various search engines to provide a single instance, multi-tenant architecture.

As shown in FIG. 2, supplier user interface 214 in accordance with the present invention and further described below is configurable by supplier users and super users, and includes features, for example, such as accessing a supplier hosted products catalog, viewing and responding to purchase orders, consummating sales transactions, viewing and responding to status queries, and setting supplier user configuration preferences. Each individual end user and supplier user may have a different interface from another end user and supplier user, respectively. Furthermore, the supplier end user interface of the present invention may allow a plurality of supplier users to send queries/requests via middleware/web methods server 224 to custom database servers 222, and to a hosted supplier products catalog 234 that is multi-tenant managed. A remote supplier user query/request is sent via the supplier end user interface 214 over the Internet, or other inter-networked connection, and is first received by the web servers 225 after passing through the firewall 218. Then, the web server 225 passes the query/request to the middleware/web methods server 224, where business rules may be enforced. Subsequently, depending on whether the query/request is related to a transaction or a user search, it is either forwarded to the transaction processing servers 223 or custom database servers 222, respectively. For either type of query/request, the hosted supplier products catalog 234 is then readily accessible via processing modules for exchanging transaction/product data, or performing a search/supplier operation. The hosted supplier products catalog 234 can serve as a quasi-link between the end user interface and the supplier interface because it is accessible by both interfaces. Supplier users can access the catalog via the middleware/web methods servers 224, which then forward the supplier access request to the custom database servers 222 and processing modules for execution, in order, for example, to update their own supplier data. End users may be able to search multiple suppliers within the catalog via the end user interface 212, subject to access rules set by the super user. End users may search the catalog for specific end user product requirements via the middleware/web methods servers 224, which forward the end user search request to custom database servers 222 and processing modules for execution. Subsequently, the end user may then invoke requisition and purchase orders via the middleware/web methods servers 224, which forward the end user order to the transaction processing servers 223 for execution.

As described above, to support the product search function, the eProcurement system of the present invention includes a master catalog database of all the products from all the suppliers hosted on the system to implement a single instance, multi-tenant environment. Accordingly, the eProcurement system of the present invention includes a catalog management tool 900. The catalog management tool 900 includes supplier tool 910, categories tool 920, supplier classification tool 930, category classification tool 940, product views tool 950, pricing tool 960, map attributes tool 970, and consortium management tool 980.

Figure 9A:
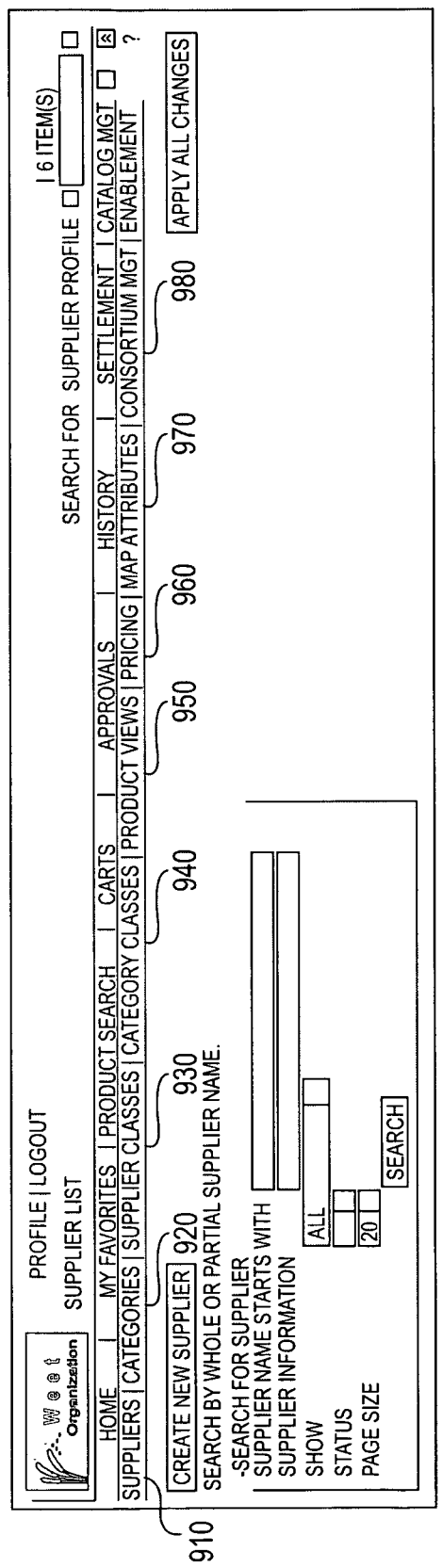
Figure 9B:
Figure 9C:
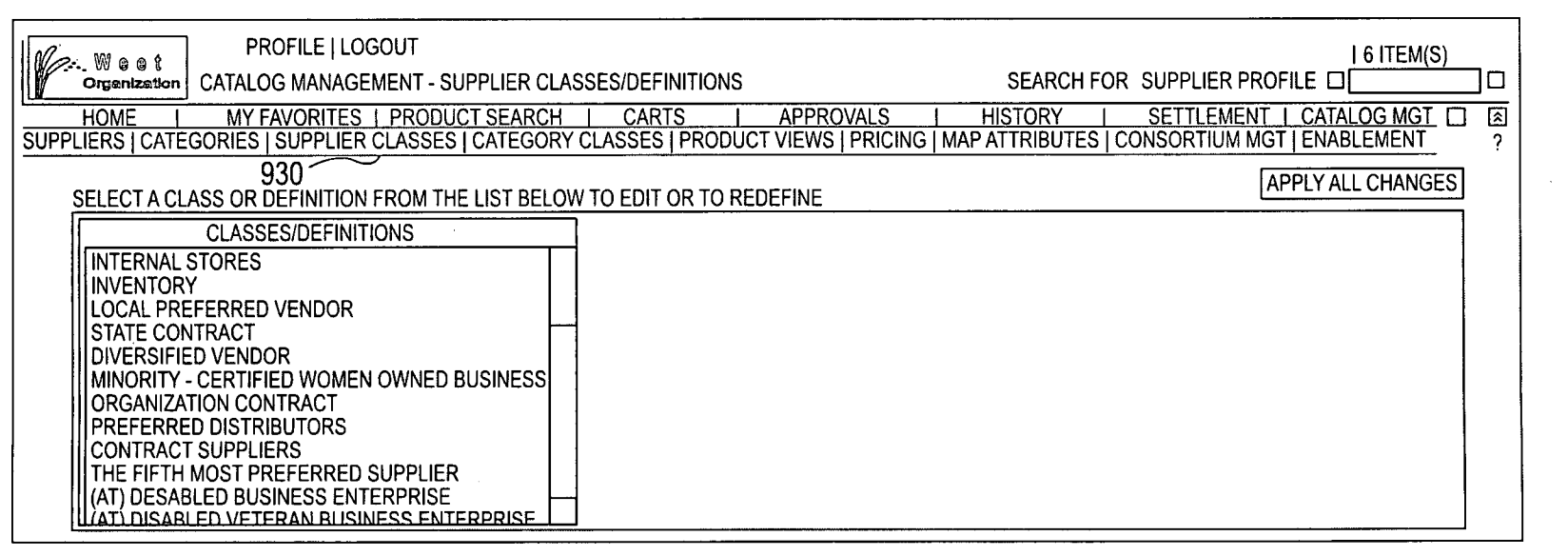
Figure 9D:
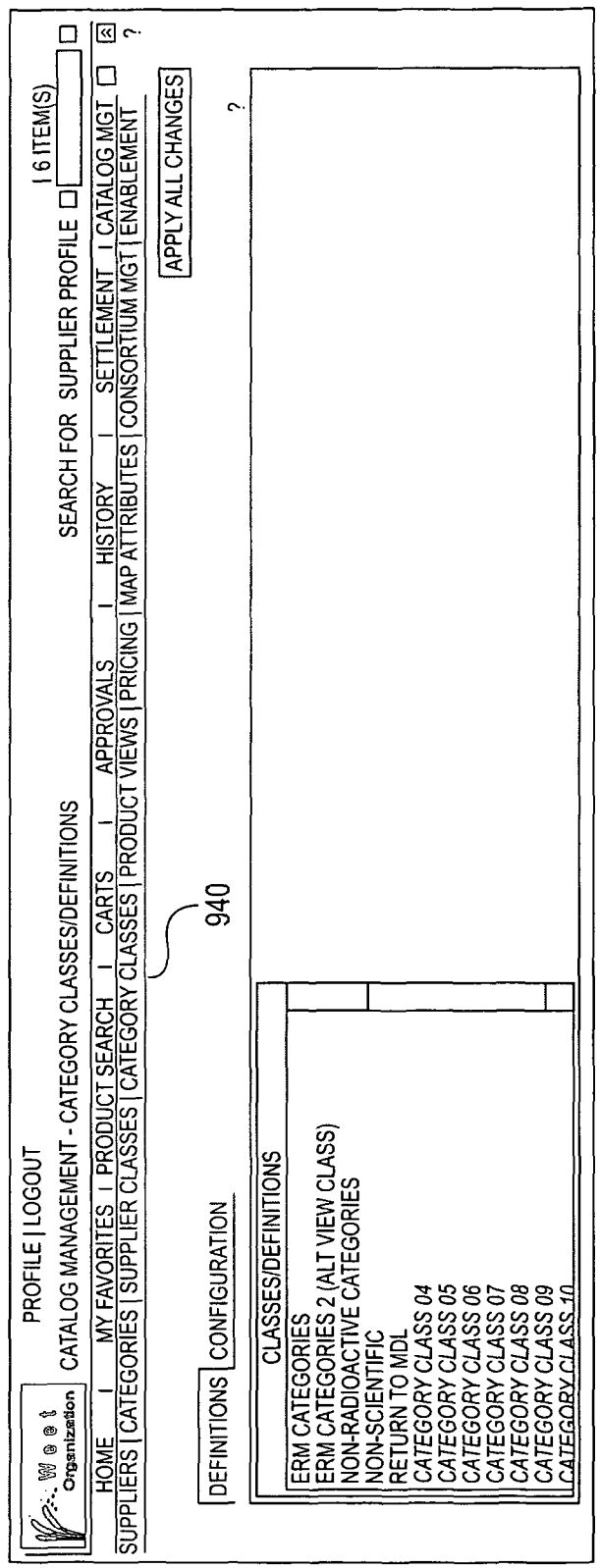
Figure 9E:
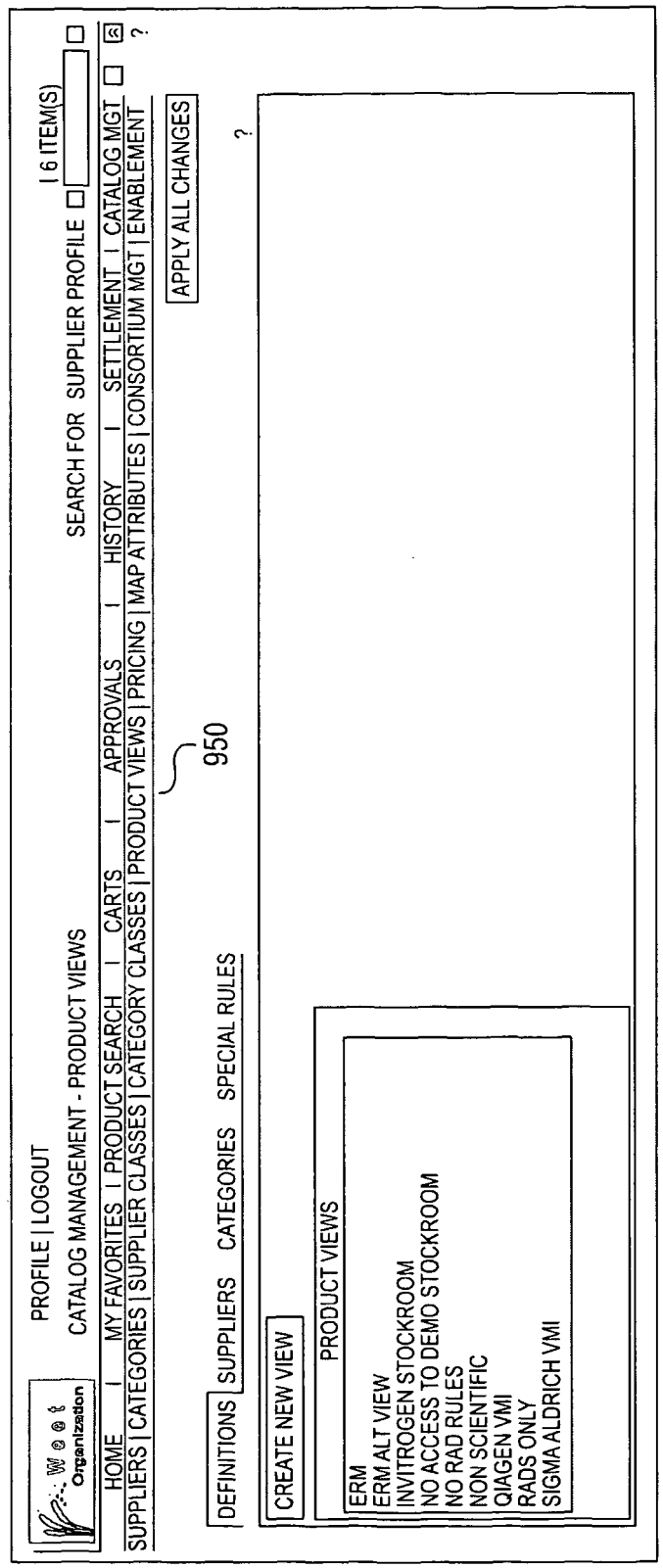

FIG. 9A illustrates an exemplary catalog management tool 900 with an exemplary supplier tool 910 invoked. The supplier tool 910 includes a search engine that searches for existing suppliers hosted in the eProcurement system of the present invention. Furthermore, the supplier tool 910 adds new suppliers not yet hosted in the system. FIG. 9B illustrates an exemplary categories tool 920 that configures all the products offered from the hosted suppliers into defined categories. Classifications for suppliers and product categories within the system of the present invention are defined and managed by the supplier classification tool 930 (FIG. 9C) and category classification tool 940 (FIG. 9D). In particular, new classes of suppliers and product categories may be created, defined, and configured as needed through the supplier classification tool 930 and category classification tool 940. In addition, existing classifications of suppliers and product categories may be modified. The product views tool 950 manages the views of products based on the defined supplier and product categories (FIG. 9E).

FIG. 9F illustrates an exemplary pricing tool in accordance with the present invention. As shown, pricing tool 960 manages various pricing sets of each hosted supplier for the hosted products. The pricing set types may include organizational prices, contract prices, list prices, and consortium prices. Other pricing sets may be used without departing from the scope of the invention. The pricing tool 960 tracks versions of each type of pricing sets, status of the pricing sets (e.g., implicitly approved, not reviewed, rejected, approved, etc.), as well as the audit history of each pricing set. Accordingly, the appropriate pricing set may be tracked, managed, and invoked for each organization for each type of product.

Other types of catalog management tool 900 include the map attribute tool 970 and consortium tool 980. The map attribute tool 970 manages various parameters of the procurement activity, such as product codes, parameter format, and unit of measure (UOM). For example, commodity code configuration parameters may be set through the map attribute tool 970 to determine if and how the category taxonomy is to be mapped to, for example, an organization's set of category/commodity values. The commodity codes may be modified as categories, sub-categories, and on down to the product level. The list of values may be set manually or imported/exported from/to an already existing file. As another example, universal product codes (e.g., UN/SPSC) and UOM may also be configured to be mapped to an internal organization codes for automatic conversion when searching, viewing, and ordering products. Further, UOM may be mapped from standard UOM to organization specific UOM. The consortium tool 980 defines various consortiums that an organization may be a member of and offer consortium pricing by designating a supplier as a consortium supplier. Hence, all organizations that are members of the consortium will be offered the consortium pricing set when ordering from the designated supplier.

As shown in FIG. 2, the server technology of the present invention includes a middleware/web methods server 224 that hosts a variety of features related to administrative services management, content management, and application management described above. The middleware/web methods server 224 may, for example, manage business rules (i.e., the relationships) between end users and suppliers based, in part, on contractual terms or other arrangements, as processed according to the price and file management feature. For example, supplier user-side business rules may, for example, designate preferences regarding delivery terms (e.g., restrictions against odd lot sales, FOB preference, carrier preference, etc.), and price and insurance terms (e.g., CIF preference, applicable sales tax, etc.). Similarly, end user-side business rules may, for example, designate preferences regarding preferred suppliers, delivery terms (e.g., FOB preference, default quantity, carrier preference, etc.), and price and insurance terms (e.g., CIF preference, applicable sales tax, etc.). At least one advantage of implementing end user-side and supplier user-side business rules is the capability to be able to generate customized purchase orders, in accordance with contractual or default business rules. Such purchase orders are created by the invoke requisition/purchase orders feature, which is invoked via processing modules that are executed on the custom database servers 222. Middleware/web methods server 224 may apply default ordering, sales, delivery, and other terms in the instance where an end user and supplier user do not have existing contractual terms or other arrangements.

The middleware/web methods server 224, as well as the transaction processing server 223, implements the price and file management feature to access existing contracts between end users and suppliers. The feature is usually implemented as a component of the middleware/web methods server 224, but may also be invoked via transaction processing modules that are executed on the transaction processing servers. Contract management algorithms may also be implemented as a sub-feature of the price and file management feature. For example, the algorithms are usually responsible for accessing, retrieving, and processing data from each respective end user and supplier that might have negotiated a contract. FIG. 10 illustrates an exemplary contracts management tool 1000 that may be used to manage the contracts between an organization and a supplier. The contract data is accessible by the transaction processing servers 223 and transaction database 238. Suppliers are able to submit product prices and other product related data via the price and file management feature. Furthermore, multiple pricing schemes can be created by suppliers for end user organizations and may be based on contractual terms negotiated between end user organizations and suppliers. Individual end users within the same organization, for example, may be assigned different price schemes that may be based on different contractual terms with an individual supplier. A designated end user (e.g., a "contract manager"), akin to a super user, can be assigned the responsibility for managing and choosing the pricing schemes displayed to each individual end user within the organization. The designated end user may also be tasked with ranking the spending thresholds for triggering a new price tier. Individual end users are capable of accessing pricing schemes for supplier products where the end users have been granted access by the designated end user or super user. By default, the lowest supplier pricing scheme available is first displayed to the end user, although other pricing schemes may also be available and accessible.

The following algorithm, for example, may be implemented to determine which pricing scheme should be displayed to an individual end user. First, all pricing schemes for a specific product may be denoted as accessible. A filter-type method may then be used to exclude pricing schemes denoted as inaccessible to the end user organization and, thus, allowing only accessible pricing schemes. Another filter-type method may be used to determine which accessible pricing schemes, if any, are related to contracts negotiated between the end user organization and accessible suppliers. If no pricing schemes are related to any contracts, then a default/general pricing scheme is displayed to the end user. Finally, if at least one pricing scheme is related to any related contracts, then a filter-type method excludes those pricing schemes related to contracts deemed inaccessible to this end user, and permits the accessible pricing schemes to be displayed. The displayed accessible pricing schemes would, however, be subject to the end user spending thresholds, which may be set by a super user. When an end user invokes the generation of a purchase/requisition order, the appropriate pricing scheme is referenced and can be based upon available contractual terms with the appropriate supplier.

An end user organization can manage pricing schemes such that distinct contracts are assigned to specific end users or super users. The feature to manage pricing schemes is invoked via transaction processing modules executed on the transaction processing servers 223. The specific end users or super users have the ability to approve or reject contracts, and set extended dates. Moreover, supplier users have the ability to create multiple pricing schemes that may be based on contractual terms with end user organizations. Whether an individual end user is a constituent of a trade group, department, or other organization, may influence the pricing scheme determination. Supplier users can also have the ability to load single or multiple pricing schemes for end users within the same data sink (e.g., hosted supplier products catalog), which may later be processed by the price and file management feature and assigned to each respective end user. Moreover, end users can designate specific products from supplier pricing schemes as favorites. End user favorites can be dynamically updated with the lowest available supplier pricing scheme.

The transaction processing servers 223 of the present invention may execute transaction processing modules that query, update, and/or create data model instances within the transaction database 238. Moreover, end users can also approve, request to modify, or reject supplier products within hosted catalogs, and can also assign and route specific supplier products to other appropriate end users for review, dependent upon end user specific attributes like title within the organization. For example, certain end users may be able to access hazardous and/or expensive supplier products, while other end users may not based on their precedence within the end user organization. Similarly, certain end users may also have the ability to make high-volume orders, while others may not. The hosted supplier products catalog 234 may be routinely updated by each supplier user at his/her discretion, or on a monthly, quarterly, and annual basis, and may contain data from suppliers such as, for example, custom product lists and end user organization-specific prices.

Figure 11A:
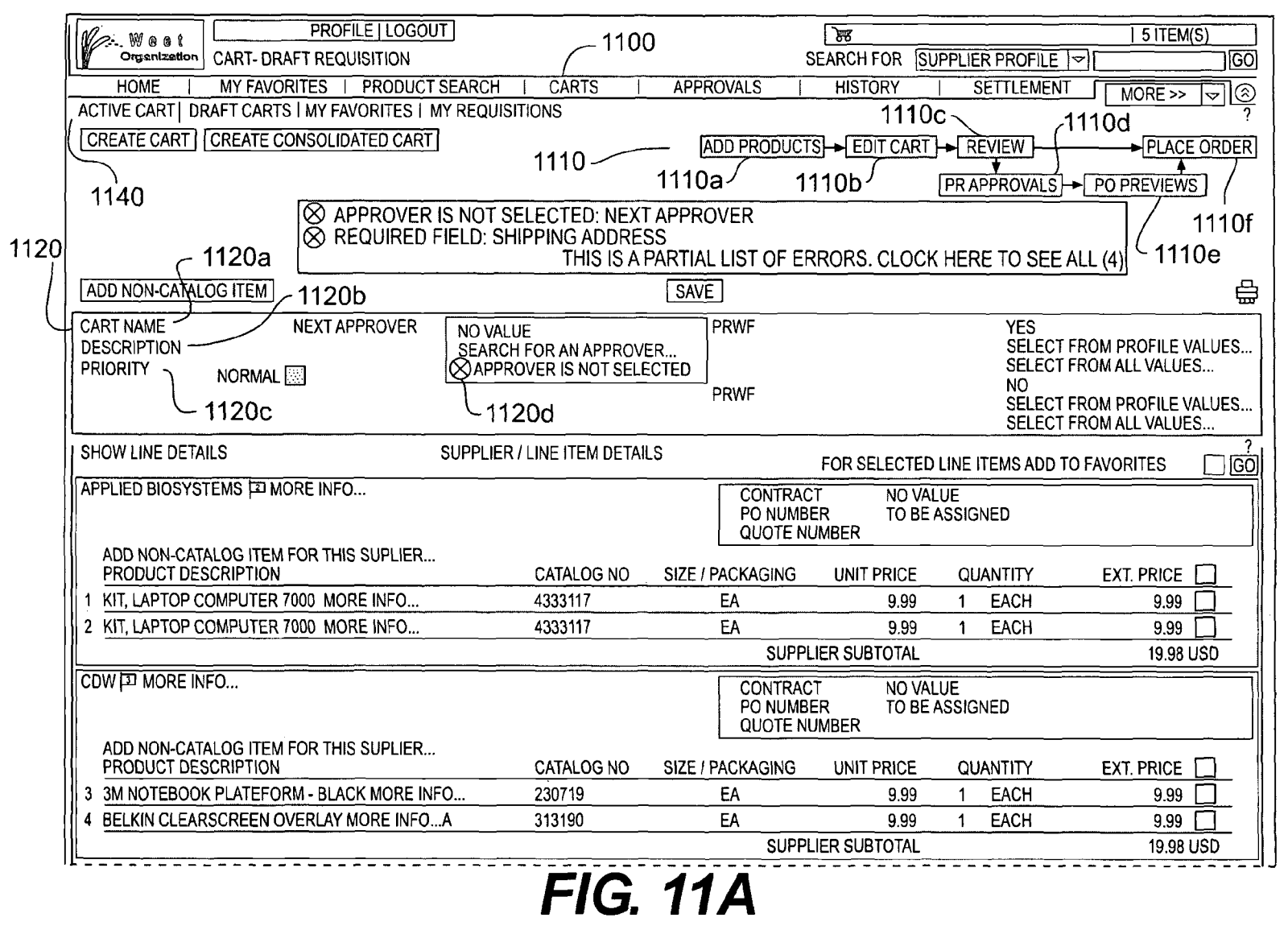

FIG. 11A illustrates an exemplary cart and requisition tool 1100 in accordance with the present invention. As shown in FIG. 11A, the cart and requisition tool 1100 includes an active cart 1140 for tracking the items designated for purchase from the search results described above. In an exemplary embodiment illustrated in FIG. 11A, the active cart 1140 includes requisition workflow tool 1110 that displays a live view of the requisition process for the items in the cart. For example, the requisition workflow tool 1110 displays the status of the requisition from the point at which a product is added 1110*a*, the cart is edited 1110*b*, the requisition is reviewed 1110*c*, and the order is placed 1110*f*. The requisition workflow tool 1110 further displays a purchase requisition approval step 1110*d* as well as a purchase order preview step 1110*e*. Each of the status boxes 1110*a*-1110*f* of the requisition workflow tool 1110 may be invoked to activate the tool that manages the corresponding status. For example, invoking the "Add Products" box 1110*a* (e.g., clicking on the box) activates the search engine to search for additional products to be added to the cart 1140. Invoking the "Edit Cart" box 1110*b* activates the active cart 1140 for editing the products in the cart. Invoking the "Review" box 1110*c* activates a summary of the products included in the requisition, including, for example, accounting codes, billing and shipping addresses, and other customizable data elements that may be configured by the user's organization. Invoking the "PR Approvals" box 1110*d* displays the set of workflow/approval steps an invoked requisition will be processed through prior to order creation. Invoking the "PO Preview" box 1110*e* activates a list of purchase orders that are generated if the invoked requisition is approved. Invoking the "Place Order" box 1110*f* submits the invoked requisition to the steps of the workflow/approval process.

Cart information 1120 such as cart name 1120*a*, description 1120*b*, priority 1120*c*, and assigned approver 1120*d* are also displayed and may be edited. The cart information 1120 further includes supplier and line item details organized alphabetically, for example, according to each supplier's name, and list each chosen product description, catalog number, size and/or packaging data, unit price, quantity ordered, and price. For each supplier there is also a corresponding supplier subtotal that is calculated according to the total of products chosen by the user.

Figure 11B:
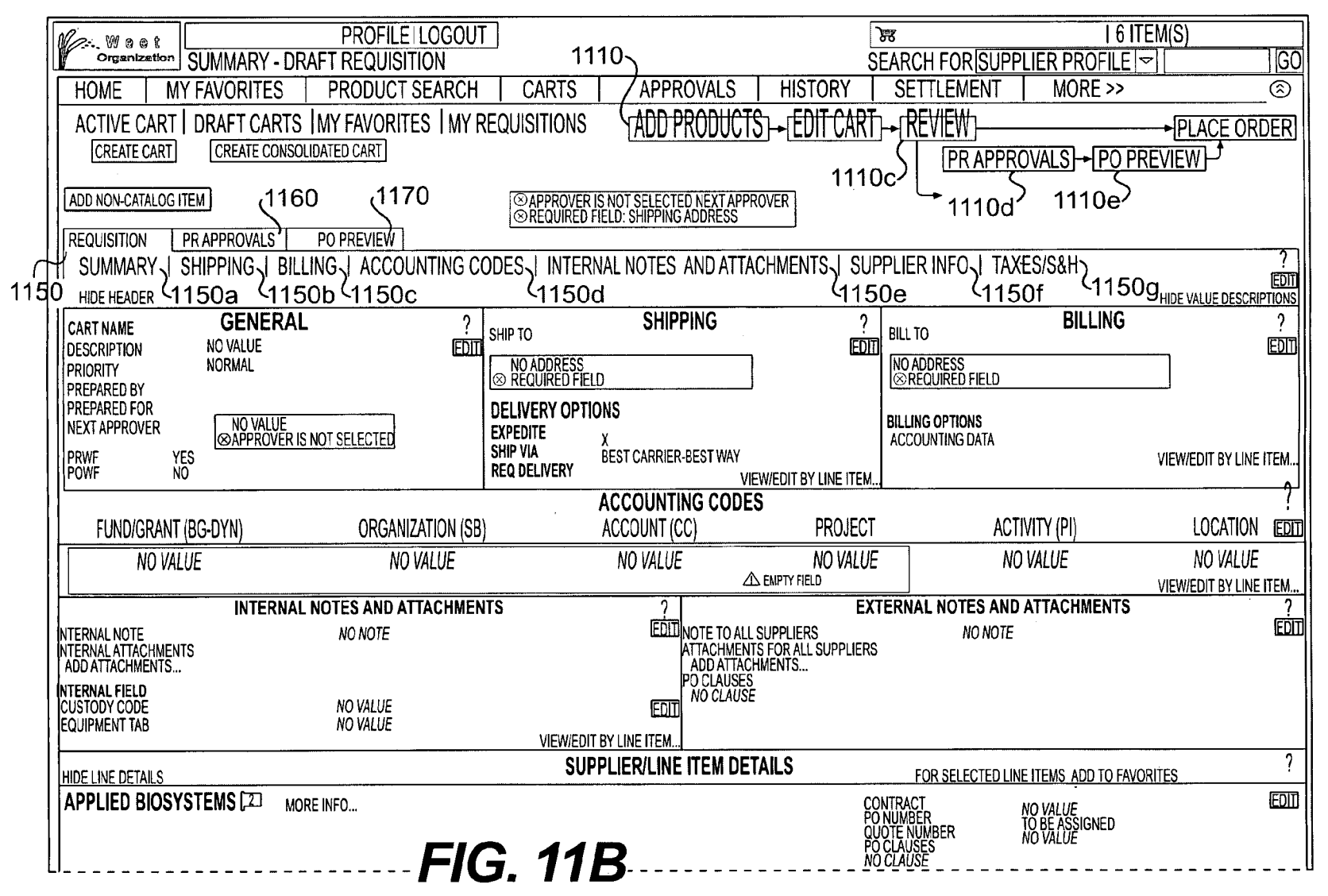
Figure 11B:
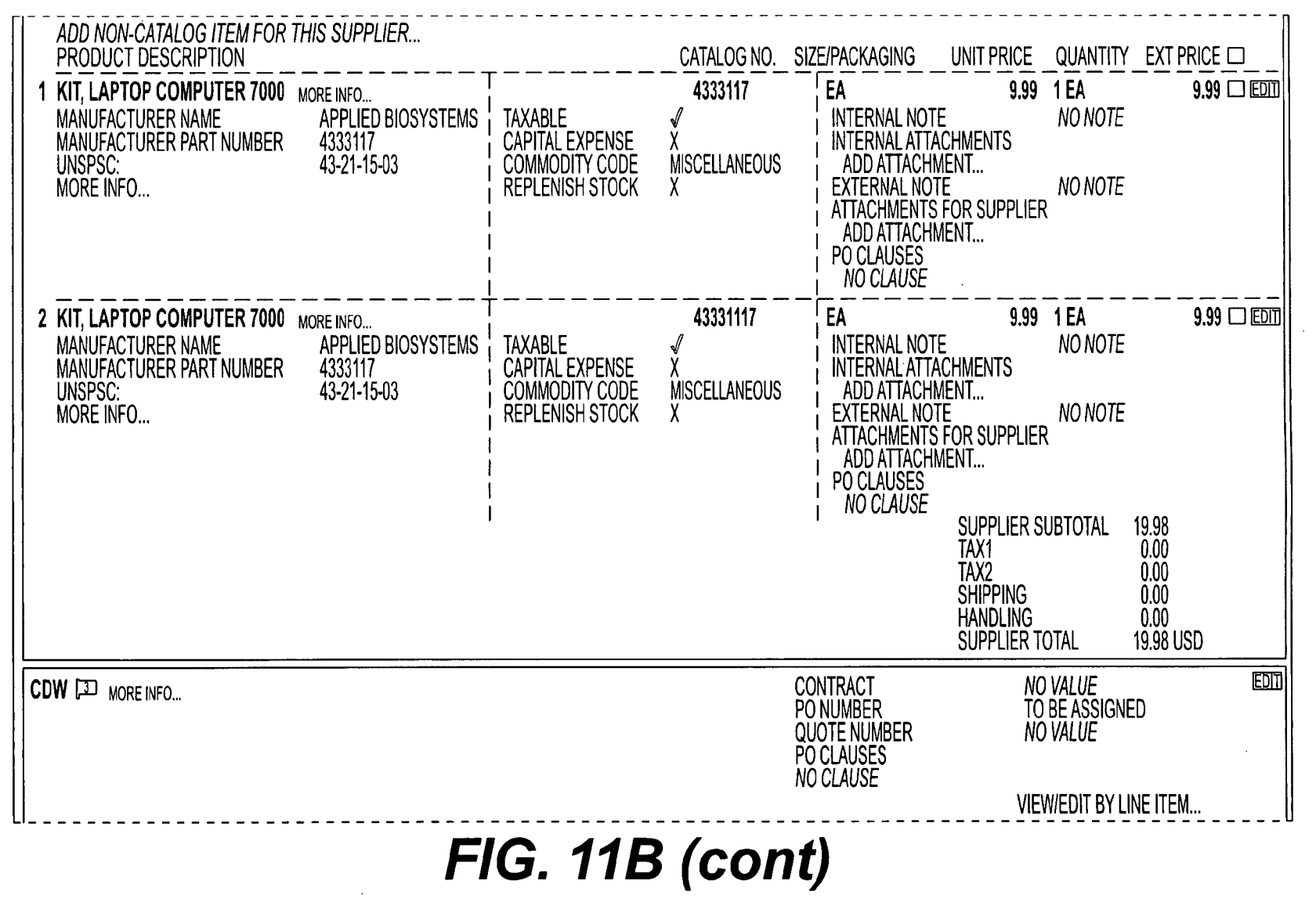

FIG. 11B illustrates further details of the exemplary cart and requisition tool 1100 in accordance with the present invention. As shown, the cart and requisition tool 1100 includes a requisition review tool 1150, purchase request approval tool 1160, and purchase order preview tool 1170. As described above, the various status boxes (e.g., 1110*c*-1110*e*) in the requisition workflow tool 1110 activate the corresponding tool 1150-1170. As shown in FIG. 11B, the requisition review tool 1150 displays information about the requisition being built. For example, as shown, the requisition review tool 1150 includes a summary page 1150*a* that displays all the information regarding the requisition being reviewed, such as the general information, shipping information, billing information, accounting codes, internal/external notes and attachments, as well as supplier/line item details of the products in the cart 1140. All of the information shown in the requisition summary page 1150*a* may be edited by invoking the corresponding tool, such as the shipping/handling tool 1150*b*, billing tool 1150*c*, accounting code tool 1150*d*, notes and attachment tool 1150*e*, supplier information tool 1150*f*, and taxes/S&H pricing tool 1150*g*.

For instance, the shipping/handling tool 1150*b* may be used to set the shipping address of the products in the purchase order as well as designate delivery options, such as "expedite," "shipping method," and "requested delivery date." The billing tool 1150*c* may be used to set the billing address and billing options, such as accounting dates. The accounting tool 1150*d* may be used to designate the accounting information of the requisition, such as any fund/grant contacts, organization information, account numbers, product codes, activity summaries, and location. The notes and attachments tool 1150*e* may be used to designate any internal codes associated with the products in the purchase order, such as custody codes and equipment codes used in the organization. The supplier information tool 1150*f* may be used to assign or modify supplier information for the products in the order, such as contract information with the supplier, purchase order number, quote number, and purchase order clauses. The taxes/S&H tool 1150*g* may be used to define the tax/S&H information related to purchases from a particular supplier, such as tax percentage and/or S&H cost from total purchase price (e.g., 0% tax, free shipping if over $200 purchase, etc.).

Figure 11C:
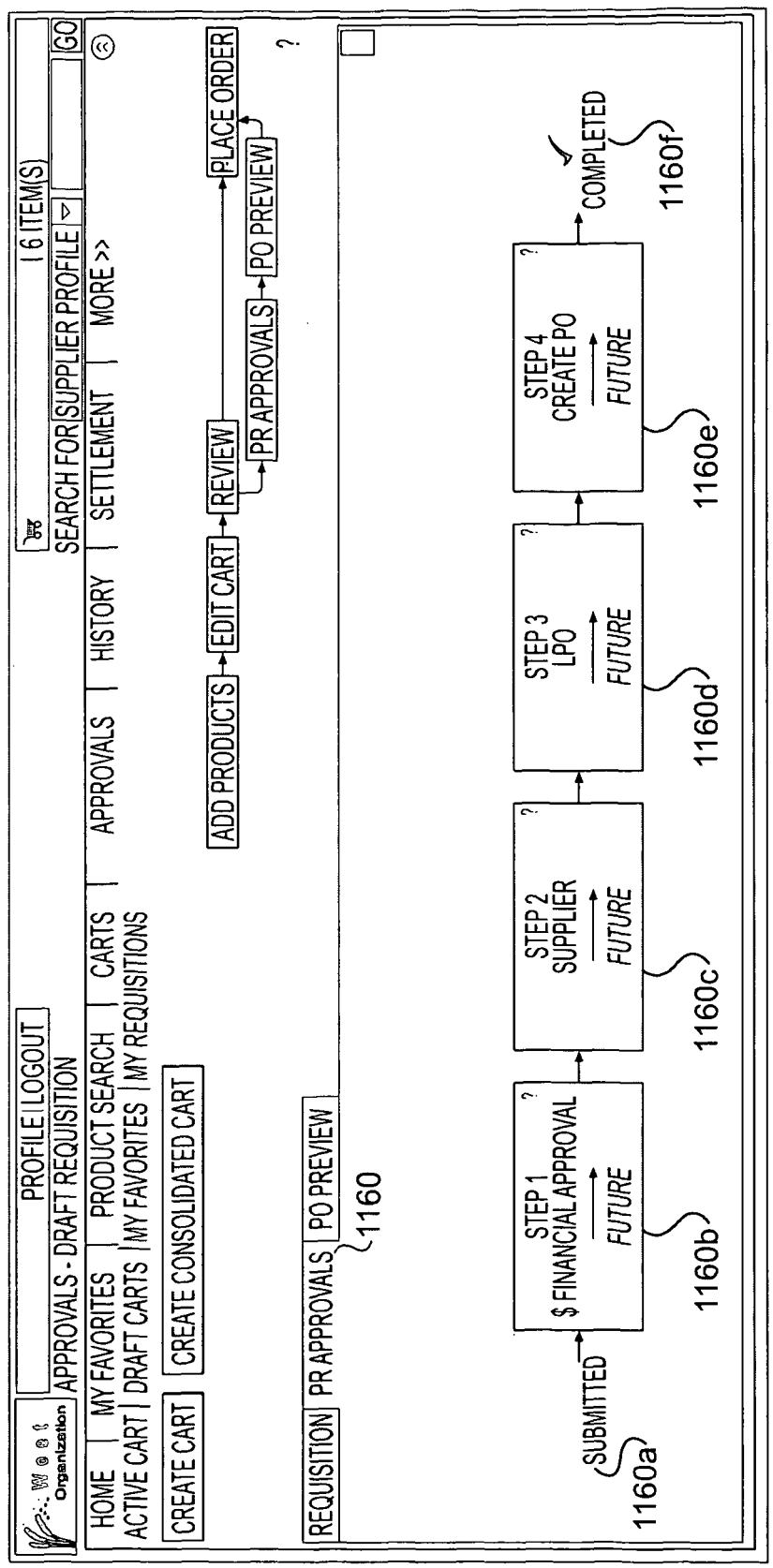

FIG. 11C illustrates an exemplary purchase request approval tool 1160 that corresponds to the purchase requisition approval step 1110*d* in accordance with the present invention. The exemplary purchase request approval tool 1160 graphically portrays the status of the requisition being reviewed (e.g., submission of the purchase requisition 1160*a*, financial approval 1160*b*, supplier approval/processing 1160*c*, LPO 1160*d*, purchase order creation 1160*e*, and completion 1160*f*). As with the requisition workflow tool 1110 (FIG. 11B), each workflow/approval step status box may be invoked to activate a tool, corresponding to each workflow/approval step, to view the reason(s) underlying the workflow engine's invocation of that step. Other intervening or superseding steps may also be portrayed without departing from the scope of the present invention.

Figure 11D:
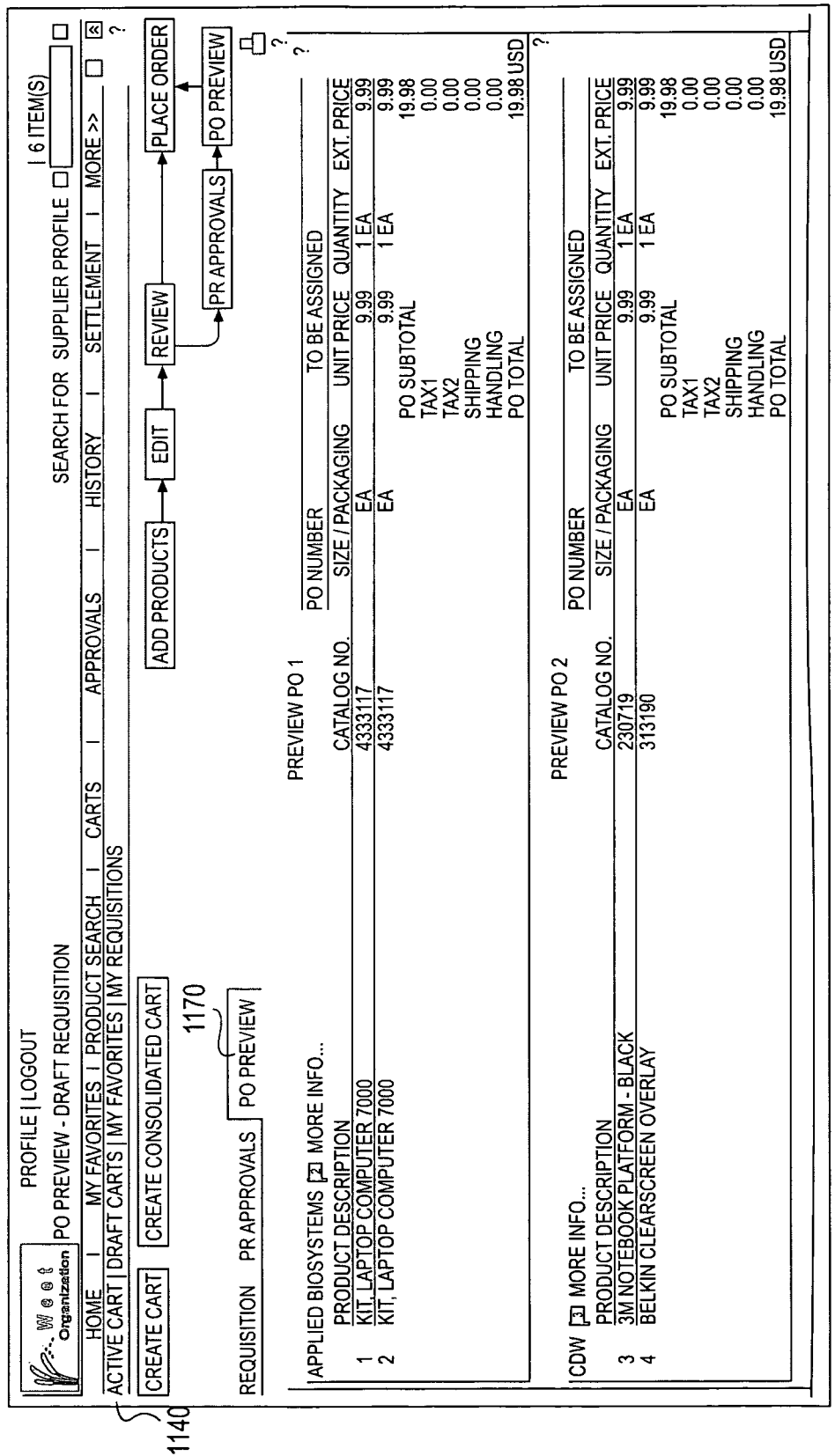

FIG. 11D illustrates an exemplary purchase order preview tool 1170 that corresponds to the purchase order preview step 1110*e* in accordance with the present invention. The purchase order preview tool 1170 permits the user to preview the purchase orders that will be generated from the current active cart 1140. The active cart 1140 corresponding to that user is queried and the preview purchase orders are displayed, as shown, in alphabetical order according to supplier name. Other methods of ordering or retrieving the purchase orders corresponding to the user may also be used without departing from the scope of the present invention.

With reference to FIG. 2, the feature to invoke purchase/requisition orders may be hosted on the middleware/web methods servers 224 and managed by the eProcurement architecture of the present invention such that it is executed consistently with end user and supplier user business rules as described above. From a high-level point-of-view, this feature is implemented based on whether the order information sought to be processed by an end user is internal to the organization or supplier related. If the information is internal, it is processed accordingly via the end user 212, the middleware/web methods servers 224, through to the custom database servers 222, and then to the hosted supplier products catalog 234; otherwise, the information is processed similarly except that the appropriate supplier related databases (e.g., the master product database 236, and the transaction database 238) may also be invoked.

An auto purchase order feature is available via the middleware/web methods servers 224 and is invoked via transaction processing modules executed on the transaction processing server 223, and can populate entries of a purchase order in accordance with applicable end user and supplier contractual terms. The auto purchase order feature allows for the generation of distribution, and payment, rule-based purchase orders based on the customizations effectuated by the super user of the organization in the manner described above. For example, the feature can automatically insert legal terms (e.g., the right to cure product defects, what constitutes rejection and/or revocation of an order, what may constitute a material defect, the seller's return policy, the buyer's acceptance policy, etc.), as well as other non-legal terms and conditions (e.g., preferred delivery dates, shipping and handling instructions, appropriate contact/authorized personnel, payment and receipt of payment instructions, etc.), based on a contract that may be in place between an end user organization and a supplier. If no contract is in place, then the auto purchase order feature may prompt the user or automatically insert default terms and conditions, whether legal or non-legal. The feature may create receipts for each end user initiated transaction/purchase order and add multiple transactions/purchase orders to a single receipt. For capable suppliers, automated responses can be accepted for display to the end user. Such automated responses may include, for example, order acknowledgement and advanced shipping notice. Also, a document search sub-feature allows searching any existing transactions/purchase orders. The auto purchase order feature also supports supplier pricing schemes modeled using the U.S. Dollar as well as all other currency types (e.g., Euro, Yen, Pound, Peso, etc.).

Figure 12:
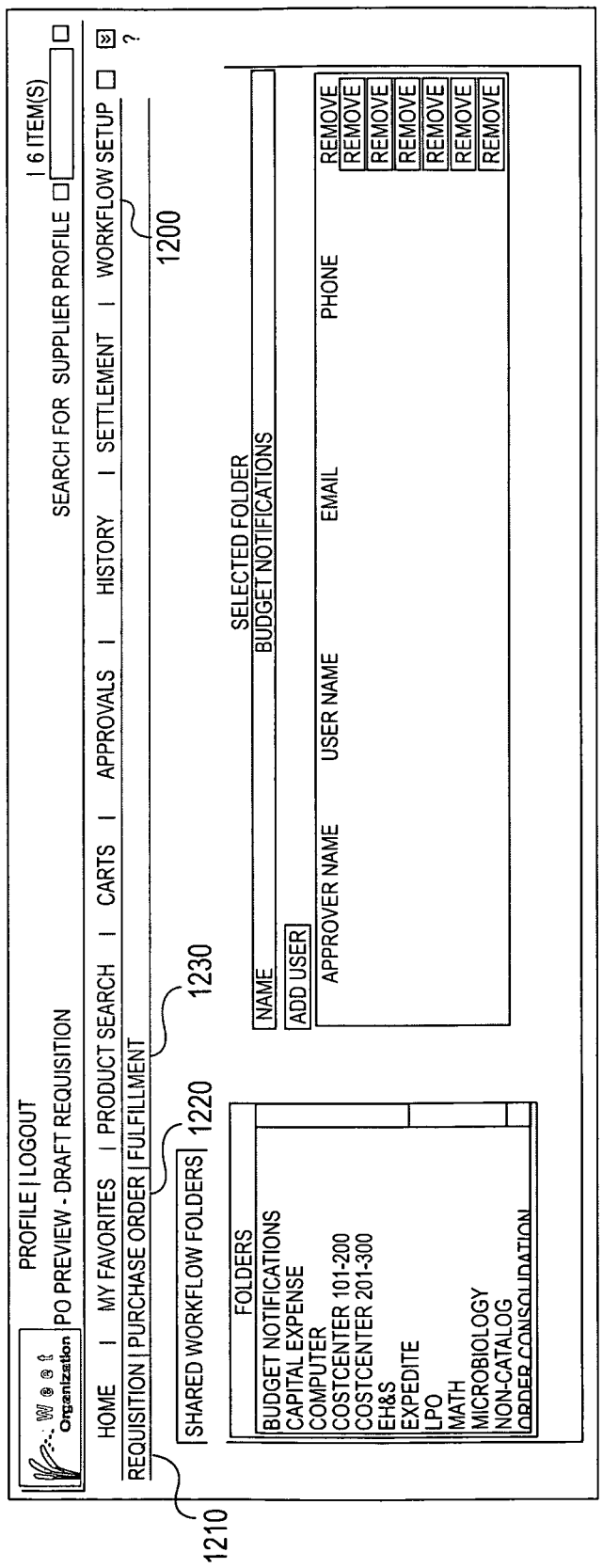
FIG. 12 illustrates an exemplary workflow setup tool in accordance with the present invention.

FIG. 12 illustrates an exemplary workflow setup tool in accordance with the present invention. As shown, the workflow setup tool 1200 includes requisition workflow tool 1210, purchase order setup tool 1220, and fulfillment setup tool 1230. These tools are used to setup various aspects of the workflow process as described above. For example, as shown in FIG. 12, the purchase order setup tool 1220 may be used to designate the names of approvers to review and approve purchase orders for a particular organization. As shown, the approver list may be customized for different departments (e.g., Math), types of products (e.g., non-catalog item), and even for specific users. Similarly, the requisition setup tool 1210 and fulfillment setup tool 1230 may be used to designate approvers for requests and fulfillment processes, respectively. Other workflow parameters may be further defined without departing from the scope of the present invention.

Figure 13:
FIG. 13 illustrates an exemplary purchase order approval tool in accordance with the present invention.

FIG. 13 illustrates an exemplary purchase order approval tool in accordance with the present invention. As shown, purchase order search engine 1310 searches through all of the purchase orders generated by the eProcurement system of the present invention for each of the hosted organizations. The results of the search may be filtered based on display criteria such as "Approver" (e.g., user responsible for approving the document), "Approval Queues," "All Pending Requisitions," "Urgent Approvals," "Unassigned Approvals," "Future Approvals," and "Manual Filter" options. The result list of the purchase orders are displayed in the display portion 1320 with such information as P.O. number, status of the P.O., priority level of the P.O., the date/time of the submission for approval, the name of the requester, the designated supplier, the amount, and selectable options. Using the purchase order approval tool, the approvers as well as the requisitioners may monitor the status of the requests and be able to ascertain where the request is in the workflow process. Using the tools described above, the user may drill down to the lowest level of the request to determine what needs to be done to move the request along if it becomes bottlenecked in the process, for example.

At the conclusion of the ordering process, an approval/rejection of orders feature may be implemented also through the middleware/web methods server 224, as well as the transaction processing server 223. The approve/reject order feature is invoked via a transaction processing module that is executed on the transaction processing servers 223. This feature can be managed by the middleware/web methods server 224 such that it is executed consistently with end user and supplier user business rules. For example, one advantage of this feature is its ability to provide notice of an approved or rejected order to an end user or super user.

Figure 14:
FIG. 14 illustrates an exemplary history tool in accordance with the present invention.

FIG. 14 illustrates an exemplary history tool in accordance with the present invention. The eProcurement system in accordance with the present invention keeps a history of all requests, purchase orders, receipts, invoices, and actions (e.g., edits to parameters) made in the system that may be searched and reviewed. History tool 1400, for example, includes a tool to search for purchase order histories, purchase request histories, receipt histories, and invoice histories. The searches may be made by purchase order number, by requisition, by supplier/SKU numbers, by receipts, by invoices, and by contracts. These parameters may be filtered by dates, users, as well as other specifics of the history being sought.

Finally, a supplier configuration feature may be implemented. This feature allows for the capability to have a supplier master that hosts multiple fulfillment centers. Also, this feature allows for an order processing feature with multiple payment methods for each fulfillment center, the execution of shipping and handling rules, and order distribution features. The order distribution features can include such features as facsimile or email confirmation, as well as other delivery methods, organized hierarchically to ensure purchase order delivery.

It will be apparent to those skilled in the art that various modifications and variations can be made in the empirical yield forecaster of the present invention without departing from the spirit or scope of the invention. Thus, it is intended that the present invention cover the modifications and variations of this invention provided they come within the scope of the appended claims and their equivalents.

We claim:

1. A system, comprising:
one or more computer processors; and
memory connected to the one or more computer processors, wherein the memory is configured with instructions to cause the one or more computer processors to:
at a server hosting an electronic procurement system:
provide access to a plurality of end users associated with an organization to accounts associated with the organization, each account being customized by a super user of the organization;
execute searches for products offered by one or more suppliers based on one or more received search queries to generate one or more search results, wherein the searches are through catalogs hosted by the electronic procurement system;
receive one or more in-system requisition orders from one or more end users for products offered by at least one supplier from the catalogs hosted by the electronic procurement system;
generate, for display with the one or more search results, one or more punch-out links to one or more punch-out catalogs, wherein the punch-out catalogs are for one or more third-party suppliers and are catalogs not hosted by the electronic procurement system and wherein the one or more punch-out links are customized for each end user based on business rules established between the organization and the one or more suppliers to process the requisition;
receiving one or more out-of-system requisition orders from one or more third party suppliers, wherein the one or more out-of-system requisition orders are generated based on end user interactions with a punch-out link and at least one of the catalogs not hosted by the electronic procurement system;
process one or more requisitions generated on the plurality of end user accounts by applying the business rules;
track the one or more requisitions generated by the plurality of end users;
store data generated in a data repository; and
automatically convert approved requisitions into purchase orders, wherein at least one of the purchase orders includes at least one in-system requisition order and at least one out-of-system requisition order.

2. The system of claim 1, wherein the system further includes super user, end user, and supplier user interfaces customized for each super user, end user, and supplier user.

3. The system of claim 1, wherein the memory is configured with further instructions to cause the one or more processors to, at the server, configure at least one of user access, user registration, user role, organizational structure, organizational position, and organization and user relationship.

4. The system of claim 1, wherein the memory is configured with further instructions to cause the one or more processors to, at the server, display at least one of add product, edit cart, review requisition, place order, purchase requisition approval, and purchase order preview.

5. The system of claim 4, wherein the memory is configured with further instructions to cause the one or more processors to, at the server, approve a purchase request reviewed by an approver.

6. The system of claim 4, wherein the memory is configured with further instructions to cause the one or more processors to, at the server, preview purchase orders before submission to the one or more suppliers.

7. The system of claim 1, wherein the memory is configured with further instructions to cause the one or more processors to, at the server, manage pricing contracts between the organization and the one or more suppliers.

8. The system of claim 1, wherein the business rules include custom business rules established between the organization and the one or more suppliers to process the requisitions.

9. The system of claim 1, wherein the business rules include business rules of one or more contractual terms between the organization and the one or more suppliers to process the requisitions.

10. The system of claim 1, wherein the business rules include custom business rules of one or more contractual terms between the organization and the one or more suppliers to process the requisitions.

11. The system of claim 1, wherein the data repository stores user, index, product, and transaction data generated on the system.

12. A computer-implemented method executed by one or more processors, comprising the steps of:
- accessing a single instance, multi-tenant procurement system;
- customizing one or more end user accounts of an organization by a super user of the organization;
- executing searches for products offered by one or more suppliers based on one or more received search queries to generate one or more search results, wherein the searches are through catalogs hosted by the electronic procurement system;
- receiving one or more in-system requisition orders from one or more end users for products offered by at least one supplier from the catalogs hosted by the electronic procurement system;
- generating, for display with the one or more search results, one or more punch-out links to one or more punch-out catalogs, wherein the punch-out catalogs are for one or more third-party suppliers and are catalogs not hosted by the electronic procurement system and wherein the one or more punch-out links are customized for each end user based on business rules established between the organization and the one or more suppliers to process the requisition;
- receiving one or more out-of-system requisition orders from one or more third party suppliers, wherein the one or more out-of-system requisition orders are generated based on end user interactions with a punch-out link and at least one of the catalogs not hosted by the electronic procurement system;
- processing one or more requisitions generated on the one or more end user accounts by applying the business rules;
- tracking the one or more requisitions generated by the one or more end user accounts;
- storing generated data in a data repository; and
- automatically converting approved requisitions into purchase orders, wherein at least one of the purchase orders includes at least one in-system requisition order and at least one out-of-system requisition order.

13. The method of claim 12, wherein one or more super users, end users, and supplier users access the single instance, multi-tenant procurement system through one of a super user, end user, and supplier user interface.

14. The method of claim 12, wherein the step of customizing includes configuring at least one of user access, user registration, user role, organizational structure, organizational position, and organizational and user relationship.

15. The method of claim 12, further comprising a step of displaying at least one of add product, edit cart, review requisition, place order, purchase requisition approval, and purchase order preview.

16. The method of claim 15, wherein the review requisition is used by an approver to approve a purchase request.

17. The method of claim 15, wherein the purchase order preview is used to preview purchase orders before submission to the one or more suppliers.

18. The method of claim 12, further comprising the step of managing pricing contracts between the organization and the one or more suppliers.

19. The method of claim 12, wherein the business rules applied are custom business rules established between the organization and the one or more suppliers to process the requisitions.

20. The method of claim 12, wherein the business rules include one or more contractual terms between the organization and the one or more suppliers to process the requisitions.

21. The method of claim 12, wherein the business rules include custom business rules of one or more contractual terms between the organization and the one or more suppliers to process the requisitions.

22. The method of claim 12, wherein the data repository stores user, index, product, and transaction data generated on the system.

23. A non-transitory computer readable storage medium having stored thereon computer executable instructions that, when executed on a computer, configure the computer to perform a method comprising the steps of:
- accessing a single instance, multi-tenant procurement system;
- customizing one or more end user accounts of an organization by a super user of the organization;
- executing searches for products offered by one or more suppliers based on one or more received search queries to generate one or more search results, wherein the searches are through catalogs hosted by the electronic procurement system;
- receiving one or more in-system requisition orders from one or more end users for products offered by at least one supplier from the catalogs hosted by the electronic procurement system;
- generating, for display with the one or more search results, one or more punch-out links to one or more punch-out catalogs, wherein the punch-out catalogs are for one or more third-party suppliers and are catalogs not hosted by the electronic procurement system and wherein the one or more punch-out links are customized for each end user based on business rules established between the organization and the one or more suppliers to process the requisition;
- receiving one or more out-of-system requisition orders from one or more third party suppliers, wherein the one or more out-of-system requisition orders are generated based on end user interactions with a punch-out link and at least one of the catalogs not hosted by the electronic procurement system;
- processing one or more requisitions generated on the one or more end user accounts by applying the business rules;
- tracking the one or more requisitions generated by the one or more end user accounts;
- storing generated data in a data repository; and
- automatically converting approved requisitions into purchase orders, wherein at least one of the purchase orders includes at least one in-system requisition order and at least one out-of-system requisition order.

24. The non-transitory computer readable storage medium of claim 23, wherein one or more super users, end users, and supplier users access the single instance, multi-tenant procurement system through one of a super user, end user, and supplier user interface.

25. The non-transitory computer readable storage medium of claim 23, wherein the step of customizing includes configuring at least one of user access, user registration, user role, organizational structure, organizational position, and organizational and user relationship.

26. The non-transitory computer readable storage medium of claim 23, further comprising a step of displaying at least one of add product, edit cart, review requisition, place order, purchase requisition approval, and purchase order preview.

27. The non-transitory computer readable storage medium of claim 26, wherein the review requisition is used by an approver to approve a purchase request.

28. The non-transitory computer readable storage medium of claim 26, wherein the purchase order preview is used to preview purchase orders before submission to the one or more suppliers.

29. The non-transitory computer readable storage medium of claim 23, further comprising the step of managing pricing contracts between the organization and the one or more suppliers.

30. The non-transitory computer readable storage medium of claim 23, wherein the business rules applied are custom business rules established between the organization and the one or more suppliers to process the requisitions.

31. The non-transitory computer readable storage medium of claim 23, wherein the business rules include one or more contractual terms between the organization and the one or more suppliers to process the requisitions.

32. The non-transitory computer readable storage medium of claim 23, wherein the business rules include custom business rules of one or more contractual terms between the organization and the one or more suppliers to process the requisitions.

33. The non-transitory computer readable storage medium of claim 23, wherein the data repository stores user, index, product, and transaction data generated on the system.

\* \* \* \* \*